US012266460B2

(12) United States Patent
Mizumura et al.

(10) Patent No.: US 12,266,460 B2
(45) Date of Patent: *Apr. 1, 2025

(54) MAGNETIC CORE

(71) Applicant: NIPPON STEEL CORPORATION, Tokyo (JP)

(72) Inventors: Takahito Mizumura, Tokyo (JP); Masato Mizokami, Tokyo (JP); Fumiaki Takahashi, Tokyo (JP); Hisashi Mogi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,221

(22) Filed: Nov. 28, 2023

(65) Prior Publication Data

US 2024/0170196 A1 May 23, 2024

Related U.S. Application Data

(63) Continuation of application No. 17/282,291, filed as application No. PCT/JP2019/039015 on Oct. 2, 2019, now Pat. No. 11,869,697.

(30) Foreign Application Priority Data

Oct. 2, 2018 (JP) ................................ 2018-187341

(51) Int. Cl.

*H01F 27/24* (2006.01)
*H01F 1/16* (2006.01)
(Continued)

(52) U.S. Cl.

CPC ............ *H01F 27/245* (2013.01); *H01F 1/16* (2013.01); *H01F 3/02* (2013.01); *H01F 41/0233* (2013.01)

(58) Field of Classification Search

CPC . H01F 27/245; H01F 1/16; H01F 3/02; H01F 41/0233; H01F 27/08; H01F 27/33; H01F 41/024; H01F 27/2455

See application file for complete search history.

(56) References Cited

U.S. PATENT DOCUMENTS

| | | | |
|---|---|---|---|
| 2,863,776 | A | 12/1960 | Horelick et al. |
| 3,307,132 | A | 2/1967 | Ellis |

(Continued)

FOREIGN PATENT DOCUMENTS

| | | | |
|---|---|---|---|
| GB | 965741 | A | 8/1964 |
| JP | 50-20245 | B | 7/1975 |

(Continued)

*Primary Examiner* — Tuyen T Nguyen

(74) *Attorney, Agent, or Firm* — Birch, Stewart, Kolasch & Birch, LLP

(57) ABSTRACT

When joining end faces of a plurality of soft magnetic sheets which are superposed in the sheet thickness direction and which are bent at parts forming corner areas of a core, offset of positions of the end faces from the desired positions is suppressed.

In a region of a window part comprised of a region inside of a first part 110 and second part 120, a third part 130 with a length in a longitudinal direction (X-axial direction) the same as a length in the X-axial direction of the window part at the position where the third part 130 is arranged is arranged so as to contact the region of the inner circumferential surface between the first corner area 101 and third corner area 103.

11 Claims, 37 Drawing Sheets

(51) Int. Cl.

| | |
|---|---|
| ***H01F 3/02*** | (2006.01) |
| ***H01F 27/245*** | (2006.01) |
| ***H01F 41/02*** | (2006.01) |

(56) References Cited

U.S. PATENT DOCUMENTS

| | | | | |
|---|---|---|---|---|
| 3,309,641 | A | 3/1967 | Burkhardt et al. | |
| 6,473,961 | B1 | 11/2002 | Segal et al. | |
| 2020/0126709 | A1 | 4/2020 | Mizumura et al. | |
| 2024/0266102 | A1* | 8/2024 | Mizumura | H01F 27/2455 |

FOREIGN PATENT DOCUMENTS

| | | | |
|---|---|---|---|
| JP | 51-27022 | U | 2/1976 |
| JP | 61-134018 | U | 8/1986 |
| JP | 2001-284136 | A | 10/2001 |
| JP | 3081863 | U | 11/2001 |
| JP | 2005-286169 | A | 10/2005 |
| JP | 2016-9792 | A | 1/2016 |
| JP | 6450100 | B2 | 1/2019 |
| JP | 6466728 | B2 | 2/2019 |

* cited by examiner

100

100

700

900

1100

1200

1500

1500

2000

2400

2500

2600

2800

2700

MAGNETIC CORE

CROSS-REFERENCE TO RELATED APPLICATIONS

This application is a Continuation of copending application Ser. No. 17/282,291, filed on Apr. 1, 2021, which is the National Phase under 35 U.S.C. § 371 of International Application No. PCT/JP2019/039015, filed on Oct. 2, 2019, and under 35 U.S.C. § 119(a) to Application No. 2018-187341, filed in Japan on Oct. 2, 2018, all of which are hereby expressly incorporated by reference into the present application.

FIELD

The present invention relates to a magnetic core, more particularly is very suitable for use for a core configured by superposing a plurality of bent soft magnetic sheets in a thickness direction.

BACKGROUND

There is a core configured by bending in advance parts of each of the electrical steel sheets and other soft magnetic sheets for forming the corner areas of the core, cutting the soft magnetic sheets into predetermined lengths, and stacking them in a sheet thickness direction.

In PTL 1, as this type of core, a magnetic core obtained by superposing in the sheet thickness direction a plurality of soft magnetic sheets bent into ring shapes and differing in lengths, evenly offsetting the facing end faces of the soft magnetic sheets over the sheet thickness direction by increments of predetermined dimensions, and rendering the joined parts of the end faces into stepped shapes is described.

Further, in PTL 2, the following magnetic core is described: First, a silicon steel sheet strip is wound several turns by a one-turn cut system of cutting one location every turn so as to form circular shapes of predetermined dimensions and so as to obtain a cross-sectional area of a predetermined thickness. This is fastened by a fastening band to configure a magnetic core body. Further, two corresponding locations of the magnetic core body are pressed by a press machine etc. to thereby make the magnetic core body deform to an approximately oval shape. Further, in PTL 2, using a jig to clamp the magnetic core and performing stress relief annealing is described.

Further, in PTL 3, a transformer in which even if gaps at coil openings become narrow, the work of insertion of electrical steel sheets is made possible, deformation of the electrical steel sheets is eliminated, overlapped locations are made smaller, and worsening of the core loss can be reduced is described.

Further, in PTL 4, using gaps formed at corner areas of a core member block as passages for flow of air, oil, or another cooling medium is described.

CITATIONS LIST

Patent Literature

[PTL 1] Japanese Utility Model Registration No. 3081863

[PTL 2] Japanese Unexamined Patent Publication No. 2005-286169

[PTL 3] Japanese Patent No. 6466728

[PTL 4] Japanese Patent No. 6450100

SUMMARY

Technical Problem

However, in the arts described in PTLs 1 and 2, there are single joined parts of the magnetic cores (at each layer, there is a single location where the end faces of the soft magnetic sheets face each other). If there are single locations of the joined parts of the magnetic core, the load in lacing (work of setting windings (coils) at magnetic core) is large. Therefore, it may be considered to use a structure in which the two leg parts of a magnetic core facing each other over an interval are provided with joined parts at respectively single locations each for a total of two locations so as to reduce the lacing load.

However, if doing this, at the time of joining the soft magnetic sheets, soft magnetic sheets enter between the other soft magnetic sheets and soft magnetic sheets to be joined, so the magnetic core is liable to deform and the predetermined shape to fail to be obtained. Further, due to the magnetic core deforming, the core loss is liable to become greater.

Therefore, at the total two locations of joined parts explained above, it is demanded that the end faces of the each layers of the soft magnetic sheets be made to reliably abut against each other to be joined. However, if, at the joined parts, the positions of the end faces to be joined of the electrical steel sheets become offset in a stepped manner, if not possible to align the respective end faces offset in the stepped manner, the end faces will no longer be able to be joined. Therefore, at the joined parts, the positioning in the direction perpendicular to the surfaces of the electrical steel sheets must be performed with a good precision. In particular, if employing the system such as described in PTL 1 of bending the soft magnetic sheets in advance, cutting them into predetermined lengths, then superposing them in the thickness direction, when respectively stacking the individual soft magnetic sheets, positional offset will easily occur. Improvement is required.

On the other hand, in PTL 3, if the gaps at the coil openings become too narrow, insertion of U-shaped electrical steel sheets into the coil openings facilitates the work of insertion at the narrow gaps compared with use of only one-turn cut type electrical steel sheets. However, with this technique, the outsides of the one-turn cut type of electrical steel sheets are covered by the U-shaped electrical steel sheets, so there is the problem that the heat generated at the corner areas of the electrical steel sheets causes the temperature inside of the transformer to end up rising. In particular, if providing the corner areas of the magnetic core with bent parts with small radii of curvature, heat is generated due to the worsened core loss caused by the effects of strain introduced into the bent parts, so the occurrence of heat must be reliably suppressed.

In PTL 4, use of the gaps formed at the corner areas of the core member block as passages for flow of air, oil, or another cooling medium is described. However, with just forming gaps, if using the magnetic core to form a transformer, sometimes the desired cooling effect will not be able to be obtained. Further, to obtain satisfactory performance as a transformer, along with a cooling effect, a noise suppression effect is sought. In PTL 4, a configuration of a transformer simultaneously satisfying the cooling effect and noise suppression effect is not envisioned at all.

The present invention was made in consideration of the above such problem and has as its object to join end faces of a plurality of soft magnetic sheets superposed in a thickness direction and bent at parts forming corner areas of the core during which keeping the positions of the end faces from becoming offset from the desired positions.

Solution to Problem

The magnetic core of the present invention is a magnetic core in which a first corner area and second corner area, and a third corner area and fourth corner area are respectively arranged at intervals in a first direction and the first corner area and third corner area, and the second corner area and fourth corner area are respectively arranged at intervals in a second direction vertical to the first direction, which magnetic core comprising a first part having a plurality of soft magnetic sheets which are shaped respectively bent at positions corresponding to the first corner area and the second corner area and which plurality of soft magnetic sheets are stacked so that the sheet surfaces are superposed, a second part having a plurality of soft magnetic sheets which are shaped respectively bent at positions corresponding to the third corner area and the fourth corner area and which plurality of soft magnetic sheets are stacked so that the sheet surfaces are superposed, and a third part, end parts in the longitudinal direction of the soft magnetic sheets forming the first part and end parts in the longitudinal direction of the soft magnetic sheets forming the second part rendered a state made to abut against each other in the second direction and the positions in the circumferential direction of the magnetic core of the locations of the abutting state being offset in the second direction, the abutting state of the end parts in the longitudinal direction of the soft magnetic sheets forming the first part and end parts in the longitudinal direction of the soft magnetic sheets forming the second part in the second direction being held, the third part being arranged at a window part comprised of a region at the inside of the first part and the second part, at least part of a region of one end of the third part and at least part of a region of another end of the third part respectively made to contact an inner circumferential surface of the window part in the second direction.

Advantageous Effects of Invention

According to the present invention, it is possible to join end faces of a plurality of soft magnetic sheets superposed in a thickness direction and bent at parts forming corner areas of the core during which keeping the positions of the end faces from becoming offset from the desired positions.

DESCRIPTION OF EMBODIMENTS

Figure 1:
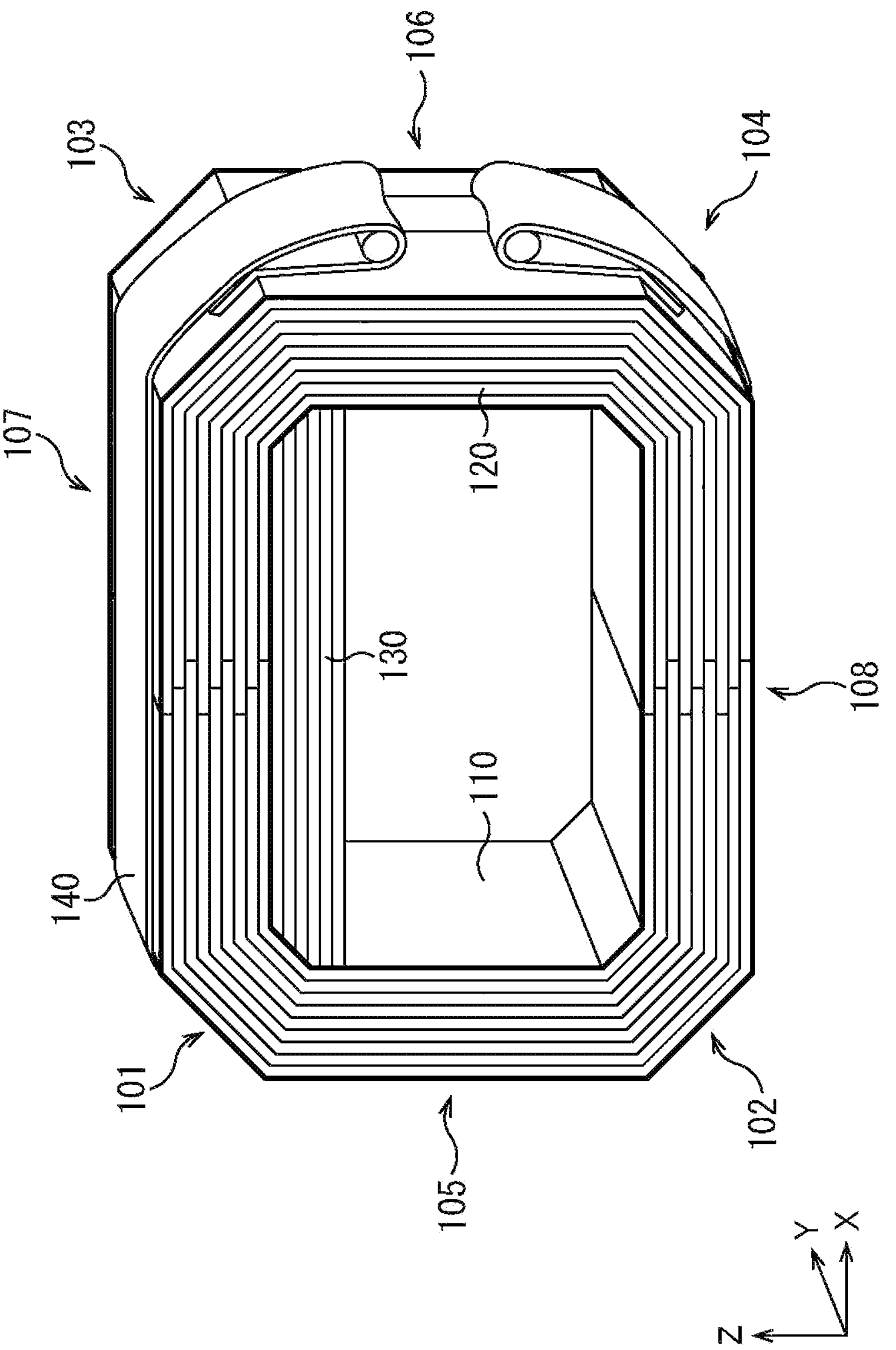
FIG. 1 is a view showing a first embodiment and viewing a magnetic core from an angle.

Below, while referring to the drawings, embodiments of the present invention will be explained. Further, in the drawings, the X-Y-Z coordinates show the relationships in the directions in the figures. The origins of the coordinates are not limited to the positions shown in the drawings. Further, the symbols of circles with x's inside them indicate the directions from the front sides to the rear sides of the paper surfaces.

Further, the terms such as "parallel", "along", "vertical", "perpendicular", "same, "identical", etc. specifying shapes or geometric conditions and their extents used in this Description and the directions and values of lengths, angles, etc. are not bound to their strict meanings and shall be interpreted as including ranges of extents where functions similar to the functions described can be expected. For example, if within the range of design tolerances, these can be treated as within ranges of extents where similar functions can be expected.

FIG. 1 is a view showing a magnetic core 100 from an angle. In FIG. 1, for convenience in illustration, illustration of the windings (coils) set at the magnetic core 100 are omitted.

In FIG. 1, the magnetic core 100 has a first part 110, a second part 120, and a third part 130. At the outer circumferential surface of the magnetic core 100, a band 140 is attached. The band 140 is provided with mounting hardware etc. for fastening the magnetic core 100 in position, but for convenience in illustration, in FIG. 1, illustration of the mounting hardware etc. is omitted. Further, the band 140 can be realized by known art and is not limited to one such as shown in FIG. 1.

Figure 2:
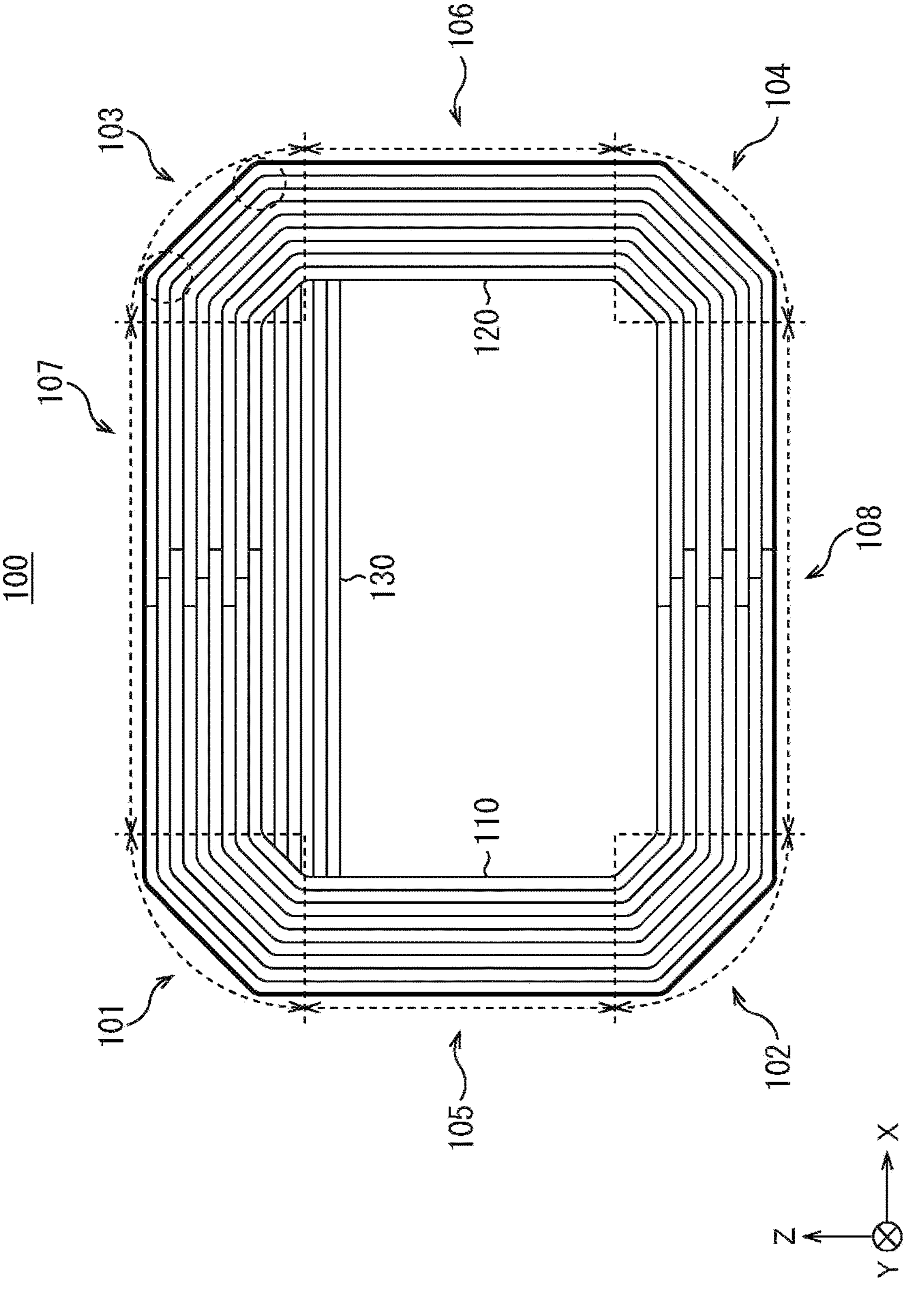
FIG. 2 is a view showing the first embodiment and viewing a magnetic core from a front.

FIG. 2 is a view showing the magnetic core 100 from the front. In FIG. 2, for convenience in illustration, illustration of the windings (coils) and band 140 set at the magnetic core 100 is omitted.

In FIG. 1 and FIG. 2, the magnetic core 100 has a first corner area 101, a second corner area 102, a third corner area 103, and a fourth corner area 104, that is, has four corner areas.

The first corner area 101 and the second corner area 102 are arranged at an interval in the Z-axial direction (first direction). The third corner area 103 and the fourth corner area 104 are also arranged at an interval in the Z-axial direction (first direction). Further, the first corner area 101 and the third corner area 103 are arranged at an interval in the X-axial direction (second direction). The second corner area 102 and fourth corner area 104 are also arranged at an interval in the X-axial direction (second direction).

The first part 110 has a plurality of soft magnetic sheets which are shaped respectively bent at positions corresponding to the first corner area 101 and second corner area 102 and which plurality of soft magnetic sheets are stacked so that the sheet surfaces are superposed over each other. The second part 120 has a plurality of soft magnetic sheets which are shaped respectively bent at positions corresponding to the third corner area 103 and fourth corner area 104 and which plurality of soft magnetic sheets are stacked so that the sheet surfaces are superposed over each other. The soft magnetic sheets are for example grain-oriented electrical steel sheets. The direction from the first corner area 101 toward the second corner area 102 of the grain-oriented electrical steel sheets (direction vertical to sheet width direction and sheet thickness direction) matches the rolling direction (the sheets are cut out in that way). In the following explanation, the case where the soft magnetic sheets are grain-oriented electrical steel sheets is given as an example in the explanation. The thickness of the grain-oriented electrical steel sheets is not particularly limited and may be suitably selected in accordance with the application etc., but usually is within 0.15 mm to 0.35 mm in range, preferably 0.18 mm to 0.23 mm in range. Further, the grain-oriented electrical steel sheets forming the first part 110 and second part 120 may be comprised of sheets which are the same (in thickness, constituents, microstructures, etc.)

Surfaces (end faces) of single end parts (first end parts) in the longitudinal directions of the grain-oriented electrical steel sheets forming the first part 110 and surfaces (end faces) of single end parts (first end parts) in the longitudinal directions of the grain-oriented electrical steel sheets forming the second part 120 are rendered a state made to respectively abut against each other in the X-axial direction (second direction). Similarly, surfaces (end faces) of other end parts (second end parts) in the longitudinal directions of the grain-oriented electrical steel sheets forming the first part 110 and surfaces (end faces) of other end parts (second end parts) in the longitudinal directions of the grain-oriented electrical steel sheets forming the second part 120 are rendered a state made to respectively abut against each other in the X-axial direction (second direction).

At this time, as shown in FIG. 1 and FIG. 2, the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) so that the surfaces of the grain-oriented electrical steel sheets forming the first part 110 and the surfaces of the grain-oriented electrical steel sheets forming the second part 120 are superposed over each other. Furthermore, as shown in FIG. 1 and FIG. 2, the positions in the circumferential direction of the magnetic core 100 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are rendered a state made to abut against each other (joined parts) are periodically offset positions in the X-axial direction (second direction). By doing this, it is possible to make the magnetic resistance in the magnetic core 100 smaller and reduce the core loss compared to when making positions in the circumferential direction of the magnetic core 100 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) the same in making the end faces abut against each other in the X-axial direction (second direction).

Further, the region between the first corner area 101 and the second corner area 102 of the first part 110 becomes a first parallelepiped part 105 with a longitudinal direction parallel to the Z-axis. The region between the third corner area 103 and fourth corner area 104 of the second part 120 becomes a second parallelepiped part 106 with a longitudinal direction parallel to the Z-axis. The region between the first corner area 101 and third corner area 103 of the first part 110 and second part 120 becomes a third parallelepiped part 107 with a longitudinal direction parallel to the X-axis. The region between the second corner area 102 and fourth corner area 104 of the first part 110 and second part 120 becomes a fourth parallelepiped part 108 with a longitudinal direction parallel to the X-axis.

The third part 130 has a plurality of grain-oriented electrical steel sheets stacked so that the sheet surfaces are superposed. The longitudinal directions of the grain-oriented electrical steel sheets (directions vertical to sheet width directions and sheet thickness directions) are the same as the rolling direction.

As shown in FIG. 1 and FIG. 2, the plurality of grain-oriented electrical steel sheets forming the third part 130 of the present embodiment are flat sheets arranged so that their longitudinal directions become the X-axial direction (that is, flat sheets extending in the X-axial direction) (that is, the surfaces of the grain-oriented electrical steel sheets are not bent).

Further, as shown in FIG. 1 and FIG. 2, the third part 130 is arranged at a window part comprised of the region at the inside of the first part 110 and second part 120. Further, one surface of the third part 130 in the Z-axial direction (surface of the grain-oriented electrical steel sheet positioned at the positive direction-most side of the Z-axis in the grain-oriented electrical steel sheets forming the third part 130) is arranged at a position contacting the inner circumferential surface between the first corner area 101 and third corner area 103 in the inner circumferential surfaces of the first part 110 and second part 120, but the other surface of the third part 130 in the Z-axial direction (surface of the grain-oriented electrical steel sheet positioned at the negative direction-most side of the Z-axis in the grain-oriented electrical steel sheets forming the third part 130) is not arranged at a position contacting the inner circumferential surface between the third corner area 103 and fourth corner area 104. The length of the third part 130 in the X-axial direction is the same as the length of the window part in the X-axial direction at the position where the third part 130 is arranged. That is, at least part of one end part (first end part) of the third part 130 in the longitudinal direction is made to contact the inner circumferential surface of the first part 110, while at least one part of the other end part (second end part) of the third part 130 in the longitudinal direction is made to contact the inner circumferential surface of the second part 120. The thickness of the third part 130 (lengths of grain-oriented electrical steel sheets in sheet thickness direction) is preferably made at least 0.001 time the thickness of the first part 110 (second part 120) (lengths of grain-oriented electrical steel sheets in sheet thickness direction (inherent lengths of legs of magnetic core in sheet thickness direction)) so as to prevent the positions of the end parts in the longitudinal directions of the grain-oriented electrical steel sheets forming the first part 110 and the end parts in the longitudinal directions of the grain-oriented electrical steel sheets forming the second part 120 from becoming offset when attaching the band 140.

Further, in the figures, for convenience in illustration, the numbers of the grain-oriented electrical steel sheets will not necessarily match the actual numbers.

The band 140 is attached to (wound around) the outer circumferential surface of the magnetic core 100 formed by the thus arranged first part 110, second part 120, and third part 130. The band 140 is for example made of stainless steel. The band 140 has mounting hardware etc. for the magnetic core 100 attached to it, but for convenience in illustration, in FIG. 1, illustration of the mounting hardware etc. is omitted.

Here, in the following explanation, the part of the magnetic core 100 formed by the first part 110 and second part 120 will be referred to as the "magnetic core body" in accordance with need. In the present embodiment, the core length of the magnetic core body is not particularly limited. However, even if the core length changes in the core, the volume of the bent parts of the core is constant. Therefore, the core loss occurring at the bent parts of the core is constant. A longer core length means a smaller volume rate of the bent parts of the core (=volume of bent parts of core÷volume of core as a whole). Therefore, a longer core length means a smaller effect by the bent parts of the core on worsening of core loss. Accordingly, the core length of the magnetic core body is preferably 1.5 m or more, more preferably 1.7 m or more. Further, the "core length of the magnetic core body" means the length of the magnetic core body in the circumferential direction of the magnetic core at the center point in the stacking direction of the grain-oriented electrical steel sheets when viewing the magnetic core from the sheet width direction (Y-axial direction) of the soft magnetic sheets (grain-oriented electrical steel sheets).

Further, the magnetic core is reduced in core loss, so can be suitably used for any conventionally known applications such as magnetic core etc. for transformers, reactors, and noise filters, etc.

As explained above, the magnetic core body is comprised of, in the circumferential direction of the magnetic core 100, corner areas (first corner area 101 to fourth corner area 104) and parallelepiped parts (first parallelepiped part 105 to fourth parallelepiped part 108) alternately continuing after each other. In the example shown in FIG. 1 and FIG. 2, the first corner area 101 to fourth corner area 104 and the first parallelepiped part 105 to fourth parallelepiped part 108 are arranged so that, toward the paper surface, counterclockwise, the first corner area 101→first parallelepiped part 105→second corner area 102→fourth parallelepiped part 108→fourth corner area 104→second parallelepiped part 106→third corner area 103→third parallelepiped part 107→first corner area 101→ . . . .

In this embodiment, the angles formed by two parallelepiped parts (first parallelepiped part 105 to fourth parallelepiped part 108) adjoining each other across the corner areas (first corner area 101 to fourth corner area 104) are 90°. In the example shown in FIG. 1 and FIG. 2, the angle formed by the first parallelepiped part 105 and fourth parallelepiped part 108, the angle formed by the second parallelepiped part 106 and fourth parallelepiped part 108, the angle formed by the second parallelepiped part 106 and third parallelepiped part 107, and the angle formed by the first parallelepiped part 105 and third parallelepiped part 107 are respectively 90°.

Further, when viewing the magnetic core 100 from the sheet width direction (Y-axial direction) of the grain-oriented electrical steel sheets, the corner areas (first corner area 101 to fourth corner area 104) have two bent parts having curved shapes. The total of the bent angles present at one corner area becomes 90°.

Figure 3:
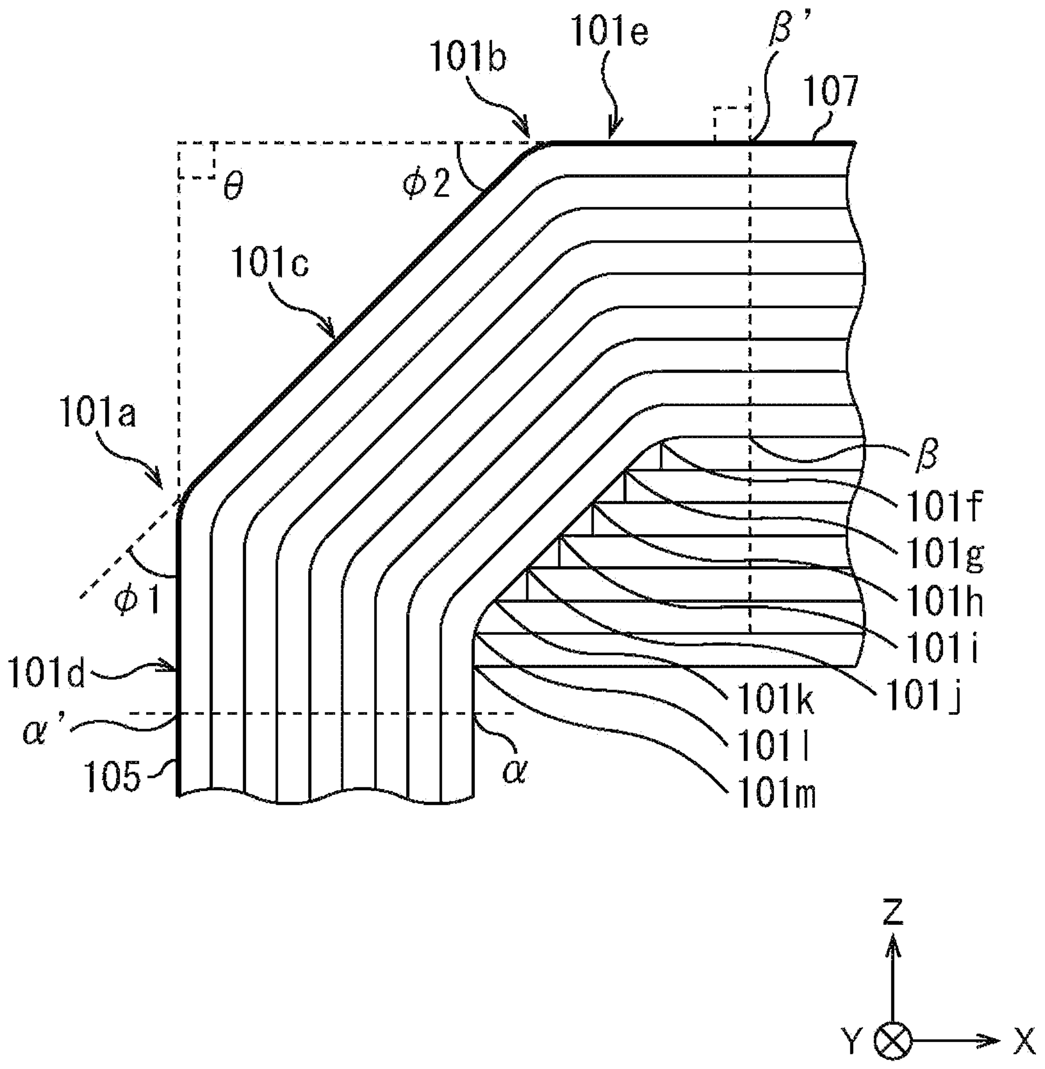
FIG. 3 is a view showing the first embodiment and showing a vicinity of a first corner area enlarged.

FIG. 3 is a view showing the vicinity of the first corner area 101 enlarged. Further, the shapes of the second corner area 102, third corner area 103, and fourth corner area 104 are also similar to the shape of the first corner area 101, so here, detailed explanations of the second corner area 102, third corner area 103, and fourth corner area 104 will be omitted.

In FIG. 3, the bent parts 101*a* and 101*b* have curved shapes. The region between the bent parts 101*a* and 101*b* is the flat part 101*c*.

One corner area is formed by one or more bent parts. Therefore, a bent part continues after a parallelepiped part through a flat part and, after that bent part, flat parts and bent parts alternately continue in accordance with the number of bent parts in one corner area. At a final bent part in the corner area, that parallelepiped part and an adjoining parallelepiped part continue after each other through flat parts in a state sandwiching that corner area between them. In the example shown in FIG. 3, the bent part 101*a* continues after the first parallelepiped part 105 through the flat part 101*d*. After the bent part 101*a*, the flat part 101*c* and the bent part 101*b* continue in that order. The third parallelepiped part 107 continues after the bent part 101*b* through the flat part 101*e*. Further, the flat parts 101*d* and 101*e* need not be present.

In the example shown in FIG. 3, the region from the line segment α-α' to the line segment β-β' is defined as the "first corner area 101". The point α is the end point at the first parallelepiped part 105 side at the inner circumferential surface of the first corner area 101. The point α' is the intersecting point of the line passing through the point α in a direction vertical to the surfaces of the grain-oriented electrical steel sheets and the outer circumferential surface of the magnetic core 100 (first part 110). Similarly, the point β is the end point at the third parallelepiped part 107 side at the inner circumferential surface of the first corner area 101. The point β' is the intersecting point of the line passing through the point β in a direction vertical to the surfaces of the grain-oriented electrical steel sheets and the outer circumferential surface of the magnetic core 100 (first part 110). In FIG. 3, the angle formed by the first parallelepiped part 105 and third parallelepiped part 107 adjoining each other across the first corner area 101 is θ (=90°). The total of the bent angles φ1 and φ2 of the bent parts 101*a* and 101*b* in the first corner area 101 (one corner area) is 90°.

Since the angle θ formed by two parallelepiped parts adjoining each other across one corner area is 90°, if there are two or more bent parts in one corner area, the bent angle φ of one bent part is less than 90°. Further, if there is one bent part in one corner area, the bent angle φ of the one bent part is 90°. From the viewpoint of keeping strain from occurring due to deformation at the time of work and keeping down the core loss, the bent angle φ is preferably 60° or less, more preferably 45° or less. As shown in FIG. 1 to FIG. 3, if there are two bent parts in one corner area, from the viewpoint of reducing the core loss, for example it is possible to make φ1=60° and φ2=30° or to make φ1=45° and φ2=45° etc.

Figure 4:
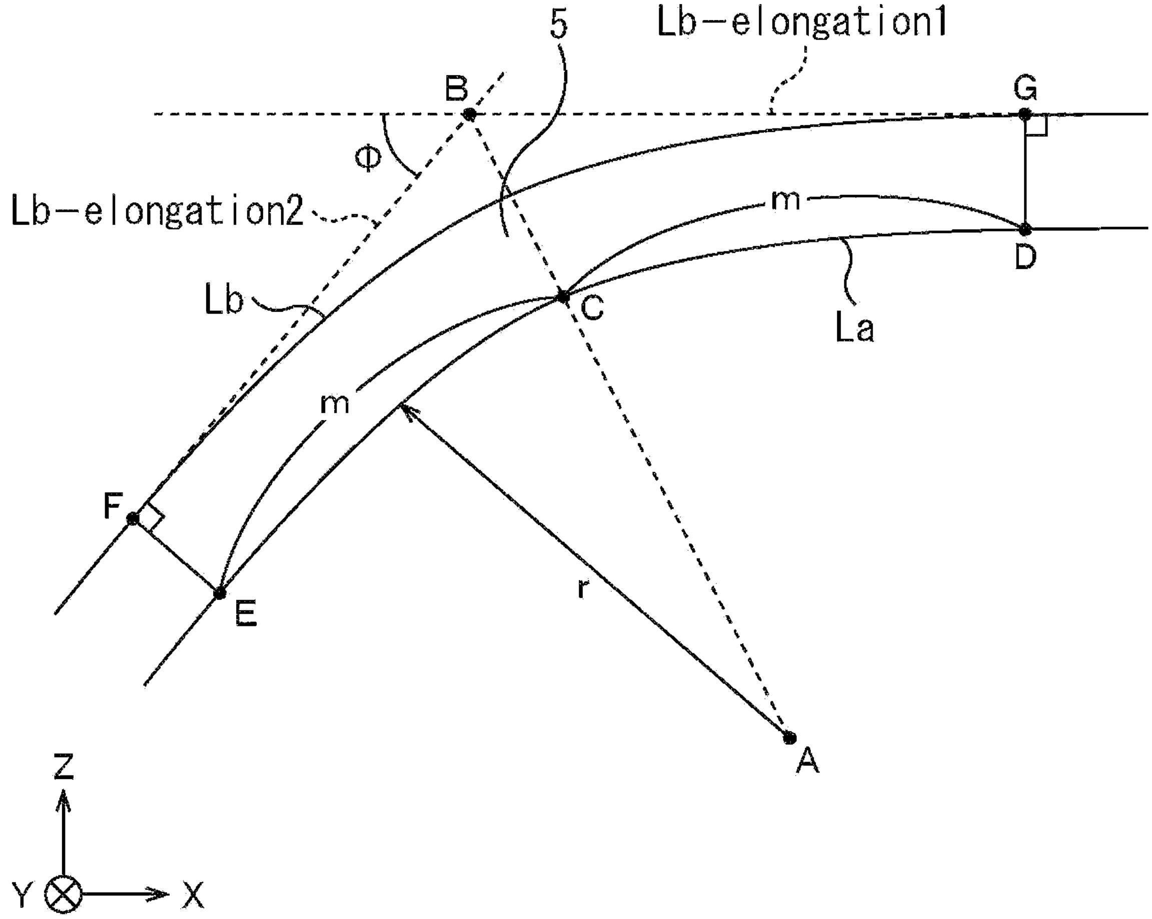
FIG. 4 is a view showing the first embodiment and schematically showing one example of a bent part of a grain-oriented electrical steel sheet.

While referring to FIG. 4, the bent part will be explained in further detail. FIG. 4 is a view schematically showing one example of a bent part (curved part) of a grain-oriented electrical steel sheet. The "bent angle of the bent part" means the angular difference arising at a bent part of a grain-oriented electrical steel sheet between the flat part at the rear side in the bending direction and the flat part at the front side. Specifically, as shown in FIG. 4, at a bent part of a grain-oriented electrical steel sheet, this is expressed as the angle φ of the supplementary angle (acute angle) of the angle formed by the two virtual lines Lb-elongation 1 and Lb-elongation 2 obtained by extending straight parts adjoining the two sides (point F and point G) of the curved part included in the line Lb expressing the outer surface of that grain-oriented electrical steel sheet.

The bent angles φ of the bent parts are less than 90° and the total of the bent angles of all of the bent parts present in one corner area is 90°.

In the present embodiment, a "bent part" shows the region surrounded by the line spanning the point D and point E on the line La representing the inside surface of the grain-oriented electrical steel sheet, the line spanning the point F and point G on the line Lb representing the outside surface of the grain-oriented electrical steel sheet, the line connecting the point D and point E, and the line connecting the point F and point G when viewing the magnetic core from a sheet width direction (Y-axial direction) of a grain-oriented electrical steel sheet and defining the point D and point E on the line La representing the inside surface of the grain-oriented electrical steel sheet and the point F and point G on the line Lb representing the outside surface of the grain-oriented electrical steel sheet as follows:

Here, the point D, the point E, the point F, and the point G are defined as follows:

The point where the line AB connecting the center point A of radius of curvature at the curved part included in the line La representing the inside surface of a grain-oriented electrical steel sheet and the intersecting point B of the two virtual lines Lb-elongation 1 and Lb-elongation 2 obtained by extending straight parts, adjoining the two sides of the curved part included in the line Lb representing the outside surface of the grain-oriented electrical steel sheet intersects the line representing the inside surface of the grain-oriented electrical steel sheet is defined as the origin C.

Further, the point separated from the origin C by exactly a distance "m" represented by the following formula (1) in one direction along the line La representing the inside surface of the grain-oriented electrical steel sheet is defined as the point D.

Further, the point separated from the origin C by exactly the distance "m" in the other direction along the line La representing the inside surface of the grain-oriented electrical steel sheet is defined as the point E.

Further, the intersecting point between the straight part facing the point D in the straight part included in the line Lb representing the outside surface of the grain-oriented electrical steel sheet and the virtual line drawn vertically with respect to the straight part facing the point D and passing through the point D is defined as the point G.

Further, the intersecting point between the straight part facing the point E in the straight part included in the line Lb representing the outside surface of the grain-oriented electrical steel sheet and the virtual line drawn vertically with respect to the straight part facing the point E and passing through the point E is defined as the point F.

$$m=r\times(\pi\times\varphi/180) \quad (1)$$

In formula (1), "m" expresses the distance from the point C, and "r" expresses the distance from the center point A to the point C (radius of curvature).

That is, "r" shows the radius of curvature in the case of deeming the curve near the point C to be an arc and represents the radius of curvature of the inside surface of the grain-oriented electrical steel sheet when viewing the magnetic core from the sheet width direction (Y-axial direction) of the grain-oriented electrical steel sheet. The smaller the radius of curvature "r", the sharper the curve of the curved part of the bent part, while the larger the radius of curvature "r", the more moderate the curve of the curved part of the bent part. For example, the radius of curvature "r" of the bent part may be made a range of over 1 mm and less than 3 mm.

In the magnetic core of the present embodiment, the radii of curvature at the bent parts of the grain-oriented electrical steel sheets stacked in the sheet thickness direction may be ones having certain degrees of error. If having error, the radii of curvature of the bent parts are specified as the average values of the radii of curvature of the stacked grain-oriented electrical steel sheets. Further, if having error, the error is preferably not more than 0.1 mm.

Further, the method of measurement of the radius of curvature of a bent part is also not particularly limited, but for example a commercially available microscope (Nikon ECLIPSE LV150) may be used for observation at 200× to measure it.

Next, one example of the method of manufacture of the magnetic core 100 of the present embodiments will be explained.

Further, the lengths in the longitudinal directions and width directions of the grain-oriented electrical steel sheets forming the first part 110 and second part 120 are determined in accordance with the specifications of the magnetic core 100. As explained later, when making the first part 110 and the second part 120 abut against each other in the X-axial direction (second direction), to prevent a gap from forming between two adjoining layers of grain-oriented electrical steel sheets forming the first part 110, the lengths in the longitudinal directions and width directions of the grain-oriented electrical steel sheets are determined so that the outer circumferential surface of the grain-oriented electrical steel sheet arranged at the inside and the inner circumferential surface of the grain-oriented electrical steel sheet arranged at the outside become equal in two adjoining layers of grain-oriented electrical steel sheets. Further, the grain-oriented electrical steel sheets are cut in accordance with the determined lengths in the longitudinal directions and lengths in the width directions of the grain-oriented electrical steel sheets so that the longitudinal directions become the rolling direction.

Next, as shown in FIG. 1 and FIG. 2, the regions of formation of the corner areas and the positions and bent angles of the bent parts at the grain-oriented electrical steel sheets are determined so that the positions in the circumferential direction of the magnetic core 100 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) become periodically offset in the X-axial direction (second direction).

In the example shown in FIG. 1 to FIG. 3, by bending the positions of two locations of the regions of formation of the corner areas of the grain-oriented electrical steel sheets and forming bent parts with radii of curvature "r" of over 1 mm and less than 3 mm, the grain-oriented electrical steel sheets are shaped so that parallelepiped parts (first parallelepiped part 105, second parallelepiped part 106, third parallelepiped part 107, and fourth parallelepiped part 108) and corner areas (first corner area 101, second corner area 102, third corner area 103, and fourth corner area 104) alternately continue after each other and the angles θ formed by two parallelepiped parts adjoining each other across the corner areas become 90°.

Figure 5A:
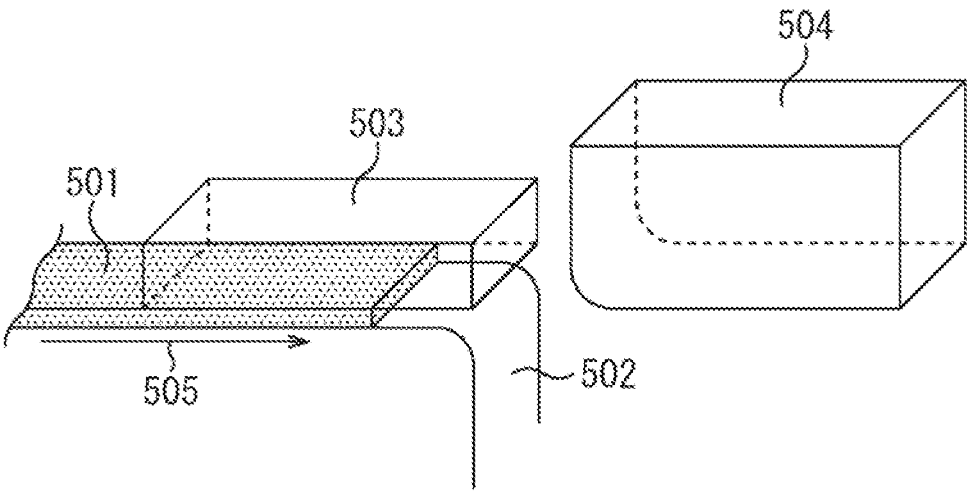
FIGS. 5A to 5C are schematic views showing the first embodiment and showing one example of a method of bending.
Figure 5B:
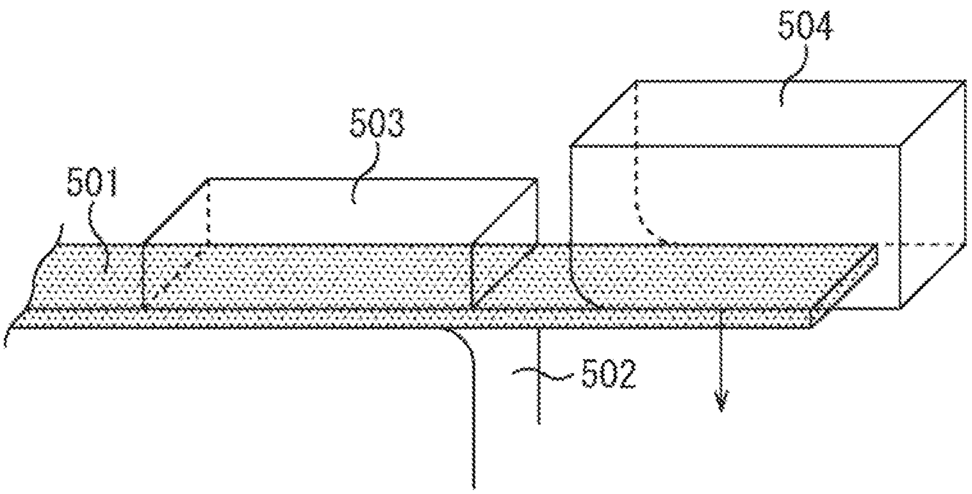
Figure 5C:
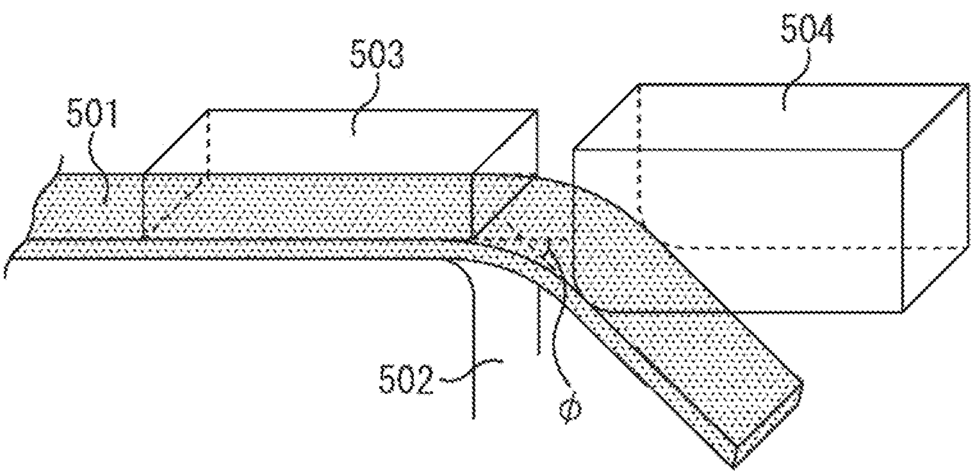

FIGS. 5A to 5C are schematic views showing one example of a method of bending in the method of manufacture of the magnetic core 100.

The configuration of the work machine is not particularly limited, but for example as shown in FIG. 5A, the work machine usually has a die 502 and punch 504 for press work and a guide 503 for fastening a grain-oriented electrical steel sheet 501. The grain-oriented electrical steel sheet 501 is conveyed in the direction of the conveyance direction 505 and is fastened at a preset position (FIG. 5B). Next, the punch 504 is used to press down the grain-oriented electrical steel sheet by a predetermined force in the direction of the arrow mark shown in FIG. 5B (downward direction) whereby the sheet is bent to have a bent part of the bent angle φ.

The method of making the radius of curvature "r" of the bent part over 1 mm and less than 3 mm in range is not particularly limited, but usually the distance between the die 502 and punch 504 and the shapes of the die 502 and punch 504 can be changed to thereby adjust the radius of curvature "r" of the bent part to a specific range.

The grain-oriented electrical steel sheets are worked setting the radii of curvature "r" at the bent parts of the grain-oriented steel sheets stacked in the sheet thickness direction to conform with each other, but sometimes error occurs in the radii of curvature of the worked grain-oriented electrical steel sheets due to the roughnesses or shapes of the surface layers of the steel sheets. It is preferable that the error, if the error occurs, be 0.1 mm or less.

As explained above, the method of measurement of the radius of curvature of the bent part is not particularly limited, but, for example, a commercially available microscope (Nikon ECLIPSE LV150) may be used to observe the part at 200X for measurement.

Further, the grain-oriented electrical steel sheets obtained by bending in this way are annealed to remove the strain at the bent parts.

After that, the grain-oriented electrical steel sheets are stacked so that the surfaces of the grain-oriented electrical steel sheets bent and annealed to relieve stress in the above way are superposed over each other so that the first part 110 and second part 120 are formed. In this way, the first part 110 and second part 120 are prepared. At this time, the grain-oriented electrical steel sheets forming the first part 110 and second part 120 may be fastened so as not to become offset in position. Further, the first part 110 and second part 120 may be formed at the time of the later explained assembly.

Next, the third part 130 will be explained. First, grain-oriented electrical steel sheets are cut so that the lengths in the width directions become the same as the lengths in the width directions of the grain-oriented electrical steel sheets forming the first part 110 and second part 120 and so that the lengths in the longitudinal directions become the length of the window part (region at inside of the first part 110 and second part 120) in the X-axial direction and the same as the lengths in the X-axial direction at the locations where the grain-oriented electrical steel sheets are arranged. At this time, the grain-oriented electrical steel sheets are cut so that the longitudinal directions become the rolling direction. Further, to enable the end parts in the longitudinal directions of the each grain-oriented electrical steel sheet to reliably contact the inner circumferential surface of the first part 110 and the inner circumferential surface of the second part 120, the minimum values in design of the lengths in the longitudinal directions of the grain-oriented electrical steel sheets forming the third part 130 may be made the length of the window part (region at inside of first part 110 and second part 120) in the X-axial direction and the same as the maximum values in design of the lengths in the X-axial direction at the positions where the grain-oriented electrical steel sheet is arranged.

Further, the cut grain-oriented electrical steel sheets may be stacked with the surfaces superposed over each other and the grain-oriented electrical steel sheets fastened so as not to move so that the shapes of the end parts in the longitudinal directions when viewed from the sheet width directions (Y-axial direction) of the third part 130 conform with the shapes of the inner circumferential surfaces of the first corner area 101 and third corner area 103. The grain-oriented electrical steel sheet can be fastened, for example, using a binder etc. The binder is preferably one having a magnetic property.

For example, at the time of design, as shown in FIG. 3, when viewed from the sheet width directions (Y-axial direction), by positioning the points 101*f* to 101*m* contacting the inner circumferential surface of the first corner area 101 in the end parts in the longitudinal directions of the grain-oriented electrical steel sheets forming the third part 130 so that the points 101*f* to 101*m* are positioned on a function expressing the shape of the inner circumferential surface of the first corner area 101, it is possible to make the shapes of the end parts in the longitudinal directions when viewed from the sheet width directions (Y-axial direction) conform with the shape of the inner circumferential surface of the first corner area 101. The shapes of the end parts contacting the inner circumferential surface of the third corner area 103 in the end parts in the longitudinal directions of the grain-oriented electrical steel sheets forming the third part 130 may be determined in the same way as the end parts contacting the inner circumferential surface of the first corner area 101.

The shapes of the end parts in the longitudinal directions of the grain-oriented electrical steel sheets when viewed from the sheet width directions (Y-axial direction) can, for example, by confirmed by observation using a commercially available microscope (Nikon ECLIPSE LV150) at 200×.

The third part 130 is prepared in the above way. Further, it is possible to stack and fasten grain-oriented electrical steel sheets of the same shapes and same sizes, then work the grain-oriented electrical steel sheets so that the shapes of the end parts in the longitudinal directions conform to the shapes of the inner circumferential surfaces of the first corner area 101 and third corner area 103. Further, the third part 130 may be formed at the time of assembly explained later.

Furthermore, the coils set in the magnetic core 100 are prepared.

After preparing the grain-oriented electrical steel sheets for forming the first part 110 and second part 120, third part 130, and coils in the above way, these are assembled.

Figure 6A:
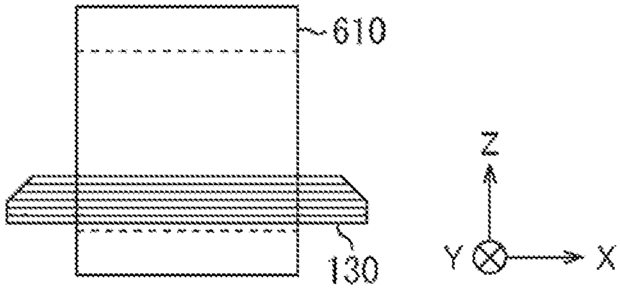
FIGS. 6A to 6C are schematic views showing the first embodiment and showing one example of a method of assembly.
Figure 6B:
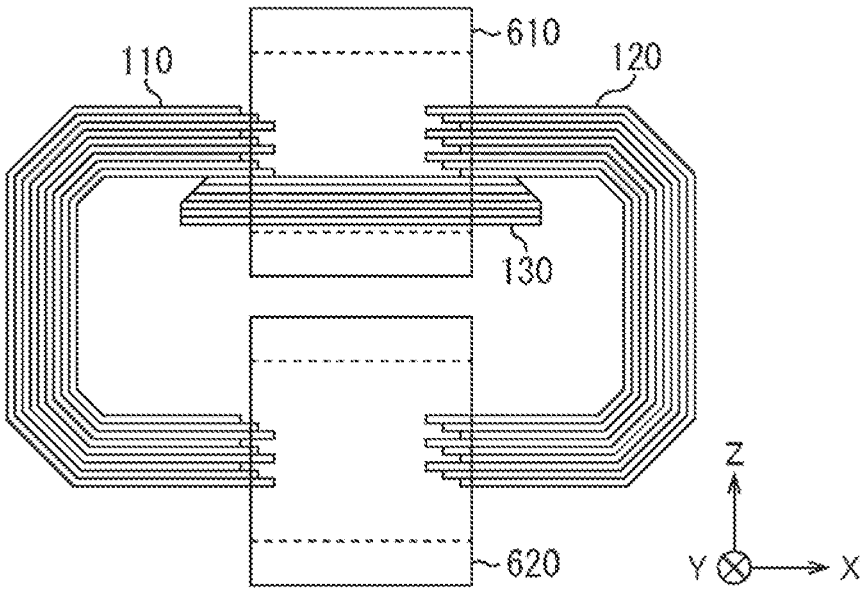
Figure 6C:
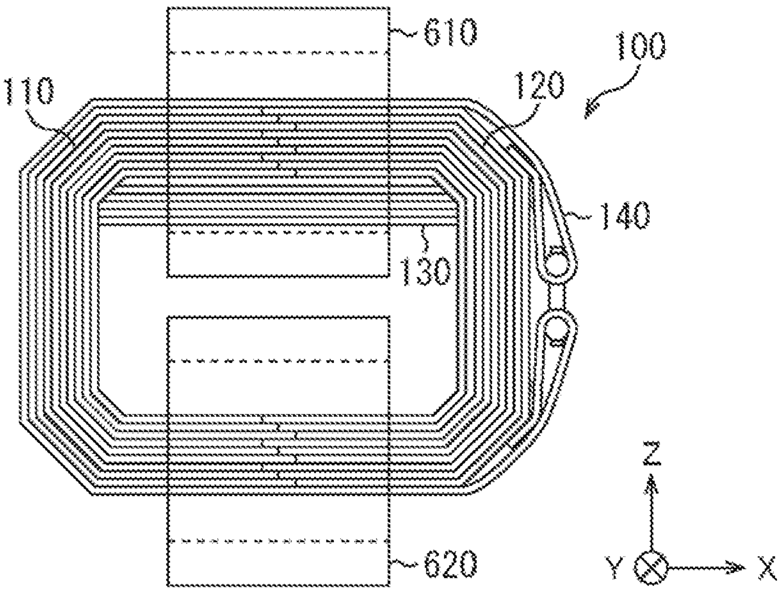

FIGS. 6A to 6C are schematic views showing one example of the method of assembly in the method of manufacture of the magnetic core 100.

First, as shown in FIG. 6A, the third part 130 is passed through a hollow part of the coil 610.

Next, as shown in FIG. 6B, one end part (first end part) of the first part 110 and one end part (first end part) of the second part 120 are inserted in the hollow part of the coil 610 so that the third part 130 is positioned at the inner circumferential surface sides of the first part 110 and the second part 120 (in FIG. 6B, at the lower side from the first part 110 and second part 120). At the same time as this, the other end part (second end part) of the first part 110 and the other end part (second end part) of the second part 120 are inserted in the hollow part of the coil 620.

Further, as shown in FIG. 6C, one surface of the third part 130 (in FIG. 6B, the top surface of the third part 130) is made to contact the inner circumferential surfaces of the first part 110 and the second part 120. In that state, the surface (end face) of one end part (first end part) of the first part 110 and the surface (end face) of one end part (first end part) of the second part 120 are made to abut against each other in the X-axial direction (second direction) and the surface (end face) of the other end part (second end part) of the first part 110 and the surface (end face) of the other end part (second end part) of the second part 120 are made to abut against each other in the X-axial direction (second direction). At the time of attachment of the band 140 explained later, if the end part of the third part 130 in the longitudinal direction contacts the inner circumferential surfaces of the first part 110 and the second part 120, in that state, the end part of the third part 130 in the longitudinal direction may either contact the inner circumferential surfaces of the first part 110 and the second part 120 or may not.

Next, as shown in FIG. 6C, a band 140 is attached to the outer circumferential surfaces of the first part 110 and second part 120. When attaching the band 140, the first part 110 and second part 120 are fastened. Therefore, in the grain-oriented electrical steel sheets forming the first part 110 and second part 120, compressive force concentrates at the location where the surfaces of the end parts (end faces) of the outermost circumference grain-oriented electrical steel sheets are made to abut against each other in the X-axial direction (second direction) (joined part). If doing this, starting from this part, at the locations where the end parts in the longitudinal directions of the grain-oriented electrical steel sheets forming the first part 110 and the end parts in the longitudinal directions of the grain-oriented electrical steel sheets forming the second part 120 are made to abut against each other in the X-axial direction (second direction) (joined parts), the grain-oriented electrical steel sheets forming the first part 110 are liable to enter the gaps between the grain-oriented electrical steel sheets forming the second part 120 or the grain-oriented electrical steel sheets forming the second part 120 are liable to enter the gaps between the grain-oriented electrical steel sheets forming the first part 110. However, at the time of attaching the band 140, at least part of one end part (first end part) of the third part 130 in the longitudinal direction and at least part of the other end part (second end part) respectively contact the inner circumferential surfaces of the first part 110 and the second part 120. By doing this, it is possible to keep the above-mentioned problem of entry of grain-oriented electrical steel sheets from occurring.

In the above way, in this embodiment, in the region of the window part comprised of the region at the inside of the first part 110 and second part 120, a third part 130 with a length in the longitudinal direction (X-axial direction) the same as the length in the X-axial direction of the window part at the position where the third part 130 is arranged is arranged so as to contact the region of the inner circumferential surface between the first corner area 101 and third corner area 103. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut in the X-axial direction (second direction) (joined parts) from becoming offset from the desired positions. Due to this, it is possible to keep the magnetic core 100 from deforming and failing to become the desired shape and to keep the core loss from increasing.

In this embodiment, the case where, when viewing the magnetic core 100 from the width direction (Y-axial direction) of the grain-oriented electrical steel sheets, the corner areas (first corner area 101 to fourth corner area 104) each have two bent parts having curved shapes was given as an example in the explanation. However, the number of the bent parts of the corner areas may be any number so long as one or more. In this case, the total of the bent angles of the bent parts present in one corner area is preferably 90°.

One example of a magnetic core in the case where each corner area has three bent parts having curved shapes will be explained.

Figure 7:
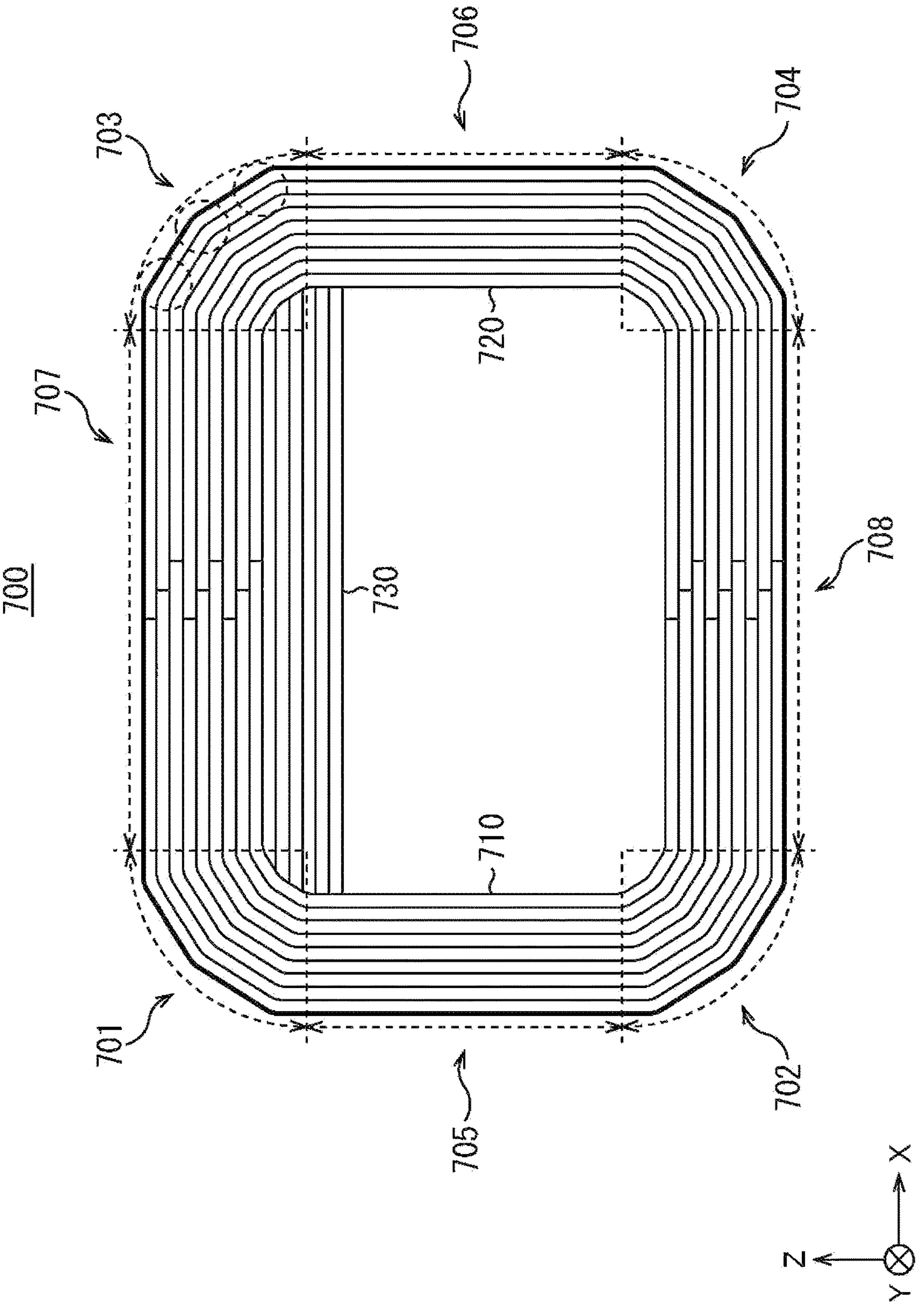
FIG. 7 is a view showing a first modification of the first embodiment and viewing the magnetic core from the front.

FIG. 7 is a view showing a magnetic core 700 from the front. FIG. 7 is a view corresponding to FIG. 2.

In FIG. 7, the magnetic core 700 has a first part 710, a second part 720, and a third part 730. At the outer circumferential surface of the magnetic core 700, a band is attached. In FIG. 7, in the same way as FIG. 2, for convenience in illustration, illustration of the windings (coils) and band provided at the magnetic core 700 will be omitted.

The difference between the magnetic core 700 shown in FIG. 7 and the magnetic core 100 shown in FIG. 1 to FIG. 3 lies in the shapes of the corner areas and the shapes of the end parts of the third part 730 in the longitudinal direction.

Figure 8:
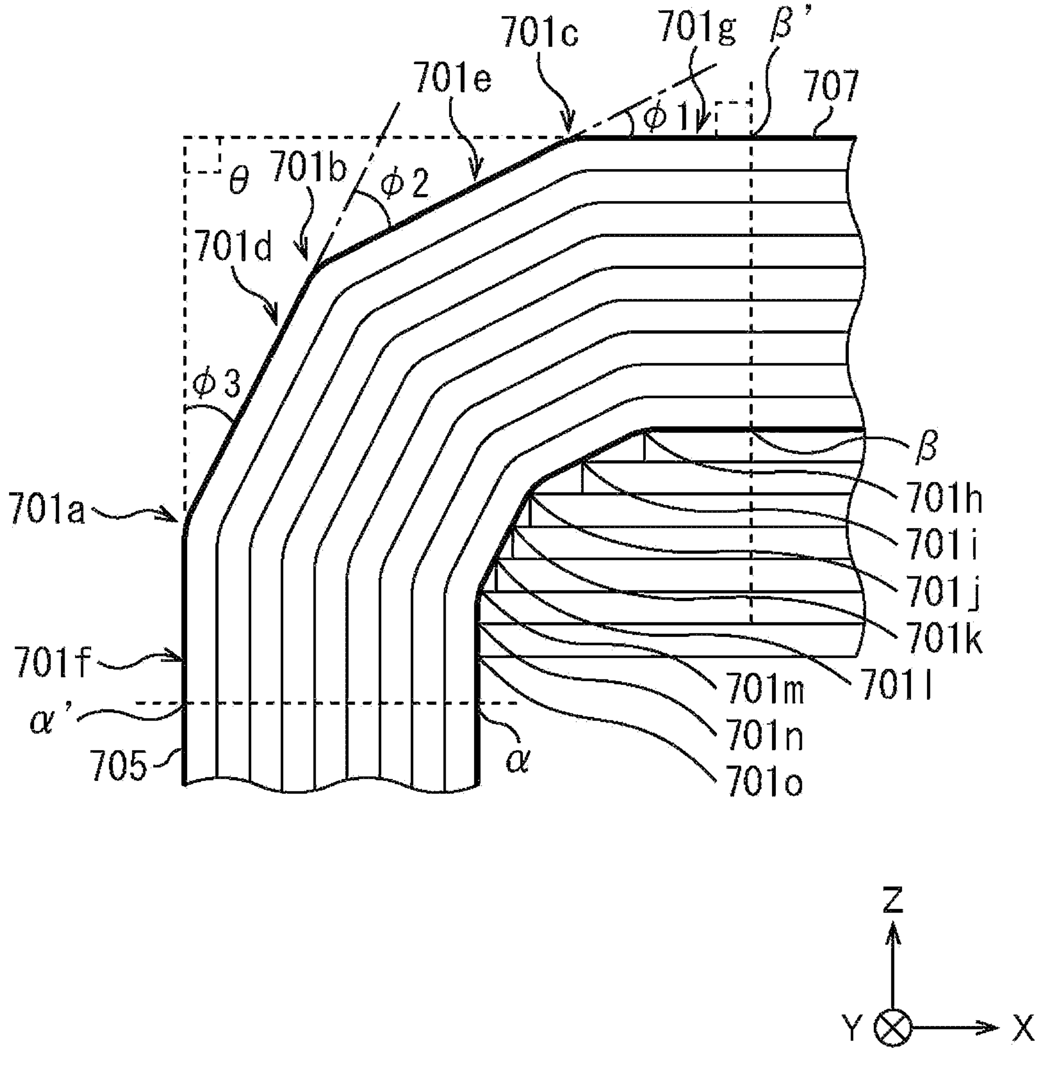
FIG. 8 is a view showing the first modification of the first embodiment and showing the vicinity of the first corner area enlarged.

FIG. 8 is a view showing the vicinity of the first corner area 701 enlarged. FIG. 8 is a view corresponding to FIG. 3. Further, the shapes of the second corner area 702, third corner area 703, and fourth corner area 704 are also similar to the shape of the first corner area 701, so here, detailed explanations of the second corner area 702, third corner area 703, and fourth corner area 704 will be omitted.

In FIG. 7, the bent parts 701*a*, 701*b*, and 701*c* had curved shapes. The region between the bent parts 701*a* and 701*b* and the region between the bent parts 701*b* and 701*c* are respectively the flat parts 701*d* and 701*e*.

As explained above, one corner area is comprised of one or more bent parts. Therefore, a bent part continues after a parallelepiped part through a flat part and, after that bent part, flat parts and bent parts alternately continue in accordance with the number of bent parts in one corner area. At a final bent part in the corner area, that parallelepiped part and an adjoining parallelepiped part continue after each other through flat parts in a state sandwiching that corner area between them. In the example shown in FIG. 8, the bent part 701*a* continues after the first parallelepiped part 705 through the flat part 701*f*. After the bent part 701*a*, the flat part 701*d*, bent part 701*b*, and flat part 701*e* continue in that order. The third parallelepiped part 707 continues after the bent part 701*c* through the flat part 701*g*. Further, the flat parts 701*f* and 701*g* need not be present.

In FIG. 8 as well, in the same way as FIG. 3, the region from the line segment a-α' to the line segment β-β' is defined as the "first corner area 701". In FIG. 8, the point α is the end point at the first parallelepiped part 705 side at the inner circumferential surface of the first corner area 701. The point α' is the intersecting point of the line passing through the point α in a direction vertical to the surfaces of the grain-oriented electrical steel sheets and the outer circumferential surface of the magnetic core 700 (first part 710). Similarly, the point β is the end point at the third parallelepiped part 707 side at the inner circumferential surface of the first corner area 701. The point β' is the intersecting point of the line passing through the point β in a direction vertical to the surfaces of the grain-oriented electrical steel sheets and the outer circumferential surface of the magnetic core 700 (first part 710).

In FIG. 8, the angle formed by the first parallelepiped part 705 and third parallelepiped part 707 adjoining each other across the first corner area 701 is θ(=90). The total of the bent angles φ1, φ2, and φ3 of the bent parts 701*a*, 701*b*, and 701*c* in the first corner area 701 (one corner area) is 90°. As shown in FIG. 7 to FIG. 8, if one corner area has three bent parts, from the viewpoint of reduction of core loss, for example, it is possible to make φ1=φ2=φ=30°.

The third part 730 is arranged in the window part comprised of the region at the inside of the first part 710 and second part 720. Further, the surface of the third part 730 is arranged at a position in the inner circumferential surfaces of the first part 710 and second part 720 contacting the inner circumferential surface between the first corner area 701 and third corner area 703. The length of the third part 730 in the X-axial direction is the same as the length of the window part in the X-axial direction at the position where the third part 730 is arranged. That is, at least part of the surface (end face) of one end part (first end part) of the third part 730 in the longitudinal direction is made to contact the inner circumferential surface of the first part 710, while at least part of the surface (end face) of the other end part (second end part) of the third part 730 in the longitudinal direction is made to contact the inner circumferential surface of the second part 720.

For example, at the time of design, as shown in FIG. 8, when viewed from the sheet width direction (Y-axial direction), by positioning the points 701*h* to 701*o* contacting the inner circumferential surface of the first corner area 701 in the end parts in the longitudinal directions of the grain-oriented electrical steel sheets forming the third part 730 so that the points 701*h* to 701*o* are positioned on a function expressing the shape of the inner circumferential surface of the first corner area 701, it is possible to make the shapes of the end parts in the longitudinal directions when viewed from the sheet width directions (Y-axial direction) of the third part 730 match the shape of the inner circumferential surface of the first corner area 701. The shapes of the end parts contacting the inner circumferential surface of the third corner area 703 in the end parts in the longitudinal directions of the grain-oriented electrical steel sheets forming the third part 730 may be determined in the same way as the end parts contacting the inner circumferential surface of the first corner area 701.

Next, one example of a magnetic core in the case where each corner area has one bent part having a curved shape will be explained.

Figure 9:
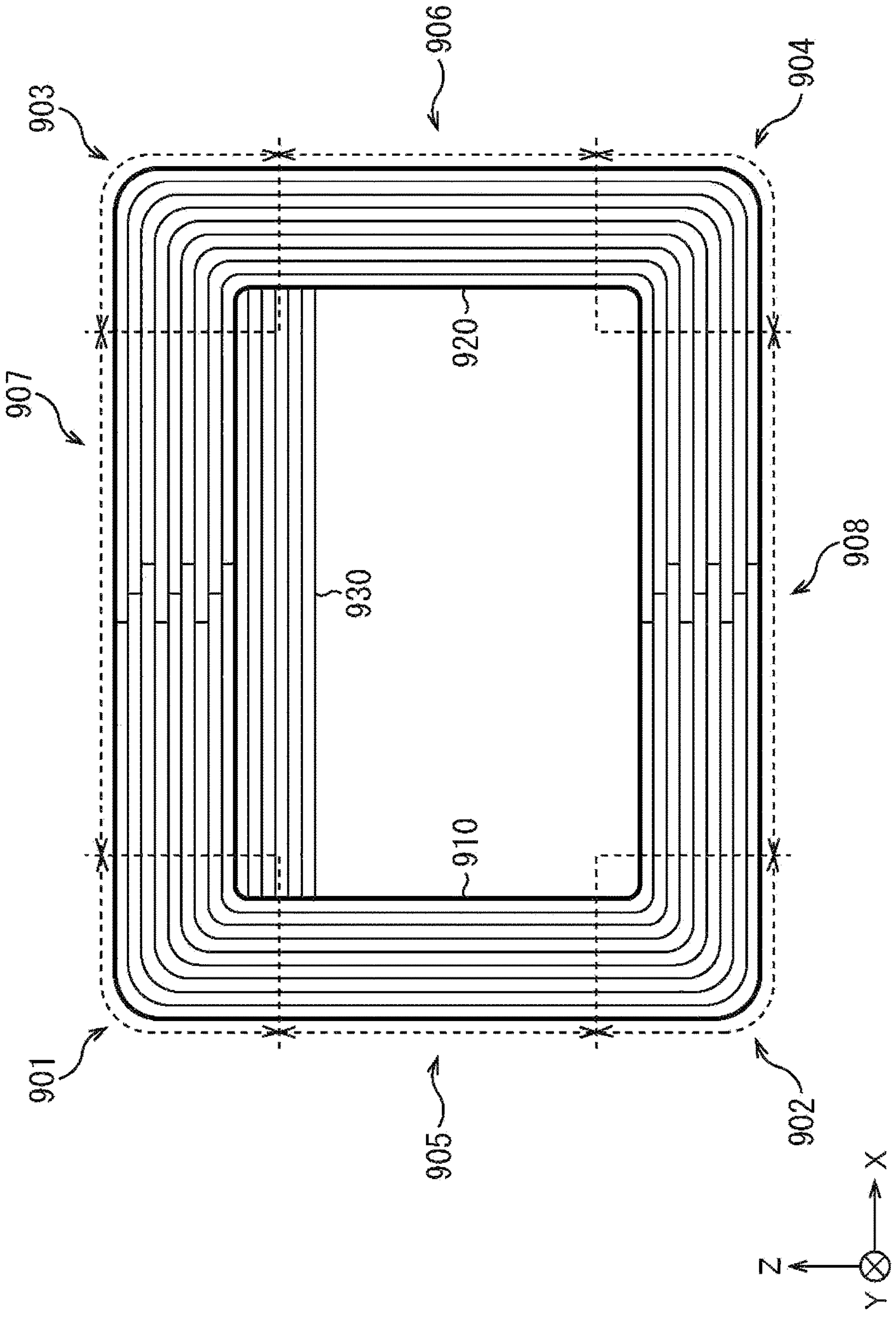
FIG. 9 is a view showing a second modification of the first embodiment and viewing the magnetic core from the front.

FIG. 9 is a view showing a magnetic core 900 from the front. FIG. 9 is a view corresponding to FIG. 2 and FIG. 7.

In FIG. 9, the magnetic core 900 has a first part 910, a second part 920, and a third part 930. At the outer circumferential surface of the magnetic core 900, a band is attached. In FIG. 9, in the same way as FIG. 2 and FIG. 7, for convenience in illustration, illustration of the windings (coils) and band provided at the magnetic core 900 will be omitted.

The difference between the magnetic core 900 shown in FIG. 9 and the magnetic core 100 shown in FIG. 1 to FIG. 3 lies in the shapes of the corner areas and the shapes of the end parts of the third part 930 in the longitudinal direction.

Figure 10:
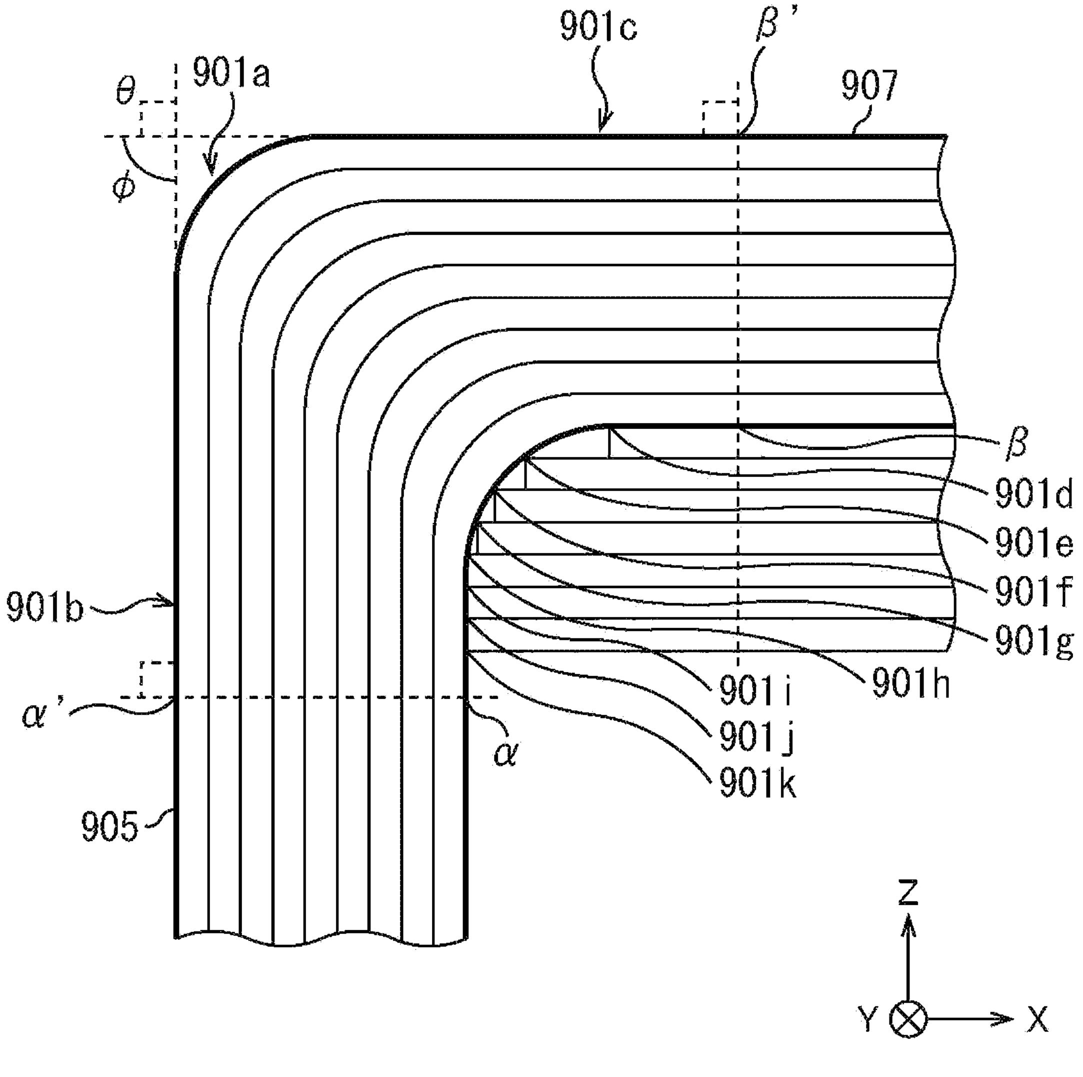
FIG. 10 is a view showing the second modification of the first embodiment and showing the vicinity of the first corner area enlarged.

FIG. 10 is a view showing the vicinity of the first corner area 901 enlarged. FIG. 10 is a view corresponding to FIG. 3 and FIG. 8. Further, the shapes of the second corner area 902, third corner area 903, and fourth corner area 904 are also similar to the shape of the first corner area 901, so here, detailed explanations of the second corner area 902, third corner area 903, and fourth corner area 904 will be omitted.

In FIG. 9, the bent part 901*a* has a curved shape.

As explained above, one corner area is comprised of one or more bent parts. Therefore, a bent part continues after a parallelepiped part through a flat part and, after that bent part, flat parts and bent parts alternately continue in accordance with the number of bent parts in one corner area. At a final bent part in the corner area, that parallelepiped part and an adjoining parallelepiped part continue after each other through flat parts in a state sandwiching that corner area between them. In the example shown in FIG. 10, the bent part 901*a* continues after the first parallelepiped part 905 through the flat part 901*b* and the third parallelepiped part 907 continues after the bent part 901*a* through the flat part 901*c*. Further, the flat parts 901*b* and 901*c* need not be present.

In FIG. 10 as well, in the same way as FIG. 3, the region from the line segment α-α' to the line segment β-β' is defined as the "first corner area 901". In FIG. 9, the point α is the end point at the first parallelepiped part 905 side at the inner circumferential surface of the first corner area 901. The point α' is the intersecting point of the line passing through the point α in a direction vertical to the surfaces of the grain-oriented electrical steel sheets and the outer circumferential surface of the magnetic core 900 (first part 910). Similarly, the point β is the end point at the third parallelepiped part 907 side at the inner circumferential surface of the first corner area 901. The point β' is the intersecting point of the line passing through the point β in a direction vertical to the surfaces of the grain-oriented electrical steel sheets and the outer circumferential surface of the magnetic core 900 (first part 910).

In FIG. 10, the angle formed by the first parallelepiped part 905 and third parallelepiped part 907 adjoining each other across the first corner area 901 is θ(=90°). The bent angle φ of the bent part 901*a* in the first corner area 901 (one corner area) is 90°.

As clear from FIG. 3, FIG. 8, and FIG. 10, in general, if one corner area has "n" number of bent parts, $\varphi 1+\varphi 2+\ldots+\varphi n$ becomes 90°.

The third part 930 is arranged at a window part comprised of the region at the inside of the first part 910 and second part 920. Further, the surface of the third part 930 is arranged at a position contacting the inner circumferential surface between the first corner area 901 and third corner area 903 in the inner circumferential surfaces of the first part 910 and second part 920. The length of the third part 930 in the X-axial direction is the same as the length of the window part in the X-axial direction at the position where the third part 930 is arranged. That is, at least part of the surface (end face) of one end part (first end part) of the third part 930 in the longitudinal direction is made to contact the inner circumferential surface of the first part 910, while at least one part of the surface (end face) of the other end part (second end part) of the third part 930 in the longitudinal direction is made to contact the inner circumferential surface of the second part 920.

For example, at the time of design, as shown in FIG. 10, when viewed from the sheet width direction (Y-axial direction), by determining the position of each point 701*h* to 701*o* so that the points 901*d* to 901*k* contacting the inner circumferential surface of the first corner area 901 in the end parts in the longitudinal directions of the grain-oriented electrical steel sheets forming the third part 930 are positioned on a function expressing the shape of the inner circumferential surface of the first corner area 901, it is possible to make the shapes of the end parts in the longitudinal directions when viewed from the sheet width directions (Y-axial direction) of the third part 930 match the shape of the inner circumferential surface of the first corner area 901. The shapes of the end parts contacting the inner circumferential surface of the third corner area 903 in the end parts in the longitudinal directions of the grain-oriented electrical steel sheets forming the third part 930 may be determined in the same way as the end parts contacting the inner circumferential surface of the first corner area 901.

Further, if, like in the present embodiment, configuring the third parts 130, 730, and 930 by grain-oriented electrical steel sheets (soft magnetic sheets), it is possible to reduce the core losses of the magnetic cores 100, 700, and 900, so this is preferable. However, it is not necessarily required to do this. For example, the third parts may also be made bulk type parts of the same shapes as the third parts 130, 730, and 930. Further, nonmetallic materials other than soft magnetic materials may also be used to form the third parts.

Further, the member for holding the state of the end parts in the longitudinal directions of the grain-oriented electrical steel sheets forming the first part 110 and the end parts in the longitudinal directions of the grain-oriented electrical steel sheets forming the second part 120 made to abut against each other in the X-axial direction (second direction) (that is, the member for fixing the relative positions of the first part 110 and second part 120) is not limited to the band 140. For example, two members may be used, that is, a member pressing the first part 110 from the negative direction side of the X-axis to the positive direction of the X-axis and a member pressing the second part 120 from the positive direction side of the X-axis to the negative direction of the X-axis may be used, to clamp the first part 110 and second part 120 in the X-axial direction.

Second Embodiment

Next, a second embodiment will be explained. In the first embodiment, the surface of the third part 130 was made to be arranged at a position contacting the inner circumferential surface between the first corner area 101 and third corner area 103. In this embodiment, furthermore, a third part with a surface contacting the inner circumferential surface between the second corner area 102 and fourth corner area 104 is further arranged. In this way, the present embodiment is one increasing the number of the third parts from the first embodiment by one. Therefore, in the explanation of the present embodiment, parts the same as the first embodiment will be assigned the same notations as the notations assigned to FIG. 1 to FIG. 10 and detailed expiations will be omitted.

Figure 11:
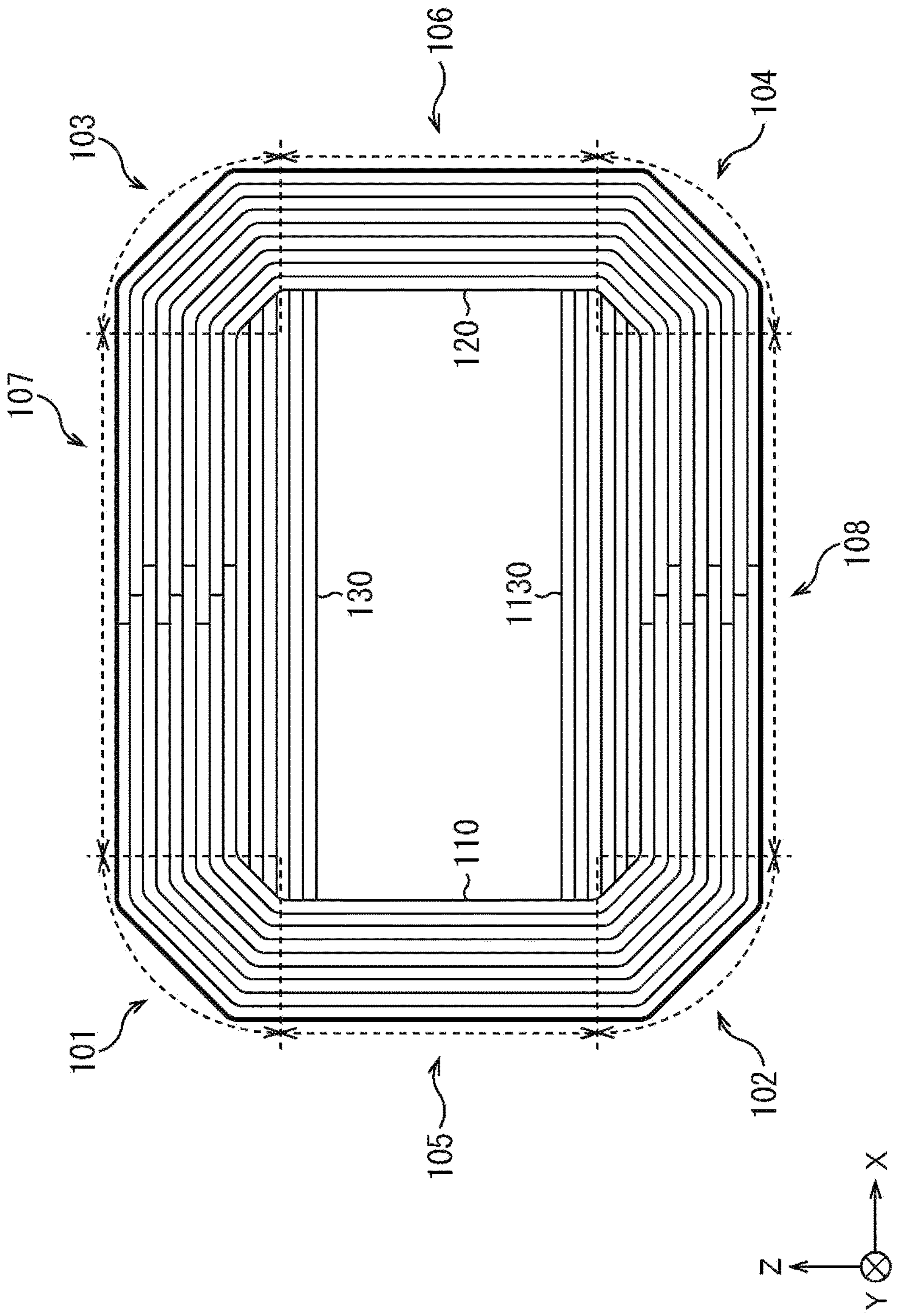
FIG. 11 is a view showing a second embodiment and viewing the magnetic core from an angle.

FIG. 11 is a view showing a magnetic core 1100 from the front. FIG. 11 is a view corresponding to FIG. 2.

In FIG. 11, the magnetic core 1100 has a first part 110, a second part 120, and third parts 130 and 1130. At the outer circumferential surface of the magnetic core 100, a band is attached. In FIG. 11, in the same way as FIG. 2, for convenience in illustration, illustration of the windings (coils) and band set at the magnetic core 100 is omitted.

The third part 1130 can be realized as one the same as the third part 130. One surface of the third part 130 in the Z-axial direction (surface of the grain-oriented electrical steel sheet positioned at the positive direction-most side of the Z-axis in the grain-oriented electrical steel sheets forming the third part 130) is arranged at a position contacting the inner circumferential surface between the first corner area 101 and third corner area 103 in the inner circumferential surfaces of the first part 110 and second part 120, but the other surface of the third part 130 in the Z-axial direction (surface of the grain-oriented electrical steel sheet positioned at the negative direction-most side of the Z-axis in the grain-oriented electrical steel sheets forming the third part 130) is not arranged at a position contacting the inner circumferential surface between the third corner area 103 and fourth corner area 104. As opposed to this, one surface of the third part 1130 in the Z-axial direction (surface of the grain-oriented electrical steel sheet positioned at the negative direction-most side of the Z-axis in the grain-oriented electrical steel sheets forming the third part 1130) is arranged at a position contacting the inner circumferential surface between the second corner area 102 and fourth corner area 104 in the inner circumferential surfaces of the first part 110 and second part 120, but the other surface of the third part 1130 in the Z-axial direction (surface of the grain-oriented electrical steel sheet positioned at the positive direction-most side of the Z-axis in the grain-oriented electrical steel sheets forming the third part 1130) is not arranged at a position contacting the inner circumferential surface between the first corner area 101 and second corner area 102. Further, the third parts 130 and 1130 are arranged in the Z-axial direction (first direction) in a state with an interval between them.

Further, in the same way as the third part 130, the length of the third part 1130 in the X-axial direction is the same as the length of the window part comprised of the region inside of the first part 110 and second part 120 in the X-axial direction at the position where the third part 1130 is arranged. That is, at least part of the surface (end face) of one end part (first end part) of the third part 1130 in the longitudinal direction is made to contact the inner circumferential surface of the first part 110, while at least one part of the surface (end face) of the other end part (second end part) of the third part 1130 in the longitudinal direction is made to contact the inner circumferential surface of the second part 120.

In the above way, in this embodiment, in the region of the window part comprised of the region at the inside of the first part 110 and second part 120, third parts 130 and 1130 with lengths in the longitudinal directions (X-axial direction) the same as the length in the X-axial direction of the window part at the positions where the third parts 130 and 1130 are arranged are arranged so as to contact the region of the inner circumferential surface between the first corner area 101 and third corner area 103 and the region of the inner circumferential surface between the second corner area 102 and fourth corner area 104. Therefore, it is possible to arrange the third parts 130 and 1130 at positions corresponding to the two locations respectively where the first part 110 and second part 120 are made to abut in the X-axial direction (second direction). Therefore, when attaching the band 140, it is possible to more reliably keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Due to this, it is possible to keep the magnetic core 100 from deforming and failing to become the desired shape and to keep the core loss from increasing.

Further, in the present embodiment as well, it is possible to employ the various modifications explained in the first embodiment. For example, the number of the bent parts in one corner area is not limited to two. It may be three or more or may be one. Further, the third part 1130 need not be formed by grain-oriented electrical steel sheets (soft magnetic sheets). Further, the band 140 need not be used.

Third Embodiment

Next, a third embodiment will be explained. In the first embodiment, the case where the surface of the third part 130 was made to contact the inner circumferential surface between the first corner area 101 and third corner area 103 at the inner circumferential surfaces of the first part 110 and second part 120 was given as an example for the explanation. As opposed to this, in this embodiment, the surface of the third part is made to not contact the inner circumferential surfaces of the first part 110 and second part 120 but for at least parts of the surfaces of the end parts (end faces) in the longitudinal direction to contact the inner circumferential surfaces of the first part 110 and second part 120 between the first corner area 101 and second corner area 102 and the inner circumferential surfaces of the first part 110 and second part 120 between the third corner area 103 and fourth corner area 104. In this way, the present embodiment differs from the first embodiment mainly in the configuration of the third part. Therefore, in the explanation of the present embodiment, parts the same as the first embodiment will be assigned the same notations as the notations assigned to FIG. 1 to FIG. 10 and detailed expiations will be omitted.

Figure 12:
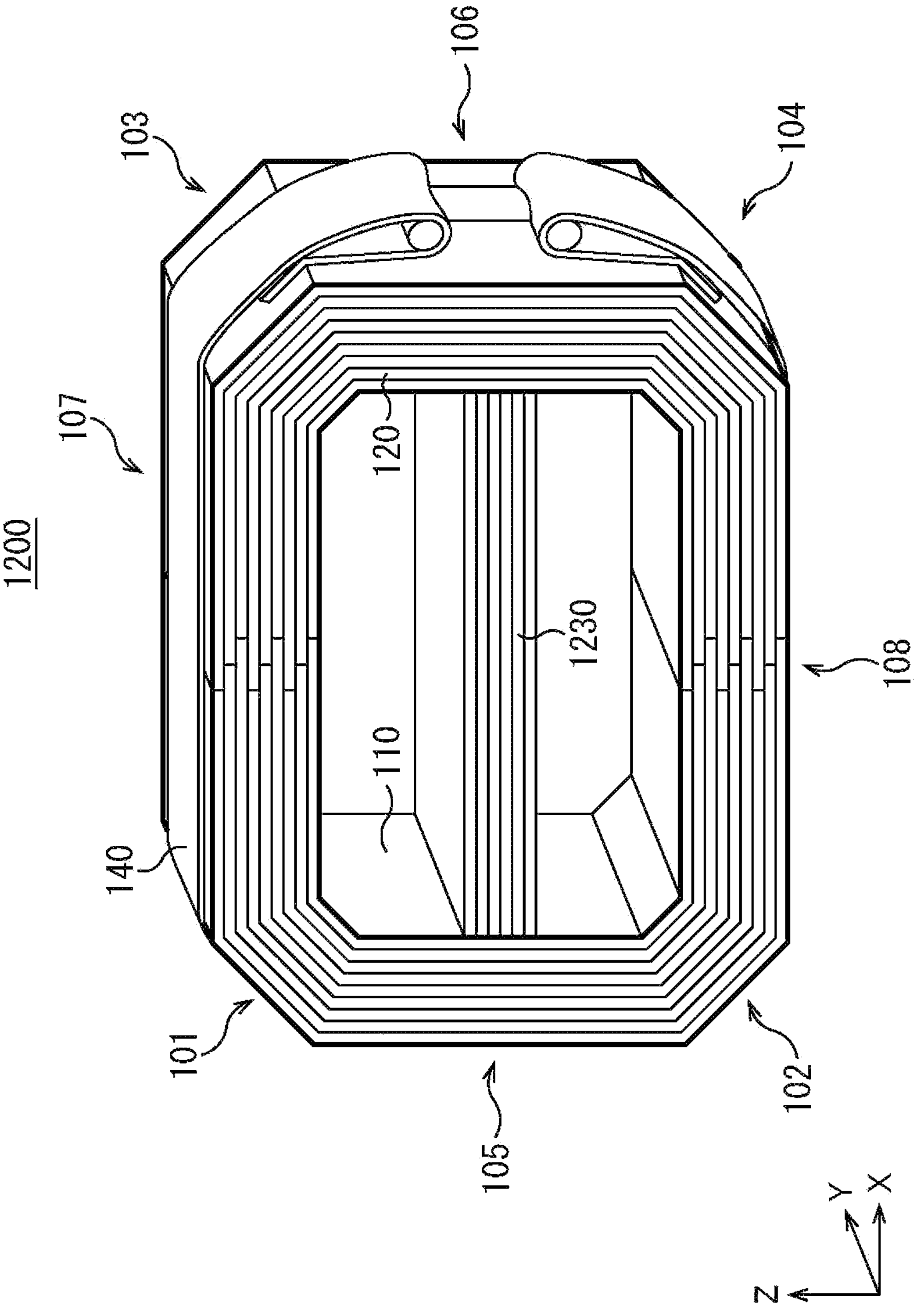
FIG. 12 is a view showing a third embodiment and viewing the magnetic core from an angle.

FIG. 12 is a view showing the magnetic core 1200 from an angle. FIG. 12 is a view corresponding to FIG. 1. In FIG. 12, in the same way as FIG. 1, for convenience in illustration, illustration of the windings (coils) set at the magnetic core 1200 is omitted.

In FIG. 12, the magnetic core 1200 has a first part 110, a second part 120, and a third part 1230. At the outer circumferential surface of the magnetic core 1200, a band 140 is attached. The band 140 has mounting hardware of the magnetic core 1200 etc. attached to it as well, but in FIG. 12, in the same way as FIG. 1, for convenience in illustration, illustration of the mounting hardware etc. is omitted.

Figure 13:
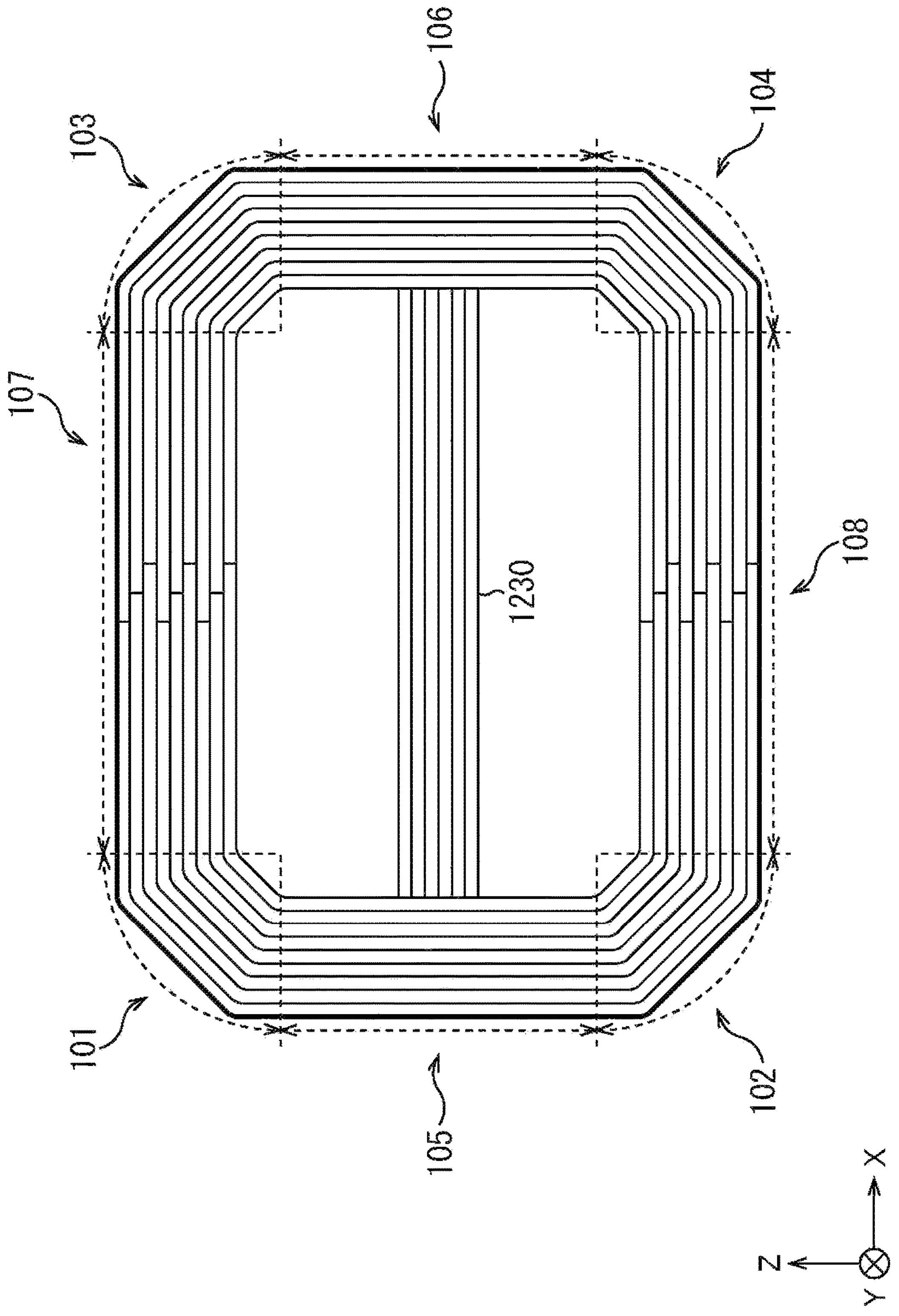
FIG. 13 is a view showing the third embodiment and viewing the magnetic core from the front.

FIG. 13 is a view showing the magnetic core 1200 from the front. In FIG. 13, in the same way as FIG. 2, for convenience in illustration, illustration of the windings (coils) and band set at the magnetic core 1200 is omitted.

The first part 110 and second part 120 are the same as those explained in the first embodiment.

The third part 1230 has a plurality of grain-oriented electrical steel sheets stacked so that the sheet surfaces are superposed over each other. The longitudinal directions of the grain-oriented electrical steel sheets (directions vertical to sheet width directions and sheet thickness directions) are the same as the rolling direction.

As shown in FIG. 12 and FIG. 13, the plurality of grain-oriented electrical steel sheets forming the third part 1230 of the present embodiment are flat sheets arranged so that their longitudinal directions become the X-axial direction (that is, flat sheets extending in the X-axial direction) (that is, the surfaces of the grain-oriented electrical steel sheets are not bent). Further, as shown in FIG. 12 and FIG. 13, the third part 1230 is arranged in the window part comprised of the region at the inside of the first part 110 and second part 120.

Further, the surfaces of the third part 1230 in the Z-axial direction (surfaces of the grain-oriented electrical steel sheets positioned at the positive direction-most side in the Z-axis and at the negative direction-most side in the Z-axis among the grain-oriented electrical steel sheets forming the third part 1230) do not contact the inner circumferential surfaces of the first part 110 and second part 120. The length of the third part 1230 in the X-axial direction is the same as the length of the window part from the inner circumferential surface of the first parallelepiped part 105 to the inner circumferential surface of the second parallelepiped part 106 in the X-axial direction. Therefore, the shapes of the surfaces of the grain-oriented electrical steel sheets forming the third part 1230 are all the same rectangular shapes. At least part (preferably all) of the surface (end face) of one end part (first end part) of the third part 1230 in the longitudinal direction contacts the inner circumferential surface of the first part 110 (first parallelepiped part 105) and at least part (preferably all) of the surface (end face) of the other end part (second end part) of the third part 1230 in the longitudinal direction contacts the inner circumferential surface of the second part 120 (second parallelepiped part 106).

The third part 1230 is arranged at a position avoiding the space where the coils 610 and 620 are set at the time of the later explained assembly. For example, the third part 1230 is arranged so that the position of the third part 1230 at the center of the grain-oriented electrical steel sheets in the sheet thickness direction becomes a position between the inner circumferential surface of the third parallelepiped part 107 and the inner circumferential surface of the fourth parallelepiped part 108 (that is, the position at the center of the window part in the Z-axial direction).

Next, one example of the method of manufacture of the magnetic core 1200 of the present embodiment will be explained.

The first part 110, second part 120, and coils 610 and 620 are the same as those explained in the first embodiment.

Regarding the third part 1230, first, the grain-oriented electrical steel sheets are cut into rectangular shapes so that the lengths in the width directions become the same as the lengths in the width directions of the grain-oriented electrical steel sheets forming the first part 110 and second part 120 and the lengths in the longitudinal directions become the same as the length of the window part (region at the inside of the first part 110 and second part 120) in the X-axial direction, that is, the length at the position in the X-axial direction where the grain-oriented electrical steel sheet is arranged. The shapes and sizes of the grain-oriented electrical steel sheets forming the third part 130 are the same.

Further, the grain-oriented electrical steel sheets cut into rectangular shapes are stacked with their surfaces superposed over each other to form a parallelepiped shape. The grain-oriented electrical steel sheets are fastened so as not to move. The grain-oriented electrical steel sheets can be fastened, for example, using a binder etc. The binder is preferably one having a magnetic property.

In this above way, the third part 130 is prepared. Further, the third part 1230 may be formed at the time of the later explained assembly.

Figure 14A:
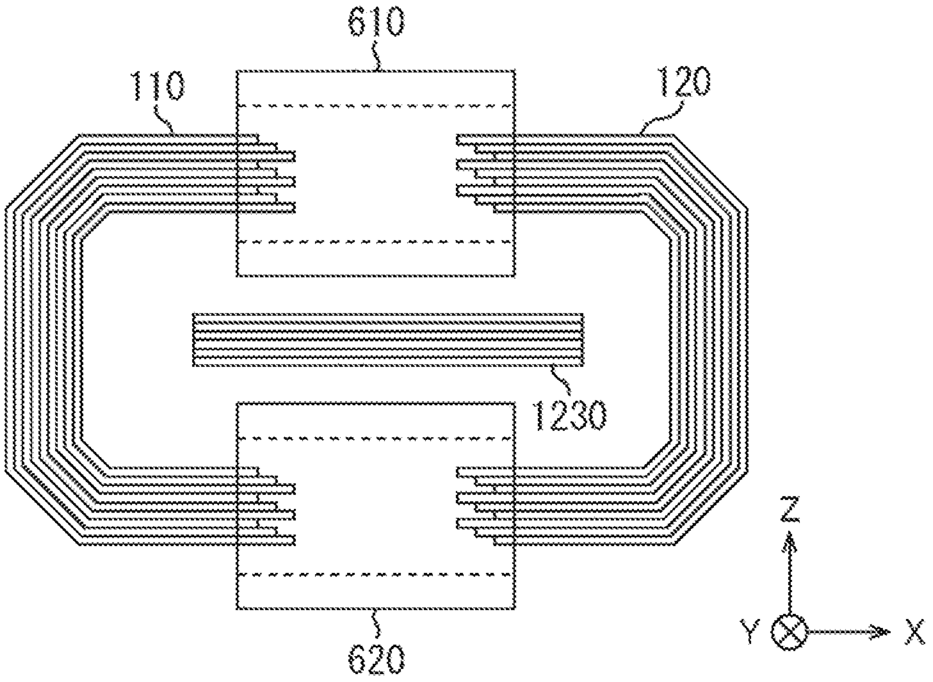
FIGS. 14A and 14B are schematic views showing the third embodiment and showing one example of the method of assembly.
Figure 14B:
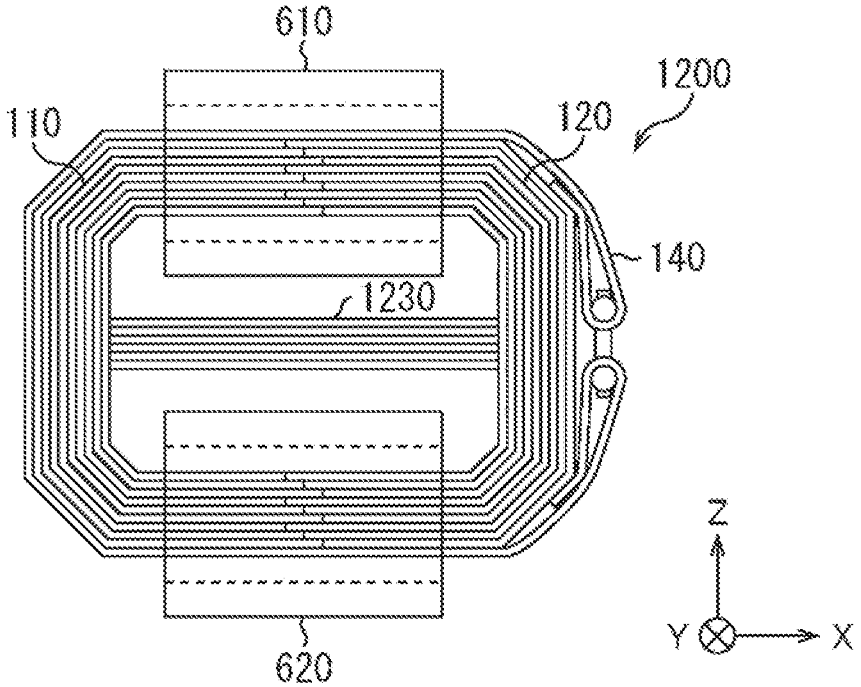

FIGS. 14A and 14B are schematic views showing one example of the method of assembly in the method of manufacture of the magnetic core 1200.

First, as shown in FIG. 14A, one end part (first end part) of the first part 110 and one end part (first end part) of the second part 120 are inserted into the hollow part of the coil 610 while the other end part (second end part) of the first part 110 and the other end part (second end part) of the second part 120 are inserted into the hollow part of the coil 620. Further, the third part 1230 is arranged between the coils 610 and 620.

Further, one end part (first end part) of the first part 110 and one end part (first end part) of the second part 120 are made to abut against each other in the X-axial direction (second direction) while the surface (end face) of the other end part (second end part) of the first part 110 and the surface (end face) of the other end part (second end part) of the second part 120 are made to abut against each other in the X-axial direction (second direction). At this time, at least one of the surface of the end part (end face) of the third part 1230 in the longitudinal direction and the regions of the inner circumferential surfaces of the first part 110 and second part 120 contacting the surface of the end part (end face) of the third part 1230 in the longitudinal direction is preferably coated with a binder in advance. This is because it is possible to more reliably fasten the third part 1230 to the first part 110 and second part 120. The binder is preferably one having a magnetic property.

Further, as shown in FIG. 14B, one end part (first end part) of the first part 110 and one end part (first end part) of the second part 120 are made to abut against each other in the X-axial direction (second direction) and the surface (end face) of the other end part (second end part) of the first part 110 and the surface (end face) of the other end part (second end part) of the second part 120 are made to abut against each other in the X-axial direction (second direction). At this time, the third part 1230 is arranged so that the third part 1230 becomes a predetermined position in a state having a distance from the coils 610 and 620. If at the time of the attachment of the band 140 explained later, the surface of the end part (end face) of the third part 1230 in the longitudinal direction contacts the inner circumferential surfaces of the first part 110 and second part 120, in that state, the surface of the end part (end face) of the third part 1230 in the longitudinal direction need not contact the inner circumferential surfaces of the first part 110 and second part 120.

Next, as shown in FIG. 14B, a band 140 is attached to the outer circumferential surfaces of the first part 110 and second part 120. At the time of attachment of the band 140, the end part of the third part 1230 in the longitudinal direction contacts the inner circumferential surfaces of the first part 110 and second part 120. By doing this, it is possible to keep the first part 110 from moving to the second part 120 side (positive direction side in X-axis) and to keep the second part 120 from moving to the first part 110 side (positive direction side in X-axis).

In the above way, in this embodiment, the third part 1230 is arranged at a position where its surfaces do not contact the inner circumferential surfaces of the first part 110 and second part 120 and at least parts of the surfaces of the end parts (end faces) in its longitudinal direction contact the inner circumferential surface of the first part 110 between the first corner area 101 and second corner area 102 and the inner circumferential surface of the second part 120 between the third corner area 103 and fourth corner area 104. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut in the X-axial direction (second direction) (joined parts) from becoming offset from the desired positions. Due to this, it is possible to keep the magnetic core 1200 from deforming and failing to become the desired shape and to keep the core loss from increasing.

Further, in the present embodiment as well, it is possible to employ the various modifications explained in the first and second embodiments. For example, the number of the bent parts in one corner area is not limited to two. It may be three or more or may be one. Further, the third part 1230 need not be formed by grain-oriented electrical steel sheets (soft magnetic sheets). Further, the band 140 need not be used.

Fourth Embodiment

Next, a fourth embodiment will be explained. In the first to third embodiments, the cases where flat grain-oriented electrical steel sheets (grain-oriented electrical steel sheets not bent at their surfaces) were stacked so that the surfaces were superposed over each other to thereby form the third parts 130, 1130, and 1230 were given as examples in the explanation. As opposed to this, in this embodiment, the outer circumferential surface of the third part is made to fit with the inner circumferential surfaces of the first part 110 and second part 120. In this way, the present embodiment differs from the first to third embodiments mainly in the configuration of the third part. Therefore, in the explanation of the present embodiment, parts the same as the first to third embodiments will be assigned the same notations as the notations assigned to FIG. 1 to FIGS. 14A and 14B and detailed expiations will be omitted.

Figure 15:
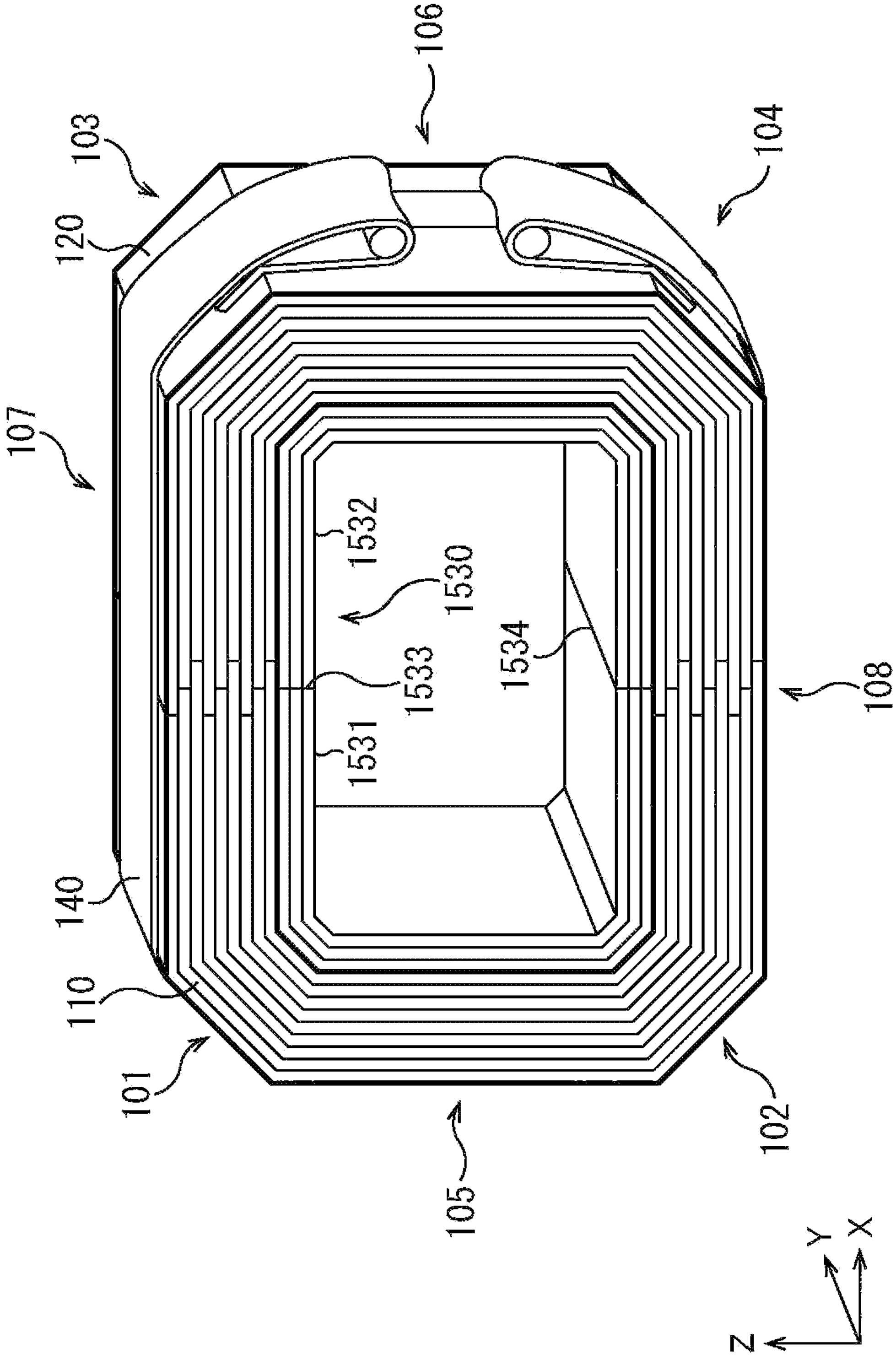
FIG. 15 is a view showing a fourth embodiment and viewing the magnetic core from an angle.

FIG. 15 is a view showing the magnetic core 1500 from an angle. FIG. 15 is a view corresponding to FIG. 1. In FIG. 15, in the same way as FIG. 1, for convenience in illustration, illustration of the windings (coils) set at the magnetic core 1500 is omitted.

In FIG. 15, the magnetic core 1500 has a first part 110, a second part 120, and a third part 1530. At the outer circumferential surface of the magnetic core 1500, a band 140 is attached. The band 140 is provided with mounting hardware etc. of the magnetic core 1500, but in FIG. 15, in the same way as FIG. 1, for convenience in illustration, illustration of the mounting hardware etc. is omitted.

Figure 16:
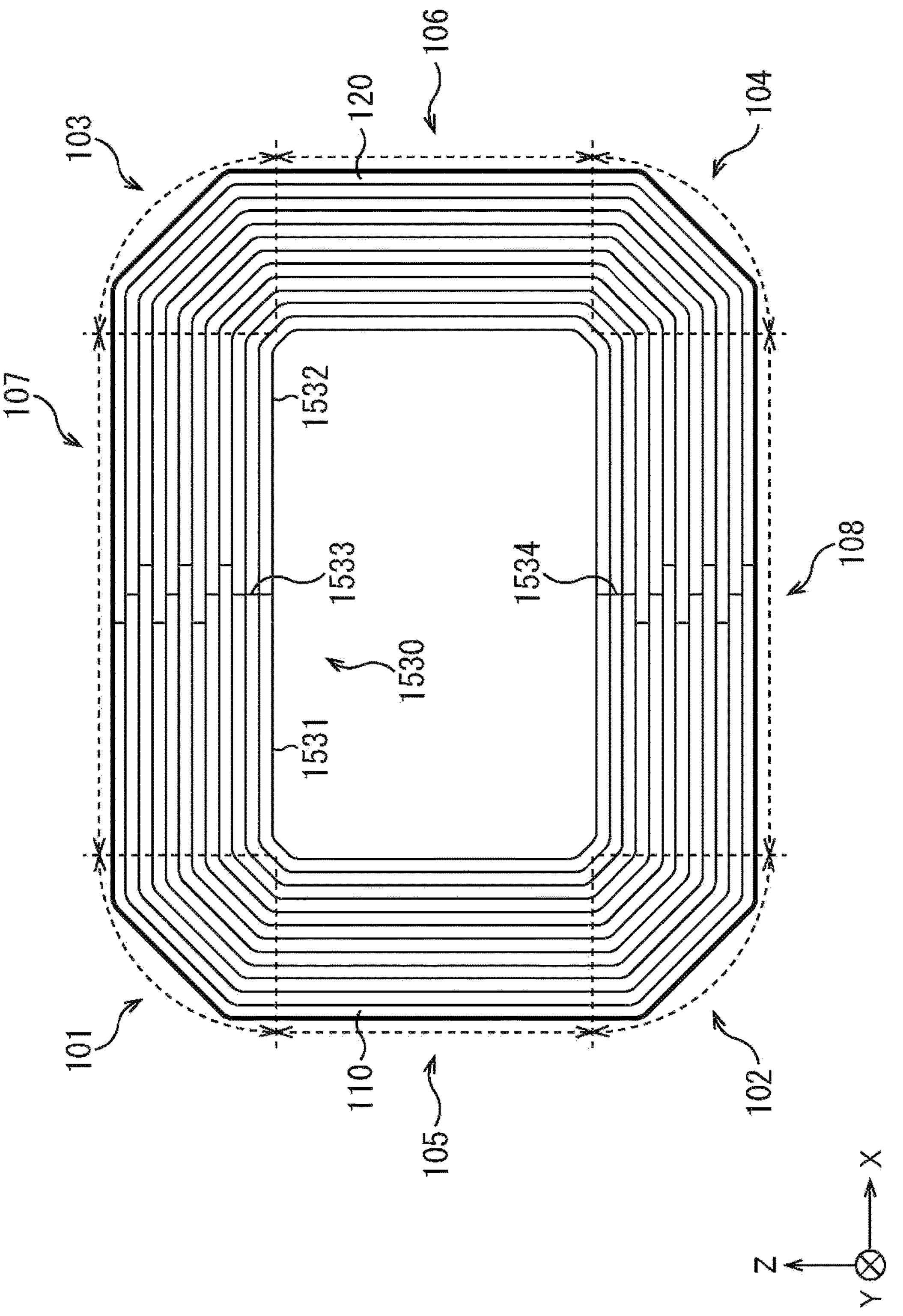
FIG. 16 is a view showing the fourth embodiment and viewing the magnetic core from the front.

FIG. 16 is a view showing the magnetic core 1500 from the front. In FIG. 16, in the same way as FIG. 2, for convenience in illustration, illustration of the windings (coils) and band set at the magnetic core 1500 is omitted.

The first part 110 and second part 120 are the same as those explained in the first embodiment.

The third part 1530 has a first small part 1531 and a second small part 1532.

The first small part 1531 has a plurality of grain-oriented electrical steel sheets which are respectively shaped bent at positions corresponding to the first corner area 101 and second corner area 102 and which plurality of grain-oriented electrical steel sheets are stacked so that the sheet surfaces are superposed over each other. The second small part 1532 has a plurality of grain-oriented electrical steel sheets which are respectively shaped bent at positions corresponding to the third corner area 103 and fourth corner area 104 and which plurality of grain-oriented electrical steel sheets are stacked so that the sheet surfaces are superposed over each other. The longitudinal directions of the grain-oriented electrical steel sheets (directions vertical to sheet width directions and sheet thickness directions) are the same as the rolling direction.

The outer circumferential surface of the first small part 1531 is configured so as to fit with the inner circumferential surface of the first part 110. Further, the lengths in the width directions of the grain-oriented electrical steel sheets forming the first small part 1531 are the same as the lengths in the width directions of the grain-oriented electrical steel sheets forming the first part 110 and second part 120.

Similarly, the outer circumferential surface of the second small part 1532 is configured so as to fit with the inner circumferential surface of the second part 120. Further, the lengths in the width directions of the grain-oriented electrical steel sheets forming the second small part 1532 are the same as the lengths in the width directions of the grain-oriented electrical steel sheets forming the first part 110 and second part 120.

As shown in FIG. 15 and FIG. 16, single end parts (first end parts) in the longitudinal directions of the grain-oriented electrical steel sheets forming the first small part 1531 and single end parts (first end parts) in the longitudinal directions of the grain-oriented electrical steel sheets forming the second small parts 1532 are rendered a state made to abut against each other in the X-axial direction (second direction). The positions in the circumferential direction of the magnetic core 1500 of the positions 1533 where they abut are the same in the X-axial direction (second direction). Similarly, the other end parts (second end parts) in the longitudinal directions of the grain-oriented electrical steel sheets forming the first small part 1531 and the other end parts (second end parts) in the longitudinal directions of the grain-oriented electrical steel sheets forming the second small parts 1532 are rendered a state made to abut against each other in the X-axial direction (second direction). The positions in the circumferential direction of the magnetic core 1500 of the positions 1534 where they are made to abut against each other are the same in the X-axial direction (second direction).

Therefore, without the surfaces in the longitudinal directions of the grain-oriented electrical steel sheets forming the first small part 1531 and the surfaces in the longitudinal directions of the grain-oriented electrical steel sheets forming the second small part 1532 being superposed, the surfaces of the end parts (end faces) in the longitudinal directions of the grain-oriented electrical steel sheets forming the first small part 1531 and the surfaces of the end parts (end faces) in the longitudinal directions of the grain-oriented electrical steel sheets forming the second small part 1532 are made to abut against each other in the X-axial direction (second direction).

In this way, the grain-oriented electrical steel sheets forming the third part 1530 are bent at positions corresponding to the first corner area 101, second corner area 102, third corner area 103, and fourth corner area 104. The outer circumferential surface of the third part 1530 is arranged in the state contacting the inner circumferential surfaces of the first part 110 and second part.

Further, as shown in FIG. 15 and FIG. 16, the surfaces of the end parts (end faces) of the grain-oriented electrical steel sheets forming the third part 1530 are made to abut against each other at the positions 1533 between the first corner area 101 and third corner area 103 and the positions 1534 between the second corner area 102 and fourth corner area 104. In the example shown in FIG. 15 and FIG. 16, the positions 1533 are made intermediate positions between the first corner area 101 and third corner area 103, but there is not necessarily a need for them to be intermediate positions between the first corner area 101 and third corner area 103. Similarly, the positions 1534 also do not have to be intermediate positions between the second corner area 102 and fourth corner area 104.

Next, one example of the method of manufacture of the magnetic core 1200 of the present embodiment will be explained.

The first part 110, second part 120, and coils 610 and 620 are the same as those explained in the first embodiment.

Regarding the third part 1530, when assembling the first small part 1531 and the second small part 1532, the length in the longitudinal direction, length in the width direction, regions forming the corner areas, positions of bent parts, and bent angles of the grain-oriented electrical steel sheet positioned at the outermost circumference of the grain-oriented electrical steel sheets forming the first small part 1531 and the length in the longitudinal direction, length in the width direction, regions forming the corner areas, and positions of bent parts, and bent angles of the grain-oriented electrical steel sheet positioned at the outermost circumference of the grain-oriented electrical steel sheets forming the second small part 1532 are respectively determined so that their outer circumferential surfaces become the same as the inner circumferential surfaces of the first part 110 and second part 120.

Further, to prevent the formation of gaps between two adjoining layers of grain-oriented electrical steel sheets forming the first small part 1531 and second small part 1532, the lengths in the longitudinal direction, lengths in the width direction, regions forming the corner areas, and positions and bent angles of bent parts of the grain-oriented electrical steel sheets are determined so that, at the two adjoining layers of grain-oriented electrical steel sheets, the outer circumferential surface of the grain-oriented electrical steel sheet arranged at the inside and the inner circumferential surface of the grain-oriented electrical steel sheet arranged at the outside are made to become equal.

The grain-oriented electrical steel sheets are cut in accordance with the thus determined lengths in the longitudinal directions and lengths in the width directions of the grain-oriented electrical steel sheets so that the longitudinal directions become the rolling direction. Further, the cut grain-oriented electrical steel sheets are bent in accordance with the above determined positions and bent angles of the bent parts. The method of bending is the same as the method of bending the grain-oriented electrical steel sheets forming the first part 110 and second part 120, so here, detailed explanations will be omitted. In the same way as the first part 110 and second part 120, in the third part 1530 (first small part 1531 and second small part 1532) as well, the radii of curvature "r" at the bent parts of the grain-oriented electrical steel sheets stacked in the sheet thickness direction are set to match and worked, but the radii of curvature of the worked grain-oriented electrical steel sheets sometimes suffer from error due to the roughnesses and shapes of the surfaces of the steel sheets. Even if error occurs, the error is preferably 0.1 mm or less.

Further, the thus bent grain-oriented electrical steel sheets are relieved of stress of the bent parts by annealing.

The grain-oriented electrical steel sheets are stacked so that the surfaces of the grain-oriented electrical steel sheets bent and annealed for stress relief are superposed over each other so that the first small part 1531 and second small part 1532 are formed. In this way, the third part 1530 (first small part 1531 and second small part 1532) is prepared. At this time, the grain-oriented electrical steel sheets forming the first small part 1510 and second small part 1532 may be fixed in positions so as not to become offset. Further, the first small part 1510 and second small part 1532 may be formed at the time of assembly explained later.

After the grain-oriented electrical steel sheets forming the first part 110, second part 120, and third part 1530 and coils 610 and 620 are prepared in this way, they are assembled.

Figure 17A:
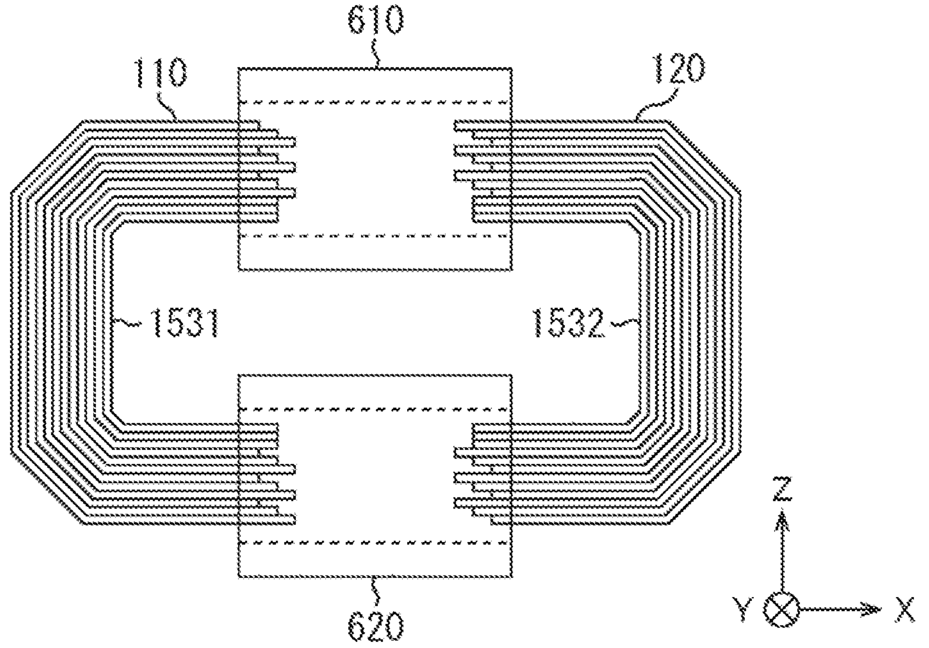
FIGS. 17A and 17B are schematic views showing the fourth embodiment and showing one example of the method of assembly.
Figure 17B:
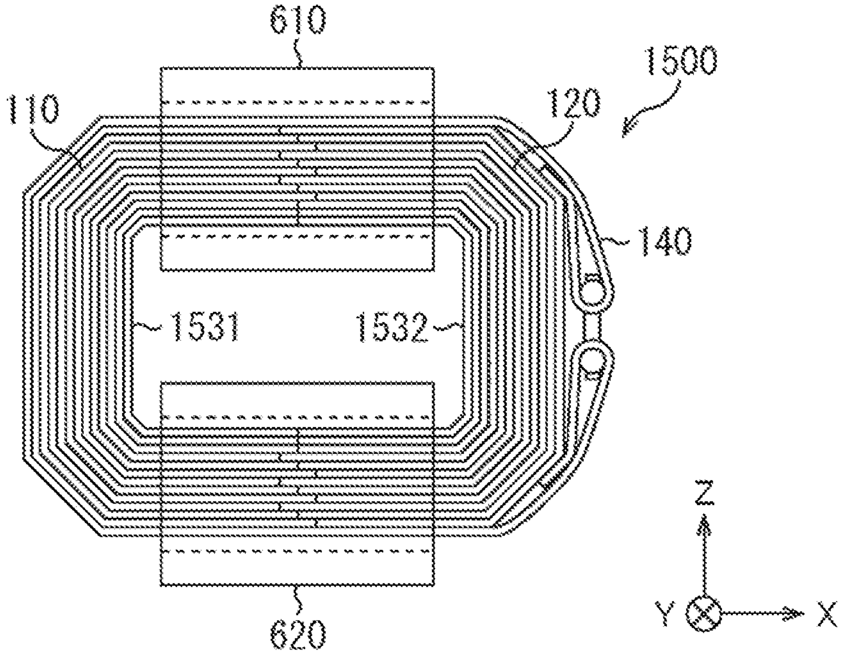

FIGS. 17A and 17B are schematic views showing one example of the method of assembly in the method of manufacture of the magnetic core 1500.

First, as shown in FIG. 17A, the outer circumferential surface of the first small part 1531 is fit with the inner circumferential surface of the first part 110 and the outer circumferential surface of the second small part 1532 is fit with the inner circumferential surface of the second part 120. In that state, single end parts (first end parts) of the first part 110 and first small part 1531 and single end parts (first end parts) of the second part 120 and second small part 1532 are inserted into the hollow part of the coil 610. At the same time as this, the other end parts (second end parts) of the first part 110 and first small part 1531 and the other end parts (second end parts) of the second part 120 and second small part 1532 are inserted into the hollow part of the coil 620.

Further, single end parts (first end parts) of the first part 110 and first small part 1531 and single end parts (first end parts) of the second part 120 and second small part 1532 are made to abut against each other in the X-axial direction (second direction) and other end parts (second end parts) of the first part 110 and first small part 1531 and other end parts (second end parts) of the second part 120 and second small part 1532 are made to abut against each other in the X-axial direction (second direction).

Next, as shown in FIG. 17B, a band 140 is attached to the outer circumferential surfaces of the first part 110 and second part 120. When attaching the band 140, the first part 110 and second part 120 are fastened.

In this way, in this embodiment, the third part 1530 is formed into a ring shape by combining the first small part 1531 and second small part 1532 so that their outer circumferential surfaces fit with the inner circumferential surfaces of the first part 110 and second part 120. Therefore, the length of the third part 1530 in the X-axial direction is the same as the length in the X-axial direction of the window part comprised of the region at the inside of the first part 110 and second part 120 so that the third part 1530 contacts the region of the inner circumferential surface of the window part. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut against each other in the X-axial direction (second direction) (joined parts) from becoming offset from the desired positions. Due to this, it is possible to keep the magnetic core 1200 from deforming and failing to become the desired shape and to keep the core loss from increasing.

Further, in this embodiment, the sides where the first part 110 and second part 120 abut and the sides where the first small part 1531 and second small part 1532 abut can be made the same. Therefore, the work of assembling the magnetic core 1500 becomes easy.

However, the surfaces of the end parts (end faces) of the grain-oriented electrical steel sheets forming the third part 1530 may be made to abut against each other at least at one of between the first corner area 101 and third corner area 103 and between the second corner area 102 and fourth corner area 104. For example, the surfaces of the end parts (end faces) of the grain-oriented electrical steel sheets forming the third part 1530 can be made to abut against each other only between the first corner area 101 and third corner area 103.

FIGS. 18A to 18C and FIGS. 19A and 19B are schematic views showing one example of the method of assembly in the method of manufacture of the magnetic core 1800.

Figure 18A:
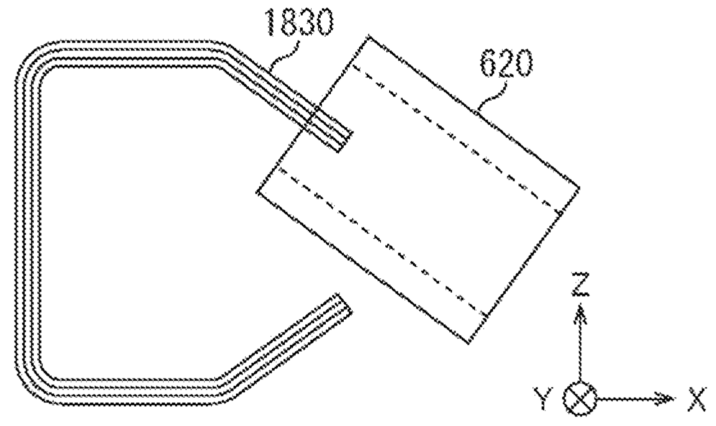
FIGS. 18A to 18C are schematic views showing a modification of the fourth embodiment and showing one example of the method of assembly.
Figure 18B:
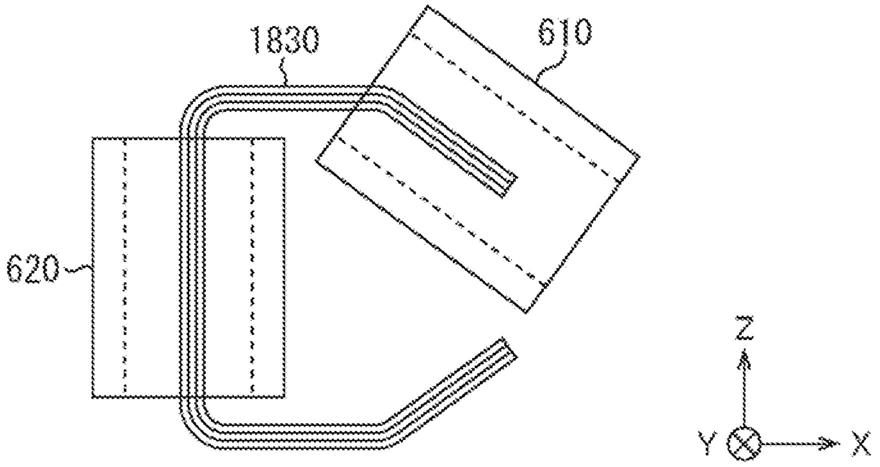

In FIG. 18A, the third part 1830 is comprised of a first small part 1531 and second small part 1532 connected at a position 1534 (that is, the third part 1830 is not separated at the position 1534). Therefore, the third part 1830 is not divided into two small parts. As shown in FIG. 18A, the elasticity of the grain-oriented electrical steel sheets is utilized to form a gap at the end parts in the longitudinal directions of the grain-oriented electrical steel sheets forming the third part 1830. Further, that gap is used to pass the third part 1830 through the hollow part of the coil 620. As shown in FIG. 18B, the coil 620 is made to move to the region at the opposite side to the region where the gap is.

Figure 18C:
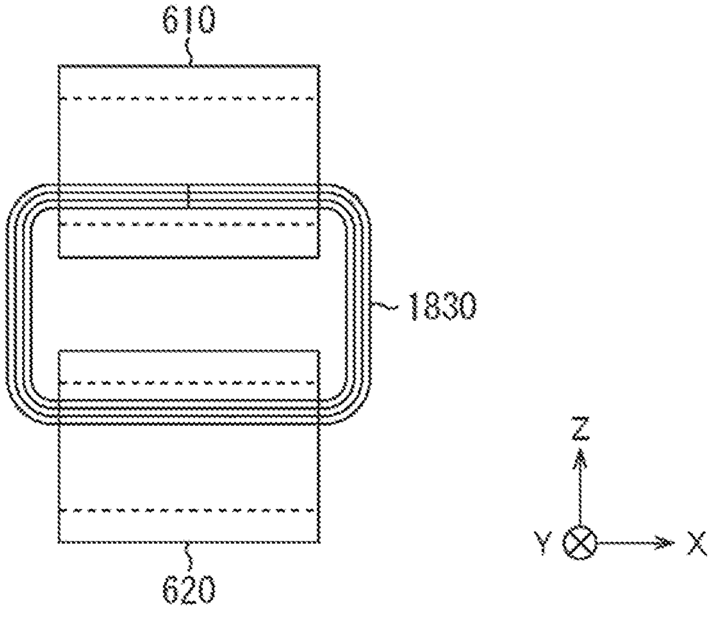

Next, as shown in FIG. 18B, the state is made one where the above-mentioned gap is formed and the third part 1830 is inserted into the hollow part of the coil 610. Further, as shown in FIG. 18C, further, one end part (first end part) and the other end part (second end part) of the third part 1830 are made to abut against each other in the X-axial direction (second direction). In that state, the end parts in the longitudinal directions of the grain-oriented electrical steel sheets forming the third part 1830 are positioned inside the hollow part of the coil 610.

Figure 19A:
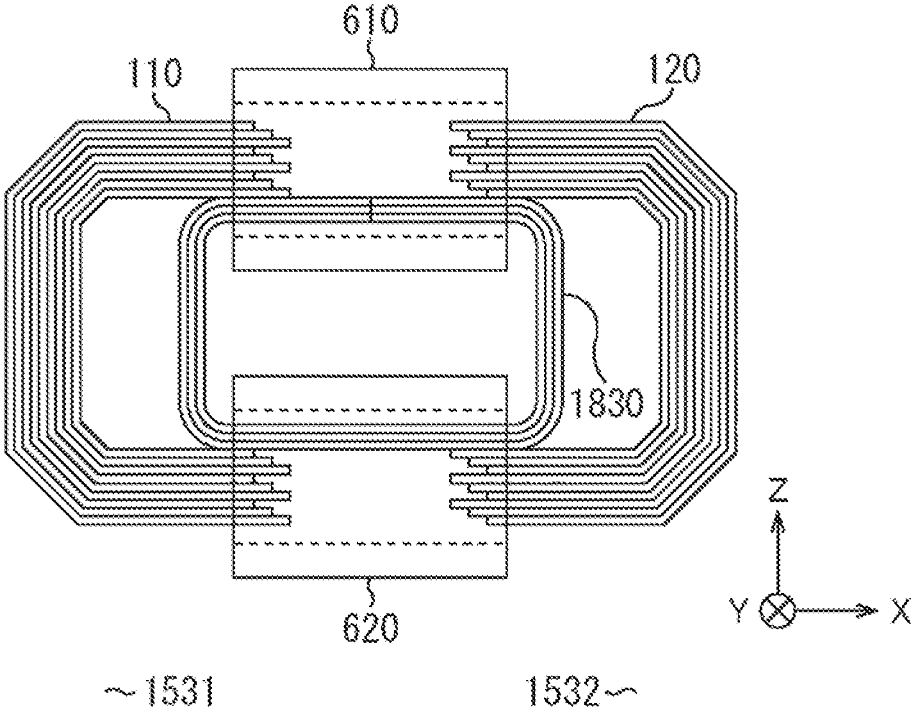
FIGS. 19A and 19B are schematic views showing one example of the method of assembly continuing from FIGS. 18A to 18C.

Next, as shown in FIG. 19A, the outer circumferential surface of the third part 1830 is rendered a state fit with the inner circumferential surface of the first part 110 and the third part 1830 rendered a state fit with the inner circumferential surface of the second part 120. Further, one end part (first end part) of the first part 110 and one end part (first end part) of the second part 120 are inserted in the hollow part of the coil 610. At the same time as this, the other end part (second end part) of the first part 110 and the other end part (second end part) of the second part 120 are inserted in the hollow part of the coil 620.

Figure 19B:
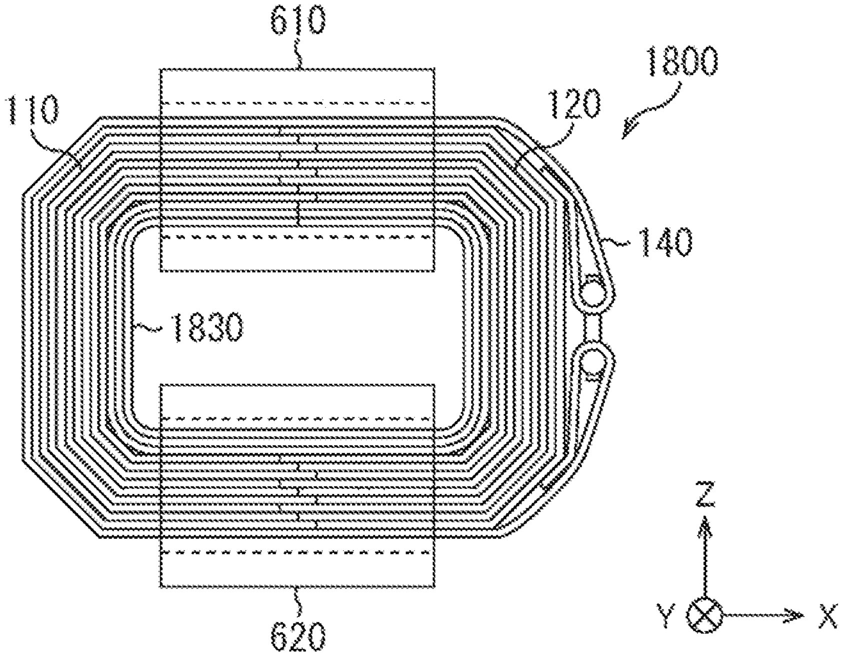

Further, as shown in FIG. 19B, one end part (first end part) of the first part 110 and one end part (first end part) of the second part 120 are fit together and the surface (end face) of the other end part (second end part) of the first part 110 and the surface (end face) of the other end part (second end part) of the second part 120 are fit together.

Next, as shown in FIG. 19B, a band 140 is attached to the outer circumferential surfaces of the first part 110 and second part 120. When attaching the band 140, the first part 110 and second part 120 are fastened.

By doing the above, the locations where the surfaces of the end parts (end faces) of the grain-oriented electrical steel sheets forming the third part 1830 are made to abut against each other in the X-axial direction (second direction) become single locations in the same layers (same stacking positions). Therefore, compared with the third part 1530, the core loss can be reduced. Further, as shown in FIG. 19A, in the assembly work, when one end part (first end part) of the first part 110 and one end part (first end part) of the second part 120 are inserted into the hollow part of the coil 610 and the other end part (second end part) of the first part 110 and the other end part (second end part) of the second part 120 are inserted into the hollow part of the coil 620, the outer circumferential surface of the third part 1830 in the Z-axial direction is rendered a state contacting the inner circumferential surfaces of the first part 110 and second part 120 in the Z-axial direction. Therefore, when fitting together the first part 110 and the second part 120, the third part 130 functions as a guide positioning the first part 110 and the second part 120 in the Z-axial direction. In particular, when viewing the magnetic core 1500 from the front, the magnetic core 1500 is an octagonal angular shape, so it is possible to raise the precision of working the first part 110, second part 120, and third part 1530, so the third part 130 is improved in function as a guide.

When fitting together the first part 110 and the second part 120, if the relative positions of the first part 110 and second part 120 become offset in the Z-axial direction, the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 cannot be accurately fit together.

According to the magnetic core 1800 shown in FIGS. 19A and 19B, when combining the first part 110 and second part 120, the third part 1830 functions as a guide positioning the first part 110 and second part 120 in the Z-axial direction. Therefore, when fitting together the first part 110 and second part 120, it is possible to keep the relative positions of the first part 110 and second part 120 from ending up being offset in the Z-axial direction and the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 can be fit together at accurate positions in the Z-axial direction. Therefore, it is possible to reliably make end faces of the grain-oriented electrical steel sheets forming the first part 110 and the second part 120 contact each other. However, as will be understood if comparing FIGS. 17A and 17B and FIGS. 18A to 18C and FIGS. 19A and 19B, in FIGS. 17A and 17B, when fitting together the first part 110 and second part 120, it is possible to simultaneously fit together 1531 and 1532 of the third part 1830. Therefore, the number of steps of the assembly work becomes smaller in the magnetic core 1500 compared with the magnetic core 1800. Therefore, by giving priority to either of reduction of core loss and the burden in assembly work, it is possible to determine which of the magnetic cores 1500 and 1800 to employ.

Further, the surfaces of the end parts (end faces) of the grain-oriented electrical steel sheets forming the third part 1530 may also be made to abut against each other only between the second corner area 102 and fourth corner area 104 in the X-axial direction (second direction).

Further, in the present embodiment as well, it is possible to employ the various modifications explained in the first to the third embodiments. For example, the number of the bent parts in one corner area is not limited to two. It may be three or more or may be one. Further, the third parts 1530 and 1830 need not be formed by grain-oriented electrical steel sheets (soft magnetic sheets). Further, the band 140 need not be used.

Fifth Embodiment

Next, a fifth embodiment will be explained. In the fourth embodiment, the case where the surfaces of the end parts (end faces) of the grain-oriented electrical steel sheets forming the third part were made to abut against each other between the first corner area 101 and third corner area 103 and/or between the second corner area 102 and fourth corner area 104 in the X-axial direction (second direction) was given as an example in the explanation. As opposed to this, in this embodiment, the case where the surfaces of the end parts (end faces) of the grain-oriented electrical steel sheets forming the third part are made to abut against each other between the first corner area 101 and second corner area 102 and/or between the third corner area 103 and fourth corner area 104 in the Z-axial direction (first direction) will be explained. In this way, the present embodiment mainly differs from the first to fourth embodiments in the configuration of the third part. Therefore, in the explanation of the present embodiment, parts the same as the first to fourth embodiments will be assigned the same notations as the notations assigned to FIG. 1 to FIGS. 19A and 19B and detailed expiations will be omitted.

Figure 20:
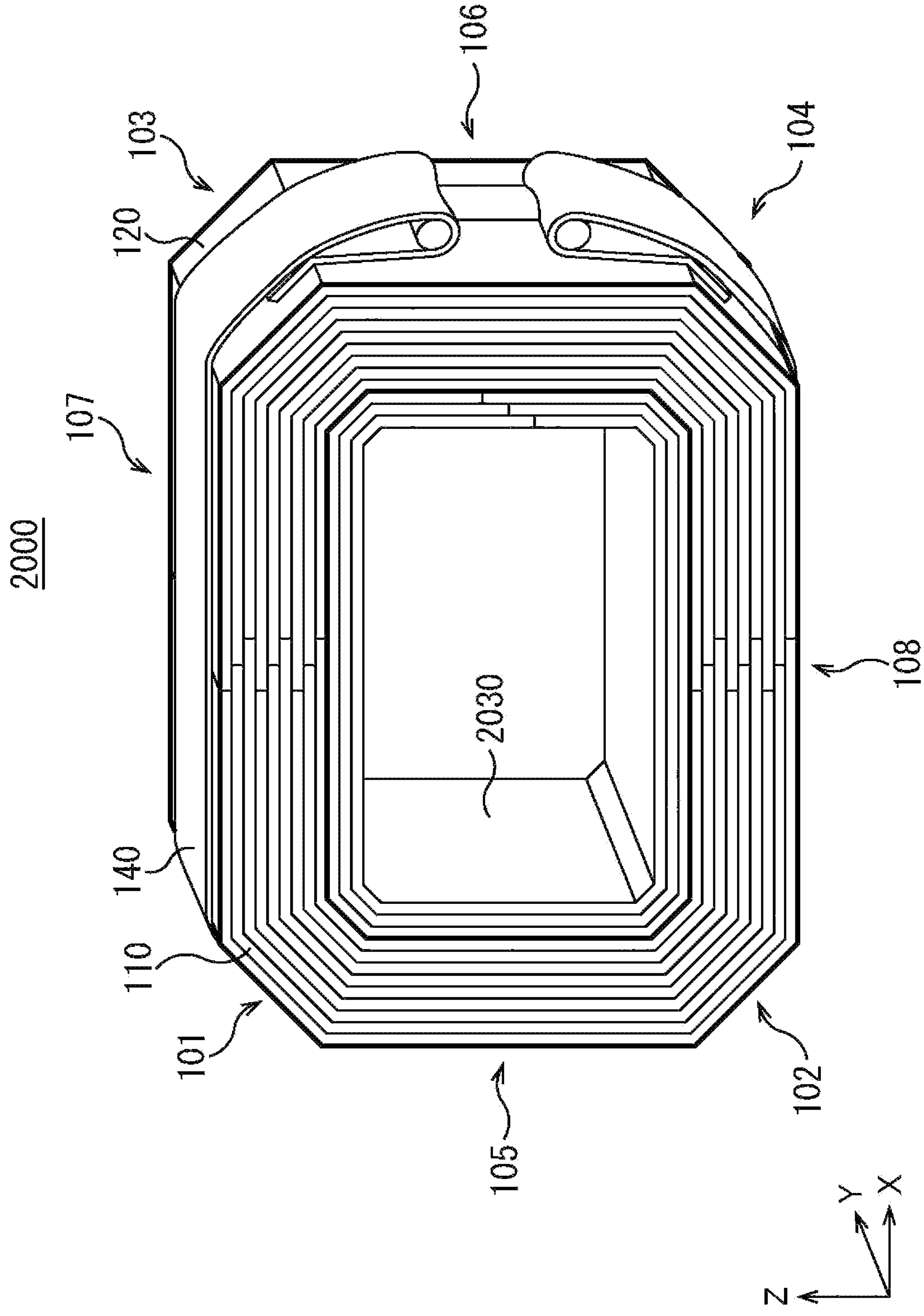
FIG. 20 is a view showing a fifth embodiment and viewing the magnetic core from an angle.

FIG. 20 is a view showing the magnetic core 2000 from an angle. FIG. 20 is a view corresponding to FIG. 1. In FIG. 20, in the same way as FIG. 1, for convenience in illustration, illustration of the windings (coils) set at the magnetic core 2000 is omitted.

In FIG. 20, the magnetic core 2000 has a first part 110, a second part 120, and a third part 2030. At the outer circumferential surface of the magnetic core 2000, a band 140 is attached. The band 140 has mounting hardware of the magnetic core 2000 etc. attached to it as well, but in FIG. 20, in the same way as FIG. 1, for convenience in illustration, illustration of the mounting hardware etc. is omitted.

Figure 21:
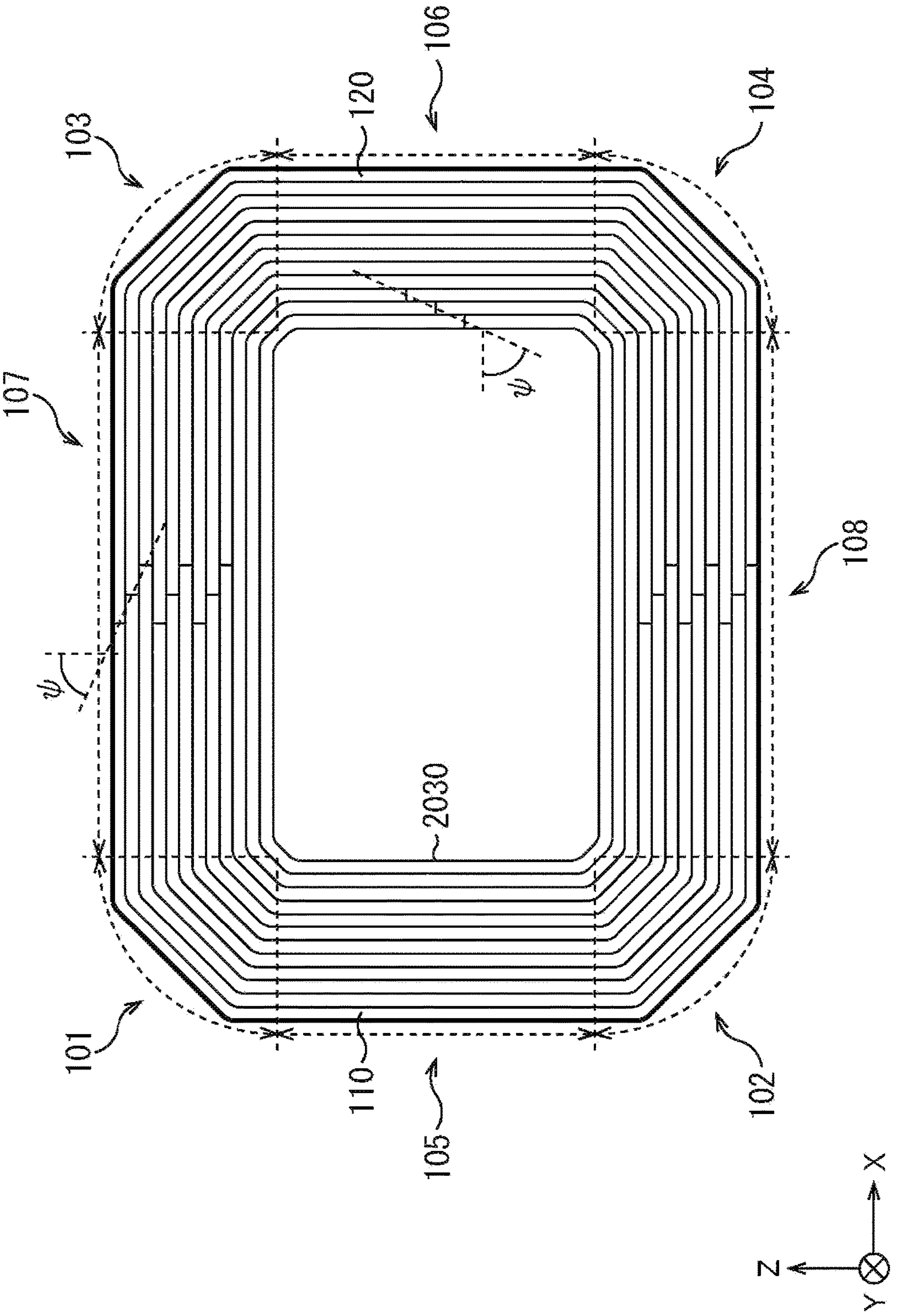
FIG. 21 is a view showing the fifth embodiment and viewing the magnetic core from the front.

FIG. 21 is a view showing the magnetic core 2000 from the front. In FIG. 21, in the same way as FIG. 2, for convenience in illustration, illustration of the windings (coils) and band set at the magnetic core 2000 is omitted.

The first part 110 and second part 120 are the same as those explained in the first embodiment.

The third part 2030 has a plurality of grain-oriented electrical steel sheets which are shaped bent at positions corresponding to the first corner area 101, second corner area 102, third corner area 103, and fourth corner area 104 and which plurality of grain-oriented electrical steel sheets are stacked so that their surfaces are superposed over each other. The longitudinal directions of the grain-oriented electrical steel sheets (directions vertical to sheet width directions and sheet thickness directions) are the same as the rolling direction.

The outer circumferential surface of the third part 2030 is configured so as to fit with the inner circumferential surfaces of the first part 110 and second part 120. Further, the lengths in the width directions of the grain-oriented electrical steel sheets forming the third part 2030 are the same as lengths in the width directions of the grain-oriented electrical steel sheets forming the first part 110 and second part 120. The surfaces (end faces) of single end parts (first end parts) and the surfaces (end faces) of the other end parts (second end parts) in the longitudinal directions of the grain-oriented electrical steel sheets forming the third part 2030 are made to abut against each other in the Z-axial direction (first direction) in the region between the third corner area 103 and fourth corner area 104. At this time, the surfaces (end faces) of single end parts (first end parts) and surfaces (end faces) of the other end parts (second end parts) in the longitudinal directions of the grain-oriented electrical steel sheets forming the third part 2030 are made to abut against each other in the Z-axial direction (first direction) so that the surfaces of the grain-oriented electrical steel sheets forming the third part 2030 are superposed over each other.

Furthermore, as shown in FIG. 20 and FIG. 21, the positions in the circumferential direction of the magnetic core 100 of the locations where the surfaces (end faces) of the single end parts (first end parts) and the surfaces (end faces) of the other end parts (second end parts) in the longitudinal directions of the grain-oriented electrical steel sheets forming the third part 2030 are made to abut against each other in the Z-axial direction (first direction) (joined parts) become positions offset in the Z-axial direction (first direction).

Furthermore, the method of offset in the X-axial direction (second direction) of the positions in the circumferential direction of the magnetic core 2000 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) becomes the same as the method of offset in the Z-axial direction (first direction) of the positions in the circumferential direction of the magnetic core 2000 of the locations where the surfaces of single end parts (first end faces) and the surfaces of the other end parts (second end faces) in the longitudinal directions of the grain-oriented electrical steel sheets forming the third part 2030 are made to abut against each other in the Z-axial direction (first direction) (joined parts).

That is, as shown in FIG. 21, the angle V of the acute angle formed by the direction in which the positions in the circumferential direction of the magnetic core 100 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) are offset in the X-axial direction (second direction) and the sheet thickness direction (Z-axial direction) of the grain-oriented electrical steel sheets and the angle V of the acute angle formed by the direction in which the positions in the circumferential direction of the magnetic core 2000 of the locations where the surfaces (end faces) of single end parts (first end parts) and the surfaces (end faces) of the other end parts (second end parts) in the longitudinal directions of the grain-oriented electrical steel sheets forming the third part 2030 are made to abut against each other in the Z-axial direction (first direction) (joined parts) are offset in the Z-axial direction (first direction) and the sheet thickness direction (X-axial direction) of the grain-oriented electrical steel sheets are made to become the same. The directions of offset of the positions in the circumferential direction of the magnetic core 100 in the X-axial direction (second direction) and Z-axial direction (first direction), for example, as shown in FIG. 21, are the directions of extension of the virtual lines connecting the centers of the grain-oriented electrical steel sheets forming the joined parts of one period in the sheet thickness direction when viewing the magnetic core 2000 from the sheet width directions (Y-axial direction) of the grain-oriented electrical steel sheets.

Furthermore, the period of offset in the X-axial direction (second direction) of the positions in the circumferential direction of the magnetic core 100 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) is made the same as the period of offset in the Z-axial direction (first direction) of the positions in the circumferential direction of the magnetic core 100 of the locations where the surfaces (end faces) of single end parts (first end parts) and the surfaces (end faces) of the other end parts (second end parts) in the longitudinal directions of the grain-oriented electrical steel sheets forming the third part 2030 are made to abut against each other in the Z-axial direction (first direction) (joined parts).

In the example shown in FIG. 20 and FIG. 21, the positions in the circumferential direction of the magnetic core 100 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) are periodically offset in the X-axial direction (second direction) by period of three sheets. Accordingly, the positions in the circumferential direction of the magnetic core 100 of the locations where the surfaces (end faces) of single end parts (first end parts) and the surfaces (end faces) of the other end parts (second end parts) in the longitudinal directions of the grain-oriented electrical steel sheets forming the third part 2030 are also periodically offset in the Z-axial direction (first direction) by period of three sheets.

Further, in FIG. 20 and FIG. 21, there are three grain-oriented electrical steel sheets forming the third part 2030, so only one period is shown as the period of offset in the Z-axial direction (first direction) of the positions in the circumferential direction of the magnetic core 100 of the locations where the surfaces (end faces) of single end parts (first end parts) and the surfaces (end faces) of the other end parts (second end parts) in the longitudinal directions of the grain-oriented electrical steel sheets forming the third part 2030 are made to abut against each other in the Z-axial direction (first direction) (joined parts).

Next, one example of the method of manufacture of the magnetic core 2000 of the present embodiment will be explained.

The first part 110, second part 120, and coils 610 and 620 are the same as those explained in the first embodiment.

Regarding the third part 2030, the length in the longitudinal direction, length in the width direction, regions forming the corner areas, and positions and bent angles of bent parts of the grain-oriented electrical steel sheet positioned at the outermost circumference of the grain-oriented electrical steel sheets forming the third part 2030 are determined so that their outer circumferential surfaces become the same as the inner circumferential surfaces of the first part 110 and second part 120.

Next, as shown in FIG. 20 and FIG. 21, the lengths in the longitudinal directions, lengths in the width directions, regions forming the corner areas, and positions and bent angles of bent parts of the grain-oriented electrical steel sheets are determined so that the positions in the circumferential direction of the magnetic core 100 of the locations where the surfaces (end faces) of single end parts (first end parts) and the surfaces (end faces) of the other end parts (second end parts) in the longitudinal directions of the grain-oriented electrical steel sheets forming the third part 2030 are made to abut against each other in the Z-axial direction (first direction) (joined parts) are periodically offset in the Z-axial direction (first direction).

Further, when the surfaces (end faces) of single end parts (first end parts) and surfaces (end faces) of the other end parts (second end parts) in the longitudinal directions of the grain-oriented electrical steel sheets forming the third part 2030 are made to abut against each other in the Z-axial direction (first direction), to prevent a gap from forming between two adjoining layers of the grain-oriented electrical steel sheets forming the third part 2030, the lengths in the longitudinal directions, lengths in the width directions, regions forming the corner areas, and positions and bent angles of bent parts of the grain-oriented electrical steel sheets are determined so that in the two adjoining layers of the grain-oriented electrical steel sheets, the outer circumferential length of a grain-oriented electrical steel sheet arranged at the inside and the inner circumferential length of a grain-oriented electrical steel sheet arranged at the outside become equal.

Together with the above such determined lengths in the longitudinal directions and lengths in the width directions of the grain-oriented electrical steel sheets, the grain-oriented electrical steel sheets are cut so that the longitudinal directions become the rolling direction. Further, the cut grain-oriented electrical steel sheets are bent in accordance with the above such determined positions and bent angles of the bent parts. The method of bending is the same as the method of bending of the grain-oriented electrical steel sheets forming the first part 110 and second part 120, so here the detailed explanation will be omitted. In the same way as the first part 110 and second part 120, in the third part 2030 as well, the radii of curvature "r" at the bent parts of the grain-oriented electrical steel sheets stacked in the sheet thickness direction are set to match in working the sheets, but the radii of curvature of the worked grain-oriented electrical steel sheets sometimes suffer from error due to the roughnesses and shapes of the surfaces of the steel sheets. Even if error occurs, the error is preferably 0.1 mm or less.

Further, the thus bent grain-oriented electrical steel sheets are relieved of stress of the bent parts by annealing.

The thus grain-oriented electrical steel sheets are stacked so that the surfaces of the grain-oriented electrical steel sheets bent and annealed for stress relief are superposed over each other so that the third part 2030 is formed. In this way, the third part 2030 is prepared. At this time, the grain-oriented electrical steel sheets forming the third part 2030 may be fixed in positions so as not to become offset. Further, the third part 2030 may be formed at the time of assembly explained later.

After the grain-oriented electrical steel sheets forming the first part 110, second part 120, and third part 3030 and coils 610 and 620 are prepared in this way, they are assembled.

FIGS. 22A to 22C and FIGS. 23A and 23B are views explaining one example of the method of assembly in the method of manufacture of the magnetic core 3000.

Figure 22A:
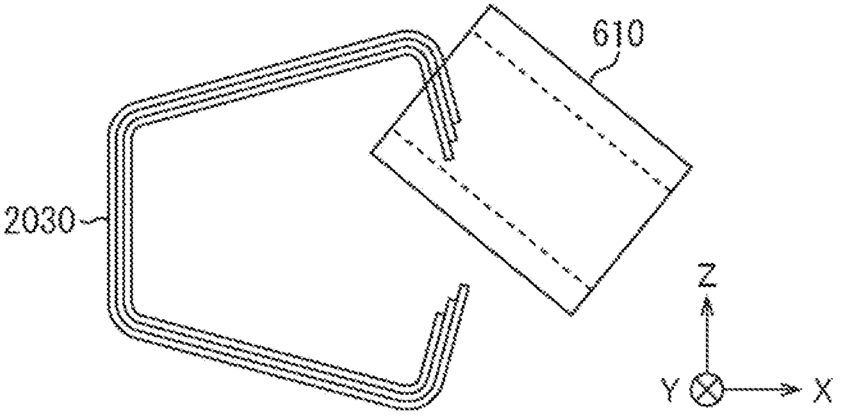
FIGS. 22A to 22C are schematic views showing the fifth embodiment and showing one example of the method of assembly.

As shown in FIG. 22A, the elasticity of the grain-oriented electrical steel sheets is utilized to form a gap at the end parts in the longitudinal directions of the grain-oriented electrical steel sheets forming the third part 2030. The third part 2030 is passed through the hollow part of the coil 610 and the third part 2030 is made to move so that the coil 610 becomes positioned at the part of the long side of the third part 2030.

Figure 22B:
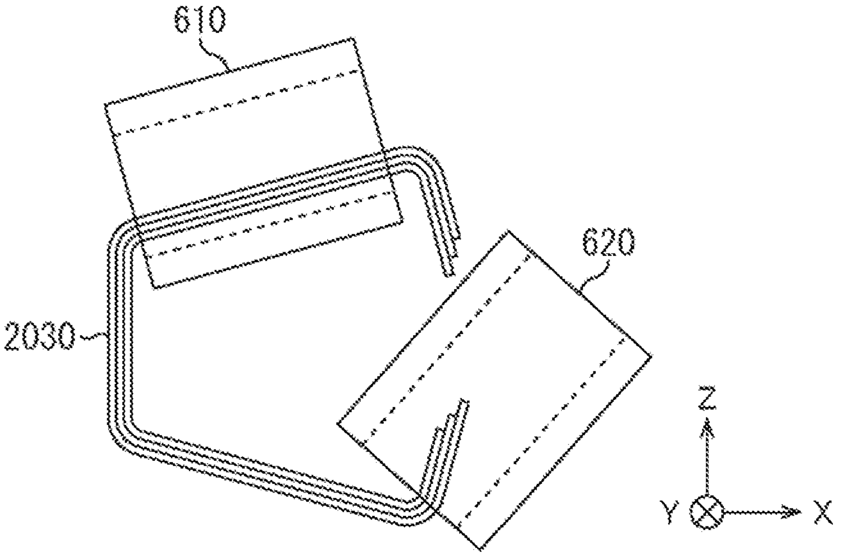
Figure 22C:
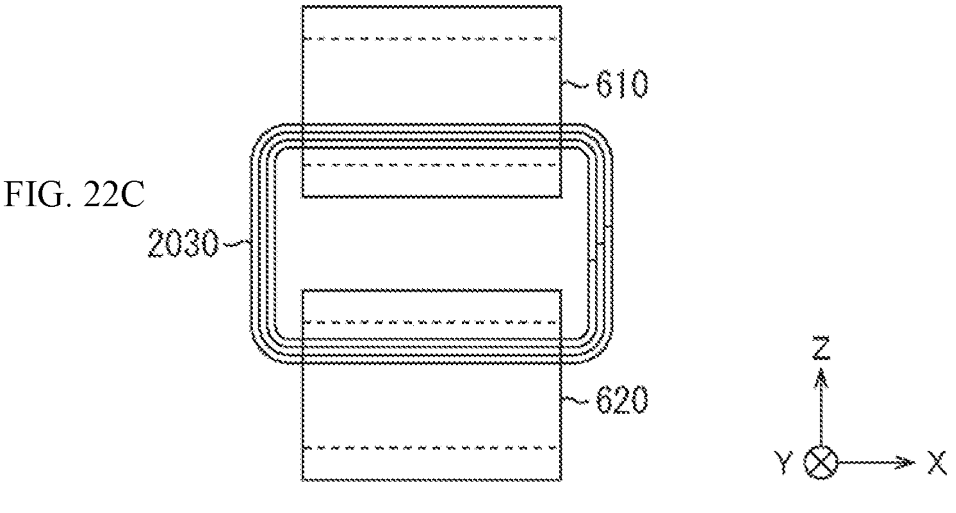

Next, as shown in FIG. 22B, in the state with the above-mentioned gap prepared, the third part 2030 is passed through the hollow part of the coil 620. Further, as shown in FIG. 22C, the third part 2030 is made to move until the coil 620 is positioned at the part of the two long sides of the third part 2030 at the side where the coil 610 is not arranged and one end part (first end part) and the other end part (second end part) of the third part 1830 are made to abut against each other in the Z-axial direction (first direction).

Figure 23A:
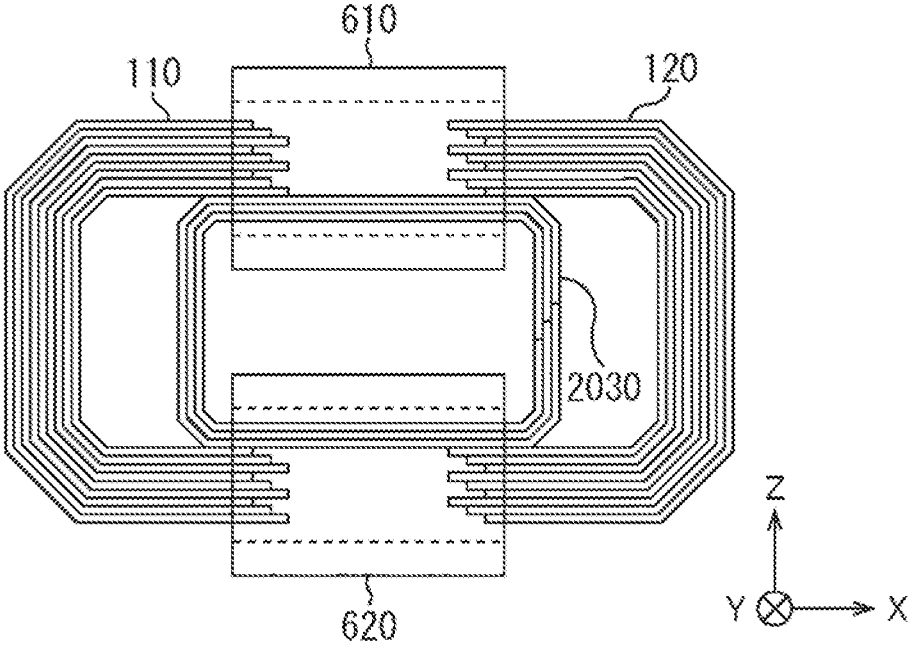
FIGS. 23A and 23B are schematic views showing one example of the method of assembly continuing from FIGS. 22A to 22C.

As shown in FIG. 23A, the outer circumferential surface of the third part 2030 is fit with the inner circumferential surface of the first part 110 and the third part 2030 is fit with the inner circumferential surface of the second part 120. In that state, one end part (first end part) of the first part 110 and one end part (first end part) of the second part 120 are inserted into the hollow part of the coil 610. At the same time as this, the other end part (second end part) of the first part 110 and the other end part (second end part) of the second part 120 are inserted into the hollow part of the coil 620.

Figure 23B:
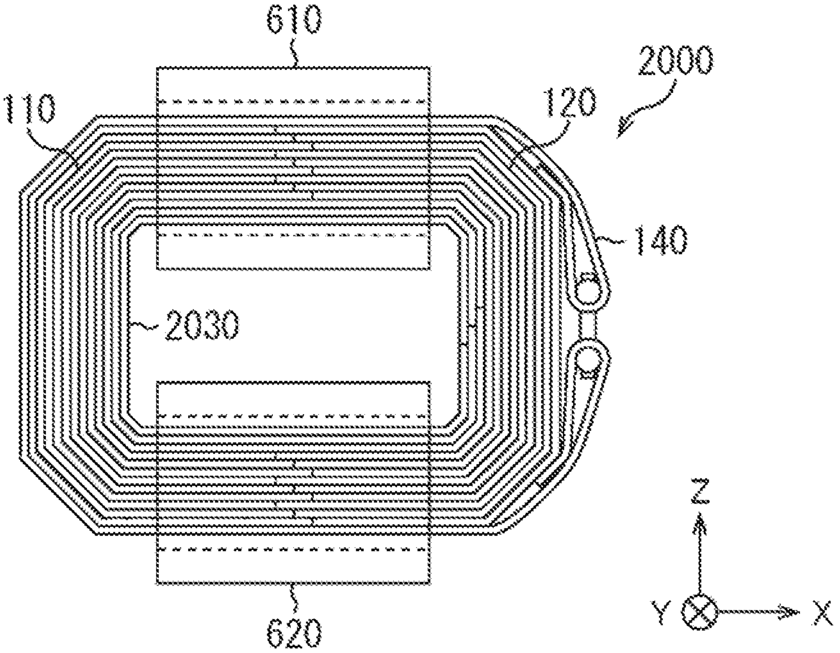

Further, as shown in FIG. 23B, one end part (first end part) of the first part 110 and one end part (first end part) of the second part 120 are made to abut against each other in the X-axial direction (second direction) and the surface (end face) of the other end part (second end part) of the first part 110 and the surface (end face) of the other end part (second end part) of the second part 120 are made to abut against each other in the X-axial direction (second direction).

Next, as shown in FIG. 23B, a band 140 is attached to the outer circumferential surfaces of the first part 110 and second part 120. When attaching the band 140, the first part 110 and second part 120 are fastened.

In the above way, in this embodiment, the surfaces of the end parts (end faces) of the grain-oriented electrical steel sheets forming the third part 2030 are made to abut against each other between third corner area 103 and fourth corner area 104 in the Z-axial direction (first direction). Further, third part 2030 is formed into a ring shape so that the outer circumferential surface fits with the inner circumferential surfaces of the first part 110 and second part 120. Therefore, the length of the third part 2030 in the X-axial direction is the same as the length in the X-axial direction of the window part comprised of the region at the inside of the first part 110 and second part 120 so that the third part 2030 contacts the region of the inner circumferential surface of the window part. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut against each other in the X-axial direction (second direction) (joined parts) from becoming offset from the desired positions. Due to this, it is possible to keep the magnetic core 2000 from deforming and failing to become the desired shape and to keep the core loss from increasing.

Further, as shown in FIG. 23A, in the assembly work, when one end part (first end part) of the first part 110 and one end part (first end part) of the second part 120 are inserted into the hollow part of the coil 610 and the other end part (second end part) of the first part 110 and the other end part (second end part) of the second part 120 are inserted into the hollow part of the coil 620, the outer circumferential surface of the third part 2030 in the Z-axial direction is rendered a state contacting the inner circumferential surfaces of the first part 110 and second part 120 in the Z-axial direction. Therefore, when fitting together the first part 110 and the second part 120, the third part 2030 functions as a guide positioning the first part 110 and the second part 120 in the Z-axial direction.

When fitting together the first part 110 and the second part 120, if the relative positions of the first part 110 and second part 120 become offset in the Z-axial direction, the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 cannot be accurately fit together.

According to the present embodiment, when fitting together the first part 110 and the second part 120, the third part 2030 functions as a guide positioning the first part 110 and the second part 120 in the Z-axial direction. Therefore, when fitting together the first part 110 and the second part 120, the relative positions of the first part 110 and the second part 120 are kept from ending up becoming offset in the Z-axial direction and the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 can be fit together with the correct positions in the Z-axial direction. Therefore, the end faces of the grain-oriented electrical steel sheets forming the first part 110 and the second part 120 can be made to reliably contact each other.

Further, in this embodiment, the positions in the circumferential direction of the magnetic core 2000 of the locations where the surfaces (end faces) of single end parts (first end parts) and surfaces (end faces) of the other end parts (second end parts) in the longitudinal directions of the grain-oriented electrical steel sheets forming third part 2030 are made to abut against each other in the Z-axial direction (first direction) (joined parts) are offset in the Z-axial direction (first direction). Therefore, compared to when not offsetting the positions of the parts in the circumferential direction of the magnetic core 2000 in the Z-axial direction (first direction), the core loss can be reduced.

In this embodiment, the surfaces of the end parts (end faces) of the grain-oriented electrical steel sheet forming the third part 2030 are made to abut against each other in the Z-axial direction (first direction) between the third corner area 103 and fourth corner area 104. However, like in the magnetic core 2400 shown in FIG. 24, the surfaces of the end parts (end faces) of the grain-oriented electrical steel sheet forming the third part 2430 may also be made to abut against each other between the first corner area 101 and second corner area 102 in the Z-axial direction (first direction). Further, like in the magnetic core 2500 shown in FIG. 25, the surfaces of the end parts (end faces) of the grain-oriented electrical steel sheet forming the third part 2530 may also be made to abut against each other in the Z-axial direction (first direction) both between the first corner area 101 and second corner area 102 and between the third corner area 103 and fourth corner area 104. In this case, the third part 2530 has a first small part 2531 and a second small part 2532. The first small part 2531 forms a region at the first corner area 101 and third corner area 103 side (positive direction side of Z-axis) from the location of the third part 2530 where the surfaces of the end parts (end faces) of the grain-oriented electrical steel sheet forming the third part 2530 are made to abut against each other. The second small part 2532 forms a region at the second corner area 102 and fourth corner area 104 side (negative direction side of Z-axis) from the location of the third part 2530 where the surfaces of the end parts (end faces) of the grain-oriented electrical steel sheet forming the third part 2530 are made to abut against each other.

Figure 24:
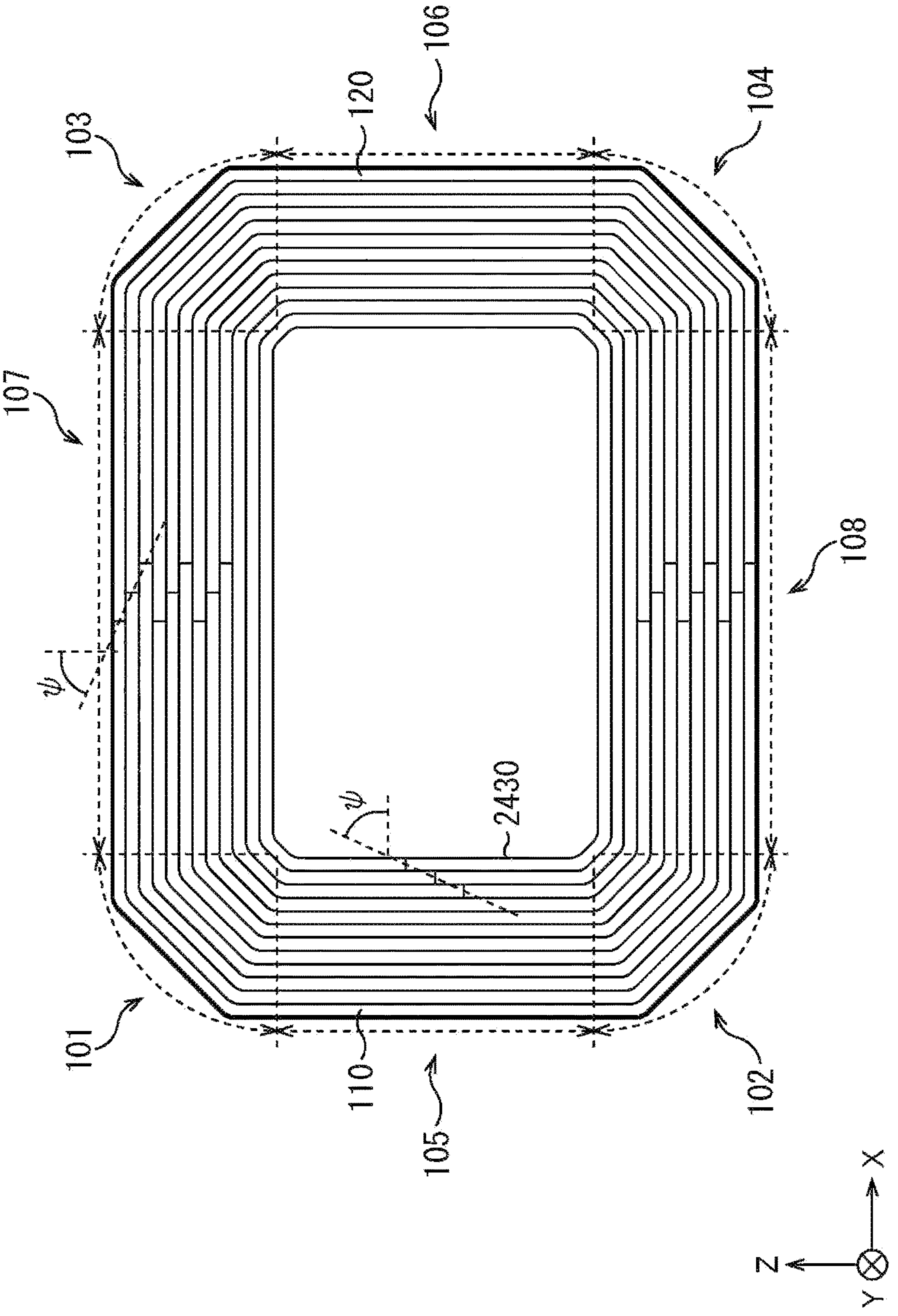
FIG. 24 is a view showing a first modification of the fifth embodiment and viewing the magnetic core from the front.
Figure 25:
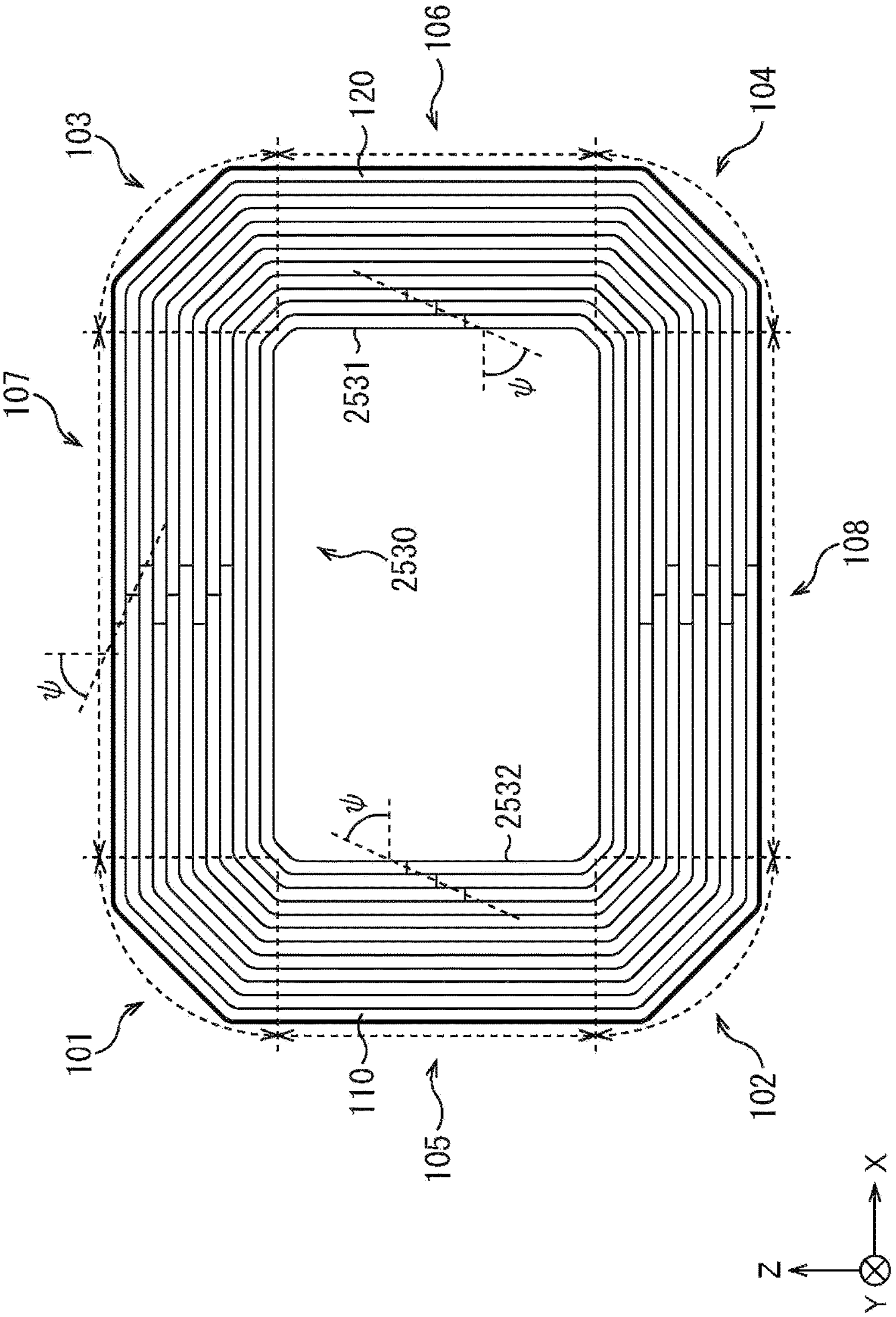
FIG. 25 is a view showing a second modification of the fifth embodiment and viewing the magnetic core from the front.

As shown in FIG. 21 and FIG. 24, when the surfaces of the end parts (end faces) of the grain-oriented electrical steel sheets forming the third parts 2030 and 2430 are made to abut against each other in the Z-axial direction (first direction) at a single location in the same layer, it is possible to reduce the core loss over the case where, as shown in FIG. 25, there are two locations in the same layer where the surfaces of the end parts (end faces) of the grain-oriented electrical steel sheets forming the third parts 2030 and 2530 are made to abut against each other in the Z-axial direction (first direction). However, the assembly work of the magnetic core 2500 is easier compared with the magnetic cores 2000 and 2400 in the same way as explained in the fourth embodiment. Therefore, it is possible to determine which of the magnetic cores 2000, 2400, and 2500 to employ according to which of reduction of core loss and burden of assembly work is given priority to.

Further, if offsetting the positions in the circumferential direction of the surfaces of the end parts (end faces) of the grain-oriented electrical steel sheets forming the third part 2030 in the Z-axial direction (first direction), it is possible to reduce the core loss, so this is preferred. However, the positions in the circumferential direction of the surfaces of the end parts (end faces) of the grain-oriented electrical steel sheet forming the third part 2030 in the Z-axial direction (first direction) may also be the same.

Further, in the present embodiment as well, it is possible to employ the various modifications explained in the first to the fourth embodiments. For example, the number of the bent parts in one corner area is not limited to two. It may be three or more or may be one. Further, the third parts 2030, 2430, and 2530 need not be formed by grain-oriented electrical steel sheets (soft magnetic sheets). Further, the band 140 need not be used.

In the example explained above, the lengths in the width directions of the grain-oriented electrical steel sheets forming the third part were made the same as the lengths in the width directions of the grain-oriented electrical steel sheets forming the first part 110 and second part 120. On the other hand, the lengths in the width directions of the grain-oriented electrical steel sheets forming the third part may be longer than the lengths in the width directions of the grain-oriented electrical steel sheets forming the first part 110 and second part 120. According to such a configuration, by the lengths in the width directions of the third part becoming longer, for example, in the steps shown in FIG. 23A and FIG. 23B, when superposing the first part 110 and second part 120 comprised of bent steel sheets from above the third part, the third part used as the guide becomes easier to see. Therefore, the positions of the first part and the second part can be easily determined and the work when assembling the magnetic core 2000 becomes efficient.

Figure 31:
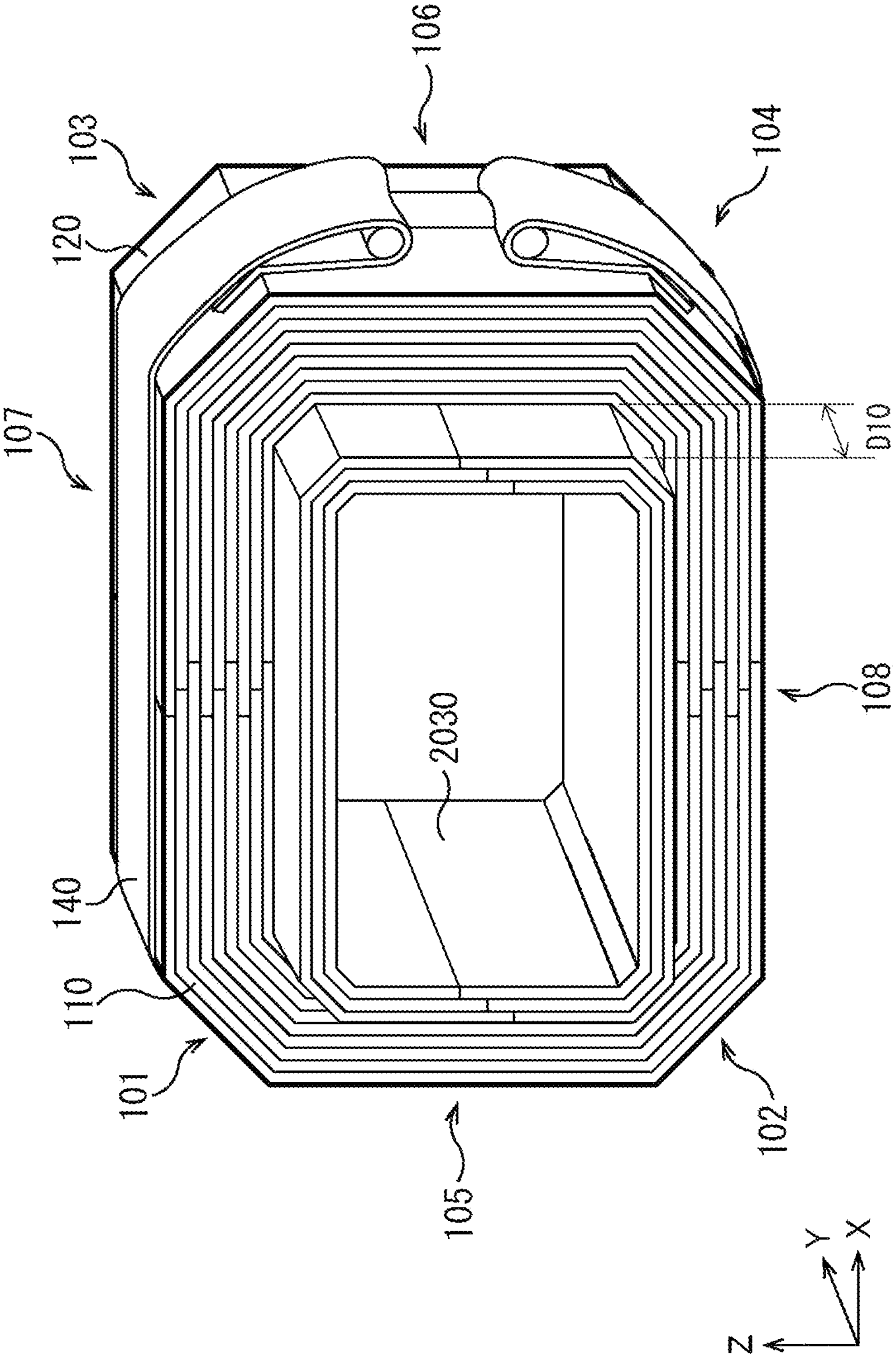
FIG. 31 is a perspective view showing an example in the fifth embodiment where lengths in width directions of grain-oriented electrical steel sheets forming the third part are made longer than lengths in the width directions of the grain-oriented electrical steel sheets forming the first part and second part.

FIG. 31 is a perspective view showing an example where in the fifth embodiment, the lengths in the width directions of the grain-oriented electrical steel sheets forming the third part 2030 are made longer than the lengths in the width directions of the grain-oriented electrical steel sheets forming the first part 110 and second part 120.

FIG. 31 corresponds to FIG. 20. In FIG. 31, compared with FIG. 20, the lengths in the width directions of the grain-oriented electrical steel sheets forming the third part 2030 become longer. Specifically, the third part 2030 sticks out to the front from the first part 110 and the second part 120 in the width direction by the distance D10. Similarly, at the back side of the magnetic core shown in FIG. 31, the third part 2030 sticks out to the back from the first part 110 and the second part 120 in the width direction by the distance D10.

Sixth Embodiment

Next, a sixth embodiment will be explained. In this embodiment, the case where the surfaces of the end parts (end faces) of the grain-oriented electrical steel sheets forming the third part are made to abut against each other in the X-axial direction (second direction) at only one of between the first corner area 101 and third corner area 103 and between the second corner area 102 and fourth corner area 104 will be explained. In this way, the present embodiment differs from the first to the fifth embodiments mainly in the configuration of the third part. Therefore, in the explanation of the present embodiment, parts the same as the first to the fifth embodiments are assigned notations the same as the notations assigned to FIG. 1 to FIG. 25 etc. and detailed explanations are omitted.

Figure 26:
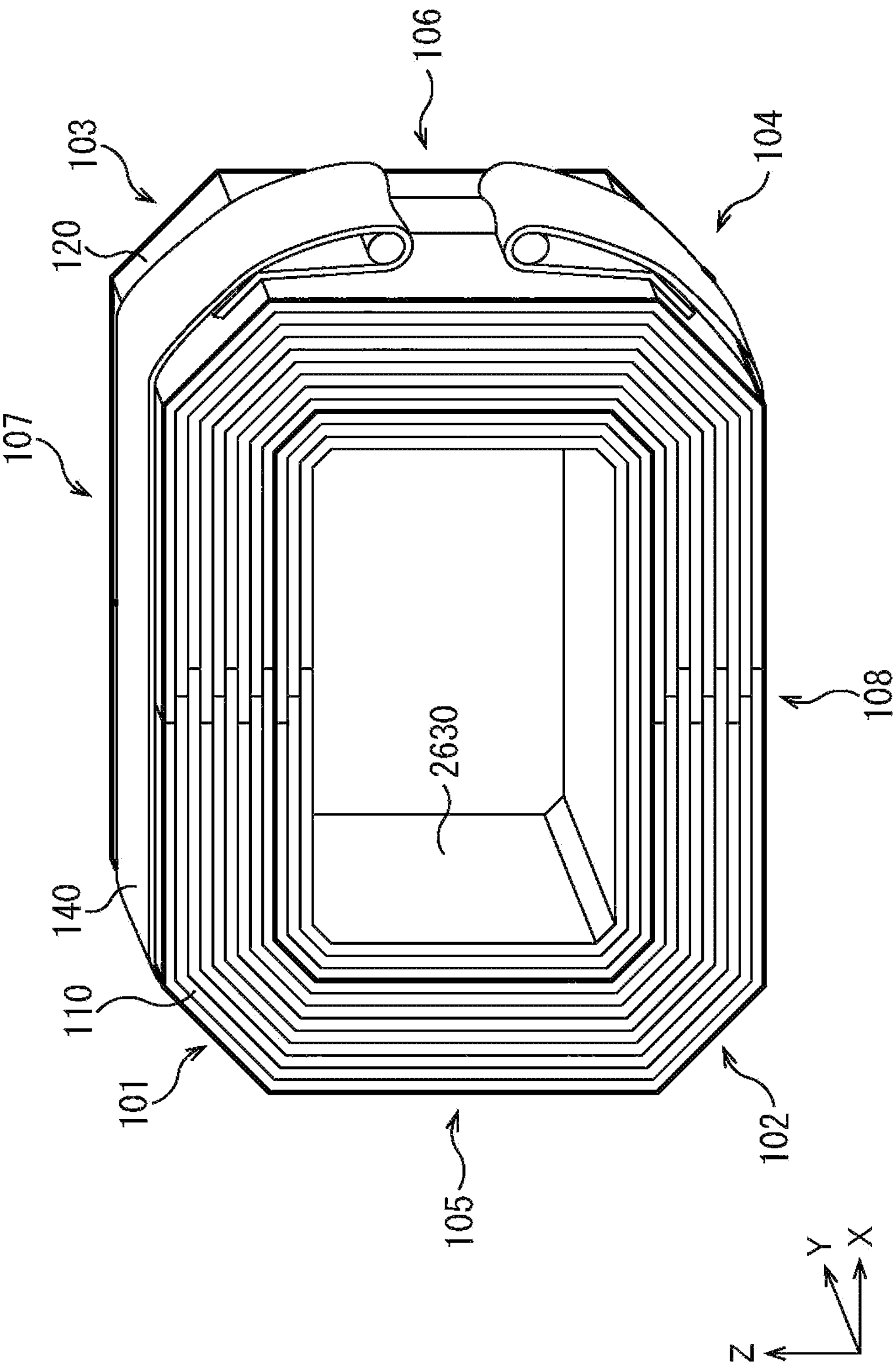
FIG. 26 is a view showing a sixth embodiment and viewing the magnetic core from an angle.

FIG. 26 is a figure viewing the magnetic core 2600 from an angle. FIG. 26 is a view corresponding to FIG. 1. In FIG. 26, in the same way as FIG. 1, for convenience in illustration, illustration of the windings (coils) set at the magnetic core 2600 is omitted.

In FIG. 26, the magnetic core 2600 has a first part 110, a second part 120, and a third part 2630. At the outer circumferential surface of the magnetic core 2600, a band 140 is attached. The band 140 has mounting hardware of the magnetic core 2600 etc. attached to it as well, but in FIG. 20, in the same way as FIG. 1, for convenience in illustration, illustration of the mounting hardware etc. is omitted.

Figure 27:
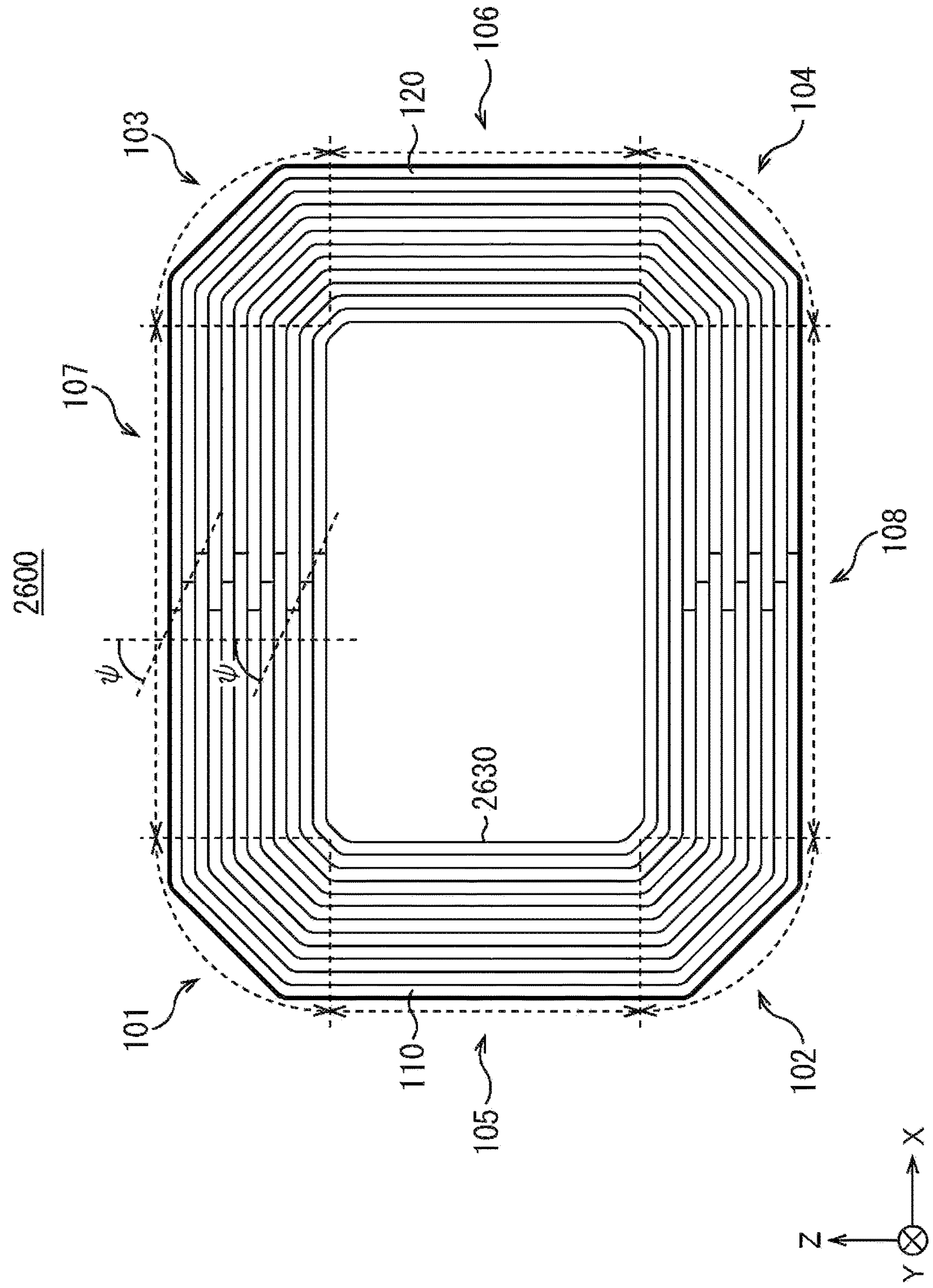
FIG. 27 is a view showing the sixth embodiment and viewing the magnetic core from the front.

FIG. 27 is a view showing the magnetic core 2600 from the front. In FIG. 27, in the same way as FIG. 2, for convenience in illustration, illustration of the windings (coils) and band set at the magnetic core 2600 is omitted.

The first part 110 and second part 120 are the same as those explained in the first embodiment.

The third part 2630 differs from the third part 2030 explained in the fifth embodiment only in the positions of the locations where the surfaces (end faces) of single end parts (first end parts) and surfaces (end faces) of the other end parts (second end parts) in the longitudinal directions of the grain-oriented electrical steel sheets forming the third part 2630 are made to abut against each other (joined parts). That is, in the third part 2030 explained in the fifth embodiment, the surfaces (end faces) of single end parts (first end parts) and surfaces (end faces) of the other end parts (second end parts) in the longitudinal directions of the grain-oriented electrical steel sheets forming the third part 2030 are made to abut against each other in the region between the third corner area 103 and fourth corner area 104 in the Z-axial direction (first direction). As opposed to this, in the third part 2630 of the present embodiment, the surfaces (end faces) of single end parts (first end parts) and surfaces (end faces) of the other end parts (second end parts) in the longitudinal directions of the grain-oriented electrical steel sheets forming the third part 2630 are made to abut against each other in the region between the first corner area 101 and third corner area 103 in the X-axial direction (second direction).

Further, the method of offset in the X-axial direction (second direction) of the positions in the circumferential direction of the magnetic core 2600 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) and the method of offset in the X-axial direction (second direction) of the positions in the circumferential direction of the magnetic core 2600 of the locations where the surfaces (end faces) of single end parts (first end parts) and the surfaces (end faces) of the other end parts (second end parts) in the longitudinal directions of the grain-oriented electrical steel sheets forming the third part 2630 are made to abut against each other in the X-axial direction (second direction) (joined parts) become the same.

Furthermore, as shown in FIG. 26 and FIG. 27, in the region between the first corner area 101 and third corner area 103, the positions in the circumferential direction of the magnetic core 2600 of the locations where the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 are made to abut against each other in the X-axial direction (second direction) (joined parts) and the positions in the circumferential direction of the magnetic core 2600 of the locations where the surfaces (end faces) of single end parts (first end parts) and the surfaces (end faces) of the other end parts (second end part) in the longitudinal directions of the grain-oriented electrical steel sheets forming the third part 2630 are made to abut against each other in the X-axial direction (second direction) (joined parts) preferably become the same in the X-axial direction (second direction).

When manufacturing the magnetic core 2600 of the present embodiment, the third part 2630 is prepared so that the shapes of one end part (first end part) and the other end part (second end part) of the third part 1830 explained in the fourth embodiment become the shapes of one end part (first end part) and the other end part (second end part) of the third part 2030 explained in the fifth embodiment. Further, as explained while referring to FIGS. 18A to 18C and FIGS. 19A and 19B, the first part 110, second part 120, and third part 2630 are assembled and a band 140 is attached to the outer circumferential surfaces of the first part 110 and second part 120. In this way, the method of manufacture of the magnetic core 2600 of the present embodiment can be realized by referring to the methods of manufacture of the magnetic core 1800 explained in the fourth embodiment and the magnetic core 2000 explained in the fifth embodiment, so, here, a detailed explanation will be omitted.

In the above way, in this embodiment, the surfaces of the end parts (end faces) of the grain-oriented electrical steel sheets forming the third part 2630 are made to abut against each other between the first corner area 101 and third corner area 103 in the X-axial direction (second direction). At this time, the positions in the circumferential direction of the magnetic core 2600 of the locations where the surfaces (end faces) of single end parts (first end parts) and the surfaces (end faces) of the other end parts (second end parts) in the longitudinal directions of the grain-oriented electrical steel sheets forming the third part 2630 are made to abut against each other in the X-axial direction (second direction) (joined parts) are offset in the X-axial direction (second direction). Further, the third part 2630 is formed into a ring shape so that the outer circumferential surface fits with the inner circumferential surfaces of the first part 110 and second part 120. Therefore, the length of the third part 2630 in the X-axial direction is the same as the length of the window part comprised of the region at the inside of the first part 110 and second part 120 in the X-axial direction so that the third part 2630 contacts the region of the inner circumferential surface of the window part. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut in the X-axial direction (second direction) (joined parts) from becoming offset from the desired positions. Due to this, it is possible to keep the magnetic core 2600 from deforming and failing to become the desired shape and to keep the core loss from increasing. Further, it is possible to reduce the core loss compared with the magnetic core 1800 (third part 1830) explained in the fourth embodiment.

Further, according to the present embodiment, in the same way as the fourth embodiment and the fifth embodiment, when fitting together the first part 110 and second part 120, the third part 2630 functions as a guide positioning the first part 110 and the second part 120 in the Z-axial direction. Therefore, when fitting together the first part 110 and second part 120, it is possible to keep the relative positions of the first part 110 and second part 120 from ending up becoming offset in the Z-axial direction and the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 can be correctly fit together. Therefore, the end faces of the first part 110 and second part 120 can be made to reliably contact each other.

Figure 28:
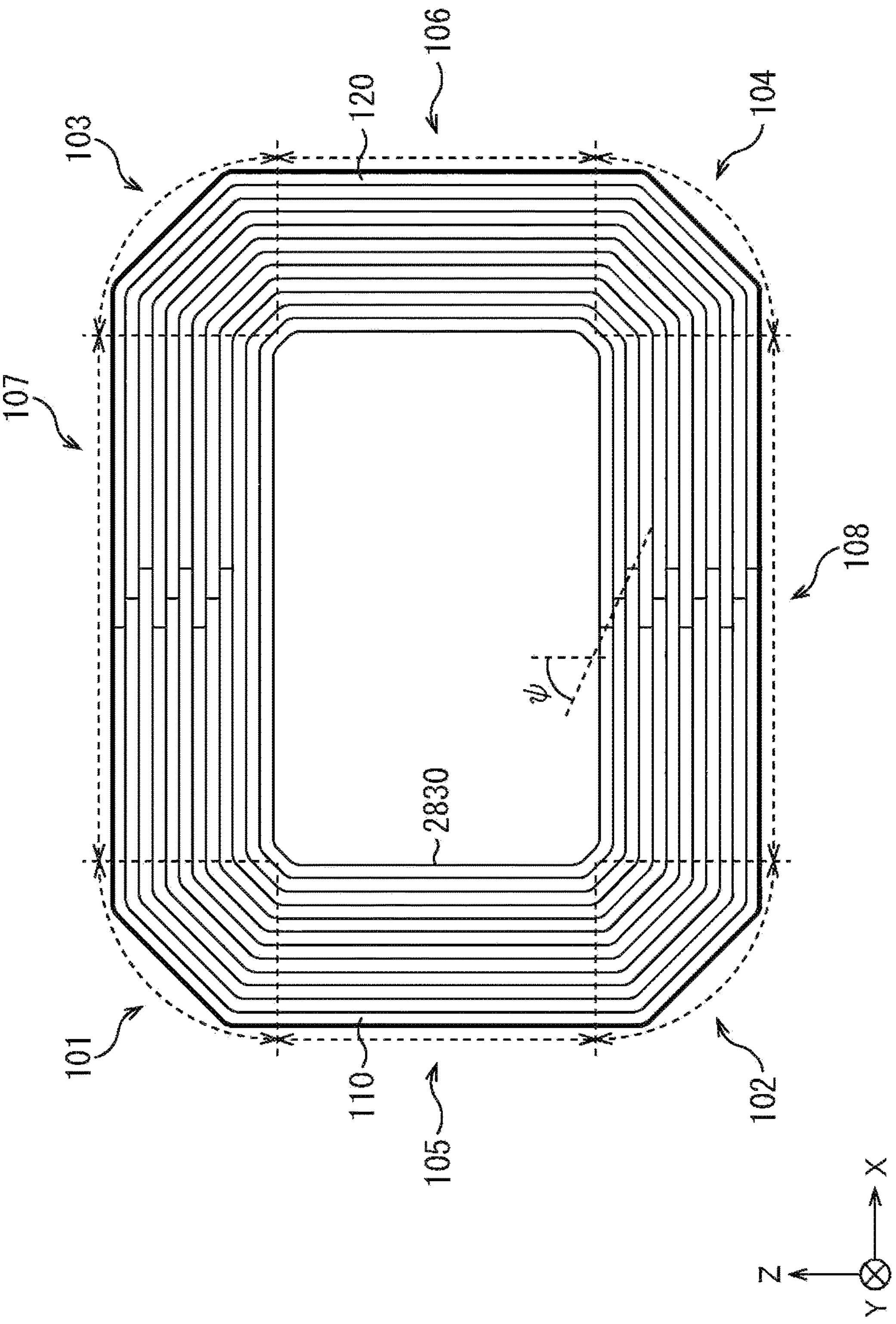
FIG. 28 is a view showing a modification of the sixth embodiment and viewing the magnetic core from the front.

In this embodiment, the surfaces of the end parts (end faces) of the grain-oriented electrical steel sheet forming the third part 2630 were made to abut against each other between the first corner area 101 and third corner area 103 in the X-axial direction (second direction). However, as in the magnetic core 2800 shown in FIG. 28, the surfaces of the end parts (end faces) of the grain-oriented electrical steel sheet forming the third part 2830 may also be made to abut against each other between the second corner area 102 and fourth corner area 104 in the X-axial direction (second direction).

Further, in the present embodiment as well, it is possible to employ the various modifications explained in the first to the fifth embodiments. For example, the number of the bent parts in one corner area is not limited to two. It may be three or more or may be one. Further, the third parts 2630 and 2830 need not be formed by grain-oriented electrical steel sheets (soft magnetic sheets). Further, the band 140 need not be used.

Seventh Embodiment

Next, a seventh embodiment will be explained. This embodiment relates to a configuration where, in the above-mentioned fourth to sixth embodiments, in each of the first corner area 101, second corner area 102, third corner area 103, and fourth corner area 104, a gap is provided between the third part 2730 and the first part 110 or second part 120.

Figure 29:
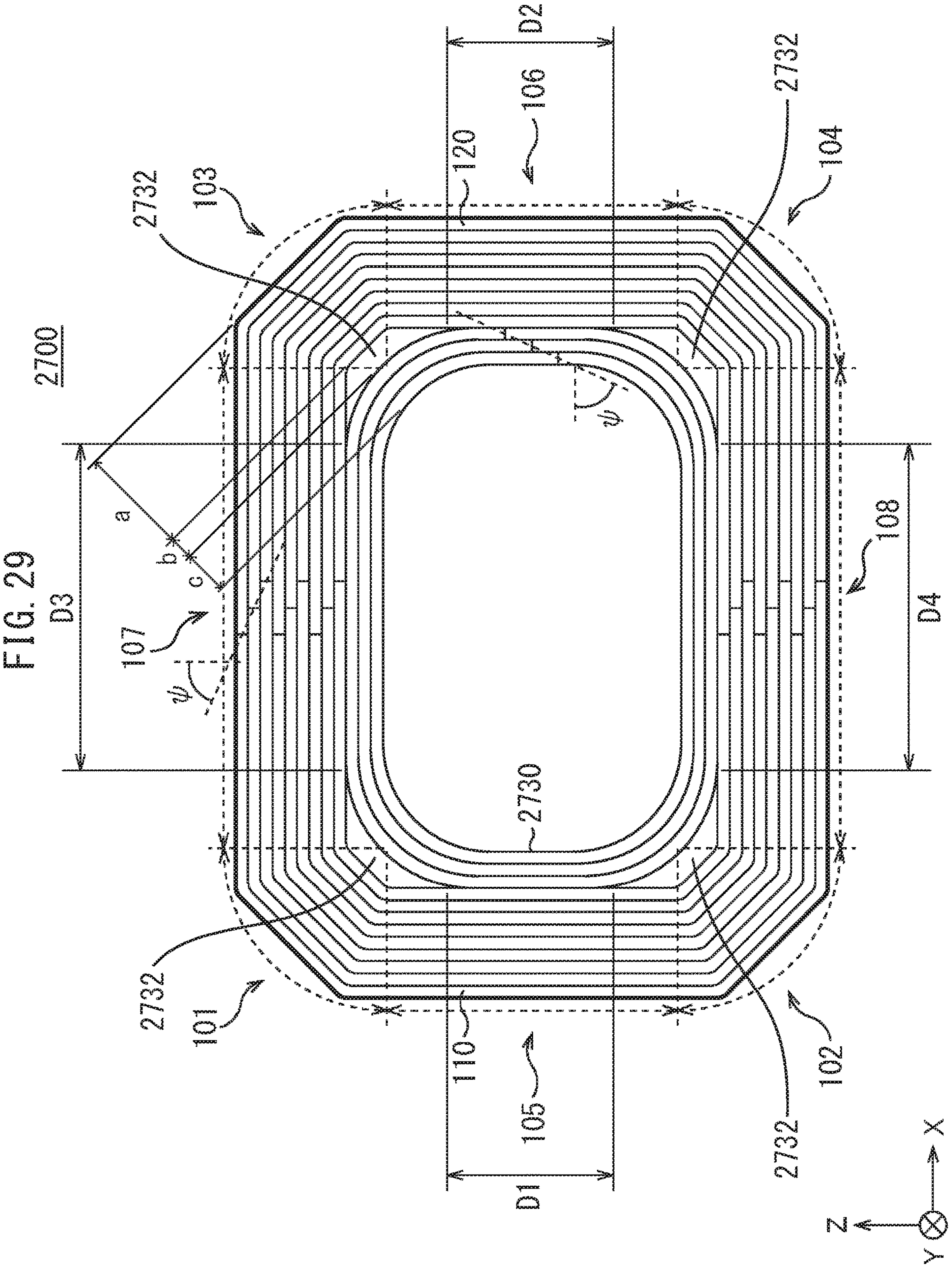
FIG. 29 is a view showing a magnetic core 2700 of a seventh embodiment from the front.

FIG. 29 is a view showing the magnetic core 2700 of the seventh embodiment from the front. In FIG. 29, in the same way as FIG. 2, for convenience in illustration, illustration of the windings (coils) and band set at a magnetic core 2700 is omitted.

The first part 110 and the second part 120 are the same as those explained in the first embodiment.

The third part 2730 has a plurality of grain-oriented electrical steel sheets which are respectively shaped bent at positions corresponding to the first corner area 101, second corner area 102, third corner area 103, and fourth corner area 104 and which plurality of grain-oriented electrical steel sheets are stacked so that the sheet surfaces are superposed. The longitudinal directions of the grain-oriented electrical steel sheets (directions vertical to sheet width directions and sheet thickness directions) are the same as the rolling direction.

In the same way as the fourth to sixth embodiments, the outer circumferential surface of the third part 2730 is configured by fitting together the inner circumferential surfaces of the first part 110 and second part 120. However, in the seventh embodiment, the third part 2730 does not contact the first part and second part 120 across the entire outer circumferential surface. A gap 2732 is provided between the third part 2730 and the first part 110 or second part 120.

Specifically, as shown in FIG. 29, in each of the first corner area 101, second corner area 102, third corner area 103, and fourth corner area 104, a gap 2732 is provided between the third part 2730 and first part 110 or second part 120.

In the example shown in FIG. 29, the corner area of the third part 2730 corresponding to each of the first corner area 101, second corner area 102, third corner area 103, and fourth corner area 104 is made an arc shape. Further, a gap 2732 is provided between the third part 2730 and first part 110 or second part 120 in this arc shaped part.

Therefore, in this embodiment, the third part 2730 is formed in a ring shape so that part of its outer circumferential surface fits with the inner circumferential surfaces of the first part 110 and second part 120. In the third part 2730, in the X-axial direction (second direction), the region D1 shown in FIG. 29 abuts against the first part 110 while the region D2 abuts against the second part 120. Further, in the third part 2730, in the Z-axial direction (first direction), the region D3 shown in FIG. 29 abuts against the first part 110 and second part 120 and the region D4 abuts against the first part 110 and second part 120.

The length of the third part 2730 in the X-axial direction is the same as the length in the X-axial direction of the window part comprised of the region at the inside of the first part 110 and second part 120 so that the third part 2730 contacts the region of the inner circumferential surface of the window part. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut against each other in the X-axial direction (second direction) (joined parts) from becoming offset from the desired positions. Due to this, it is possible to keep the magnetic core 2700 from deforming and failing to become the desired shape and to keep the core loss from increasing.

Further, according to the present embodiment, in the same way as the fourth to sixth embodiments, when fitting together the first part 110 and second part 120, the third part 2730 functions as a guide positioning the first part 110 and the second part 120 in the Z-axial direction. Therefore, when fitting together the first part 110 and second part 120, it is possible to keep the relative positions of the first part 110 and second part 120 from ending up becoming offset in the Z-axial direction and the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 can be correctly fit together. Therefore, the end faces of the first part 110 and second part 120 can be made to reliably contact each other.

In this regard, if the core loss generated at the bent parts of the grain-oriented electrical steel sheets increase, since the bent parts are provided at the first corner area 101, second corner area 102, third corner area 103, and fourth corner area 104, these corner areas and their vicinities easily rise in temperature.

In this embodiment, in each of the first corner area 101, second corner area 102, third corner area 103, and fourth corner area 104, a gap 2732 is provided between the third part 2730 and the first part 110 or second part 120. Therefore, the heat generated at the bent parts of the corner areas is discharged to the gap 2732.

Therefore, by the heat generated due to the core loss of the bent parts being discharged to the gap 2732, the magnetic core 2700 is kept from rising in temperature.

As shown in FIG. 29, in the thickness directions of the grain-oriented electrical steel sheets, if the thickness of the second part 120 (or the first part 110) is defined as "a", the width of the gap 2732 as "b", and the thickness of the third part 2730 as "c", the relationship of a>c stands. The core loss at the bent parts of the magnetic core 2700 becomes larger the further to the inside of the magnetic core 2700. Therefore, the further to the inside of the magnetic core 2700, the more heat is generated due to core loss at the bent parts. Therefore, by making the thickness "c" of the third part 2730 smaller than the thickness "a" of the first part 110 (or second part 120), it is possible to keep heat from being generated due to core loss of the bent parts at the inside of the magnetic core 2700.

Further, the relationship of the following formula (2) stands among the thickness "a" of the first part 110 (or second part 120), the width "b" of the gap 2732, and the thickness "c" of the third part 2730:

$$a+c \geq b \geq (a+c)/285 \quad (2)$$

That is, the width "b" of the gap 2732 is not greater than the total of the thickness "a" of the first part 110 (or second part 120) and the thickness "c" of the third part 2730. Here, if the width "b" of the gap 2732 is greater than the total of the thickness "a" of the first part 110 (or second part 120) and the thickness "c" of the third part 2730, the noise becomes greater. Therefore, the width "b" of the gap 2732 preferably is not more than the total of the thickness "a" of the first part 110 (or second part 120) and the thickness "c" of the third part 2730.

Further, if $b<(a+c)/285$, the heat generated due to core loss of the bent parts cannot be discharged from the gap 2732. Therefore, preferably $b \geq (a+c)/285$. For example, if the thickness of the grain-oriented electrical steel sheets forming the first part 110 (or second part 120) and third part 2730 is 0.3 mm, if the winding thickness (a+c) is 100 mm, a gap 2732 of a width "b" of 0.35 mm or more is ensured. Further, if the thickness of the grain-oriented electrical steel sheets forming the first part 110 (or second part 120) and third part 2730 is "t", preferably b>t, that is, the width "b" of the gap 2732 is larger than the thickness "t" of the grain-oriented electrical steel sheets. Due to this, the heat generated at the bent parts is reliably discharged.

Furthermore, as explained later, it was learned that, as a result of providing the gap 2732, not only is there an effect of discharging the heat generated at the magnetic core 2700, but it is also possible to keep the temperature of the oil of the transformer from rising. That is, by providing the gap 2732, due to the formation of a gap through which a cooling medium is passed near the windings (coils), not only is the heat generated at the magnetic core 2700 discharged, but also a large effect is obtained as a result for discharge of the heat generated at the coil of the transformer.

Note that, in the example shown in FIG. 29, if the thickness of the second part 120 (or the first part 110) is made "a" and the thickness of the third part 2730 is made "c", the relationship of a>c stands. That is, the thickness of the second part 120 (or first part 110) is greater than the thickness of the third part 2730. On the other hand, the thickness of the third part 2730 may be greater than the thickness of the second part 120 (or first part 110). That is, a≤c is also possible.

Further, as explained in the fourth to sixth embodiments, if the outer circumferential surface of the third part is made to fit with the inner circumferential surfaces of the first part 110 and second part 120 over its entire circumference, the shape of the outer circumferential surface of the third part and the shape of the inner circumferential surface of the first part 110 or second part 120 are required to match. In particular, in each of the first corner area 101, second corner area 102, third corner area 103, and fourth corner area 104, if the shape of the outer circumferential surface of the third part and the shape of the inner circumferential surface of the first part 110 or the second part 120 do not match, sometimes the outer circumferential surface of the third part will not contact the inner circumferential surfaces of the first part 110 or second part 120 over its entire circumference. Therefore, in particular, in the first corner area 101, second corner area 102, third corner area 103, and fourth corner area 104, a certain degree of precision is sought in the shape of the outer circumferential surface of the third part and the shape of the inner circumferential surface of the first part 110 or the second part 120.

On the other hand, according to the example of the configuration shown in FIG. 29, in each of the first corner area 101, second corner area 102, third corner area 103, and fourth corner area 104, a gap is provided between the third part 2730 and first part 110 or second part 120, so at each corner area, precision is not required at the shape of the outer circumferential surface of the third part and the shape of the inner circumferential surface of the first part 110 or the second part 120.

In other words, according to the seventh embodiment, if precision of the length of the third part 2730 is obtained in the X-axial direction and Z-axial direction, in each of the first corner area 101, second corner area 102, third corner area 103, and fourth corner area 104, precision is not demanded from the shape of the outer circumferential surface of the third part 2730. In this case as well, when attaching a band 140, it is possible to keep the grain-oriented electrical steel sheets forming the first part 110 from entering between the grain-oriented electrical steel sheets forming the second part 120 and keep the grain-oriented electrical steel sheets forming the second part 120 from entering between the grain-oriented electrical steel sheets forming the first part 110. Further, when fitting together the first part 110 and second part 120, the relative positions of the first part 110 and second part 120 are kept from ending up becoming offset in the Z-axial direction.

Therefore, at the first corner area 101, second corner area 102, third corner area 103, and fourth corner area 104, precision of the dimensions of the outer circumferential surface of the third part 2730 is not required, so it is possible to reduce the manufacturing cost when manufacturing the third part 2730.

Figure 30:
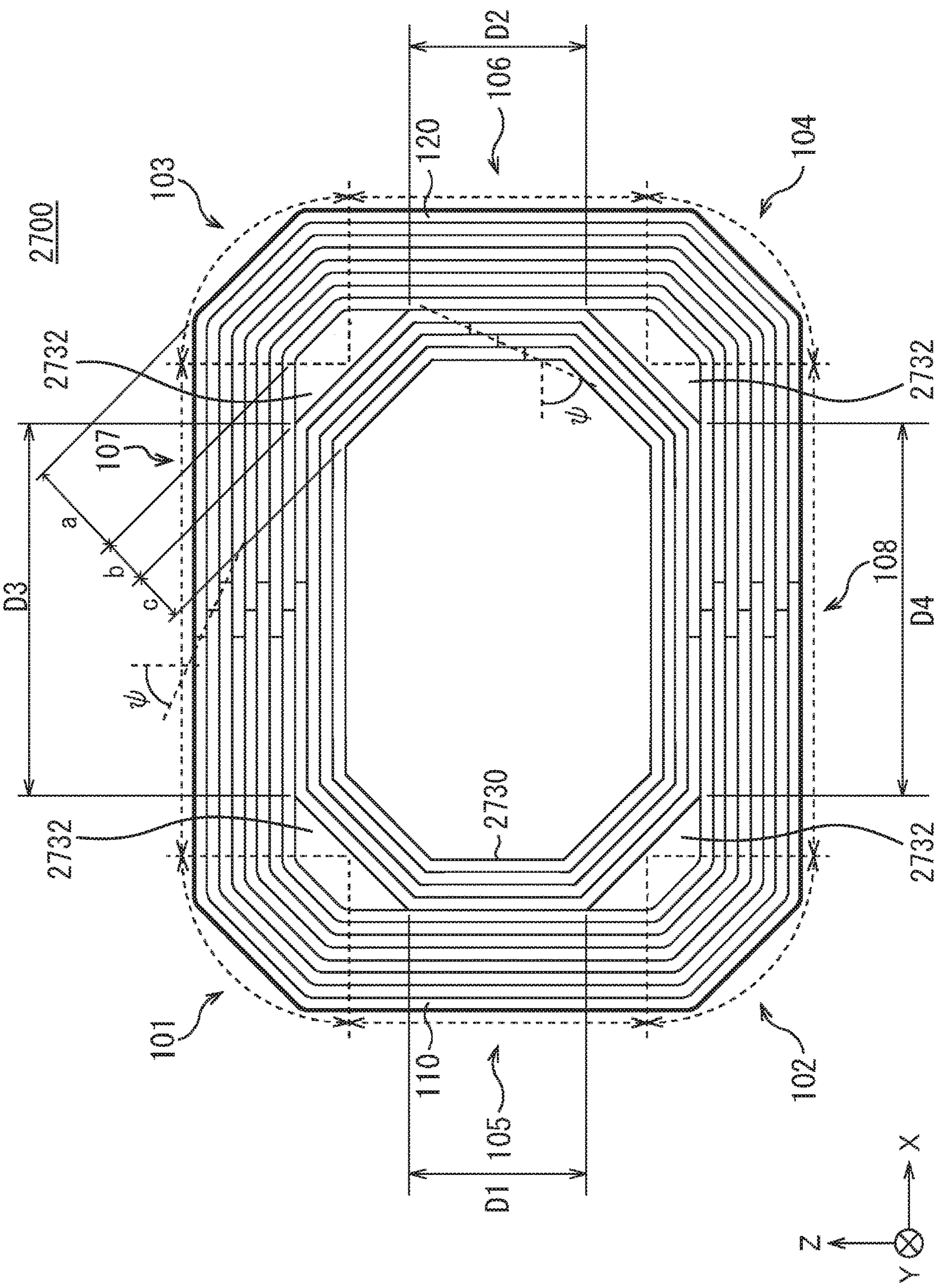
FIG. 30 is a schematic view showing another mode of the configuration where a gap is provided between a third part and first part or second part in each of first corner area, second corner area, third corner area, and fourth corner area.

FIG. 30 is a schematic view showing another mode of a configuration where a gap is provided between the third part 2730 and first part 110 or second part 120 in each of the first corner area 101, second corner area 102, third corner area 103, and fourth corner area 104.

FIG. 30 is a view showing the magnetic core 2700 from the front. In FIG. 30, in the same way as FIG. 2, for convenience in illustration, illustration of the windings (coils) and band set at the magnetic core 2700 is omitted. In FIG. 30, the first part 110 and second part 120 are the same as those explained in the first embodiment.

In FIG. 30 as well, the third part 2730 has a plurality of grain-oriented electrical steel sheets which are respectively shaped bent at positions corresponding to the first corner area 101, second corner area 102, third corner area 103, and fourth corner area 104 and which plurality of grain-oriented electrical steel sheets are stacked so that the sheet surfaces are superposed over each other. The longitudinal directions of the grain-oriented electrical steel sheets (directions vertical to sheet width directions and sheet thickness directions) are the same as the rolling direction.

The outer circumferential surface of the third part 2730 is configured to fit with the inner circumferential surfaces of the first part 110 and second part 120. In the same way as the configuration shown in FIG. 29, the third part 2730 does not contact the first part and second part 120 over its entire outer circumferential surface. A gap 2732 is provided between the third part 2730 and first part 110 or second part 120.

As shown in FIG. 30, in each of the first corner area 101, second corner area 102, third corner area 103, and fourth corner area 104, a gap 2732 is provided between the third part 2730 and first part 110 or second part 120.

In the example shown in FIG. 30, at a corner area of the third part 2730 corresponding to each of the first corner area 101, second corner area 102, third corner area 103, and fourth corner area 104, a bent part is provided so that the first part 110 or second part 120 is separated and a gap 2732 is formed. Due to this, when viewing the magnetic core 2700 from the front, the third part 2730 is made an octagonal shape That is, the outer surface of the third part 2730 adjoining the gap 2732 is made a straight shape.

In the example shown in FIG. 30 as well, the third part 2730 is formed into a ring shape so that part of its outer circumferential surfaces fits with the inner circumferential surfaces of the first part 110 and second part 120. In the third part 2730, in the X-axial direction (second direction), the region D1 shown in FIG. 30 abuts against the first part 110 and the region D2 abuts against the second part 120. Further, in the third part 2730, in the Z-axial direction (first direction), the region D3 shown in FIG. 30 abuts against the first part 110 and second part 120 while the region D4 abuts against the first part 110 and second part 120.

The length of the third part 2730 in the longitudinal direction (X-axial direction) is the same as the length in the X-axial direction of the window part comprised of the region at the inside of the first part 110 and second part 120 so as to contact the region of the inner circumferential surface of the window part. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut in the X-axial direction (second direction) (joined parts) from becoming offset from the desired positions. Due to this, it is possible to keep the magnetic core 2700 from deforming and failing to become the desired shape and to keep the core loss from increasing.

Further, in the configuration shown in FIG. 30 as well, when fitting together the first part 110 and second part 120, the third part 2730 functions as a guide for positioning the first part 110 and the second part 120 in the Z-axial direction. Therefore, when fitting together the first part 110 and the second part 120, the relative positions of the first part 110 and the second part 120 are kept from ending up becoming offset in the Z-axial direction and the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 can be fit together with the correct positions in the Z-axial direction. Therefore, the end faces of the grain-oriented electrical steel sheets forming the first part 110 and the second part 120 can be made to reliably contact each other.

Note that, in the example of configuration shown in FIG. 29 or FIG. 30, the locations where surfaces (end faces) of single end parts (first end parts) and surfaces (end faces) of the other end parts (second end part) in the longitudinal directions of the grain-oriented electrical steel sheets forming the third part 2030 are made to abut against each other (joined parts) are made positions of the second parallelepiped part 106 in the same way as the example of configuration of FIG. 20. On the other hand, the locations where surfaces (end faces) of single end parts (first end parts) and surfaces (end faces) of the other end parts (second end part) in the longitudinal directions of the grain-oriented electrical steel sheets forming the third part 2030 are made to abut against each other (joined parts) may be positions of the third parallelepiped part 107 in the same way as the example of configuration of FIG. 27. The locations where surfaces (end faces) of single end parts (first end parts) and surfaces (end faces) of the other end parts (second end part) in the longitudinal directions of the grain-oriented electrical steel sheets forming the third part 2030 are made to abut against each other (joined parts) may also be positions of the first parallelepiped part 105 or fourth parallelepiped part 108 in the same way as the example of configuration of FIG. 24 or FIG. 28. Further, the locations where surfaces (end faces) of single end parts (first end parts) and surfaces (end faces) of the other end parts (second end part) in the longitudinal directions of the grain-oriented electrical steel sheets forming the third part 2030 are made to abut against each other (joined parts) may be two locations in the same way as the example of configuration of FIG. 25, but preferably are single locations.

According to the configuration shown in FIG. 29 or FIG. 30, if using the magnetic core 2700 to form a transformer, the gaps 2732 function as passages through which oil and air pass. Due to this, the generation of heat at the first corner area 101, second corner area 102, third corner area 103, and fourth corner area 104 (core loss) is suppressed. In particular, the cooling efficiency at the inside of the core where magnetic flux concentrates rises, so the core loss is reduced.

Further, in the same way as the fourth to sixth embodiments, the third part 2730 plays the role of a guide at the time of core manufacture, so the production efficiency is improved. Further, the positional offset of the joined parts which becomes a problem in a core of a type configured by bending in advance a part forming a corner area of the core for each electrical steel sheet or other soft magnetic sheet, cutting the soft magnetic sheets into predetermined lengths, then superposing the soft magnetic sheets in the sheet thickness direction is eliminated. Furthermore, by providing the third part 2730 in a ring shape, the core strength is improved and the shape after forming the transformer becomes easily held.

Figure 32:
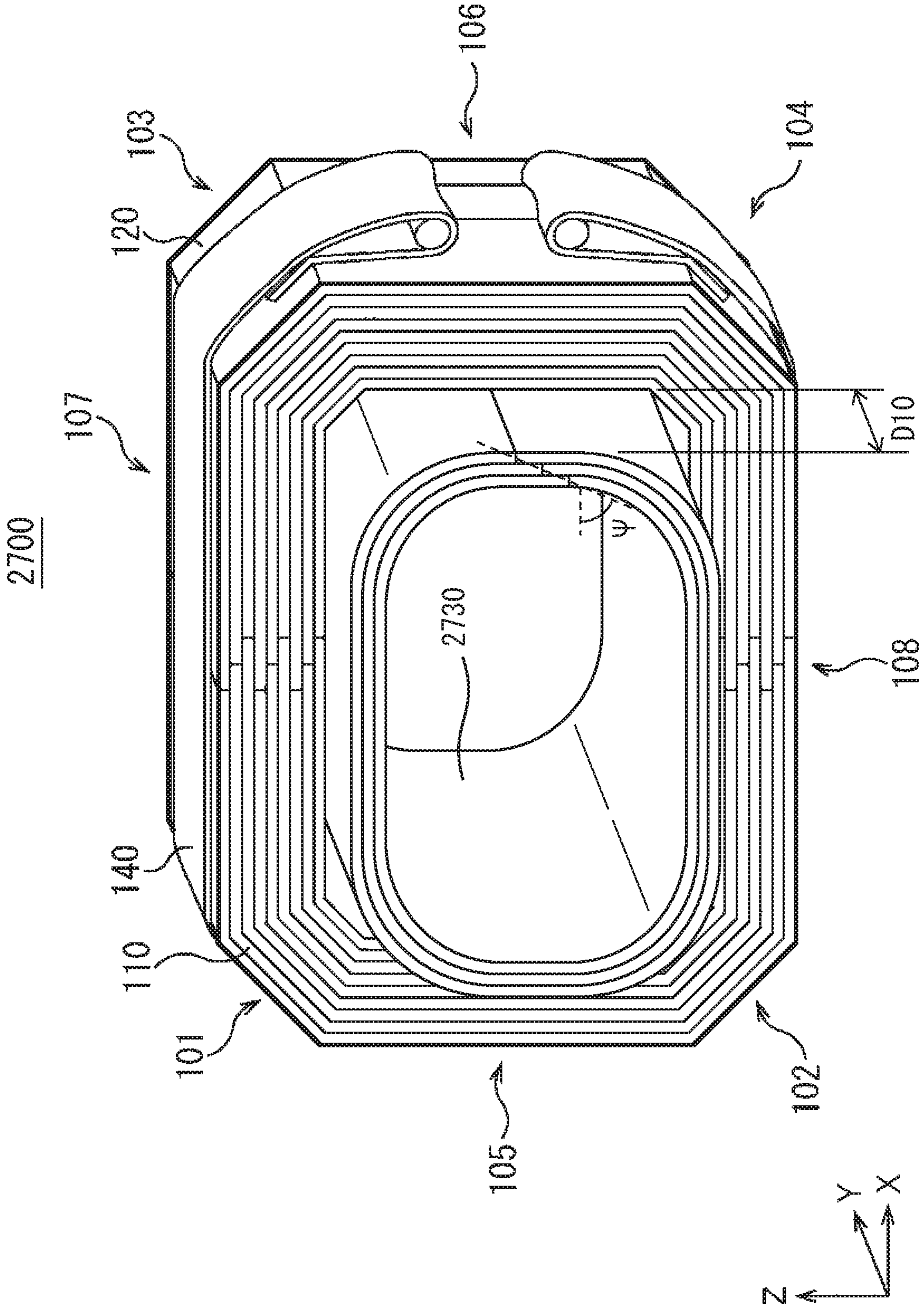
FIG. 32 is a perspective view showing an example in the example of configuration shown in FIG. 29 where lengths in width directions of grain-oriented electrical steel sheets forming the third part are made longer than lengths in the width directions of the grain-oriented electrical steel sheets forming the first part and second part.

In the example of configuration shown in FIG. 29 and FIG. 30 as well, the lengths in the width directions of the grain-oriented electrical steel sheets forming the third part 2730 may be longer than the lengths in the width direction of the grain-oriented electrical steel sheets forming the first part 110 and second part 120. FIG. 32 is a perspective view showing an example where, in the example of configuration shown in FIG. 29, the lengths in the width directions of the grain-oriented electrical steel sheets forming the third part 2730 are made longer than the lengths in the width directions of the grain-oriented electrical steel sheets forming the first part 110 and second part 120. Further, FIG. 33 is a perspective view showing an example where, in the example of configuration shown in FIG. 30, the lengths in the width directions of the grain-oriented electrical steel sheets forming the third part 2730 are made longer than the lengths in the width directions of the grain-oriented electrical steel sheets forming the first part 110 and second part 120.

Figure 33:
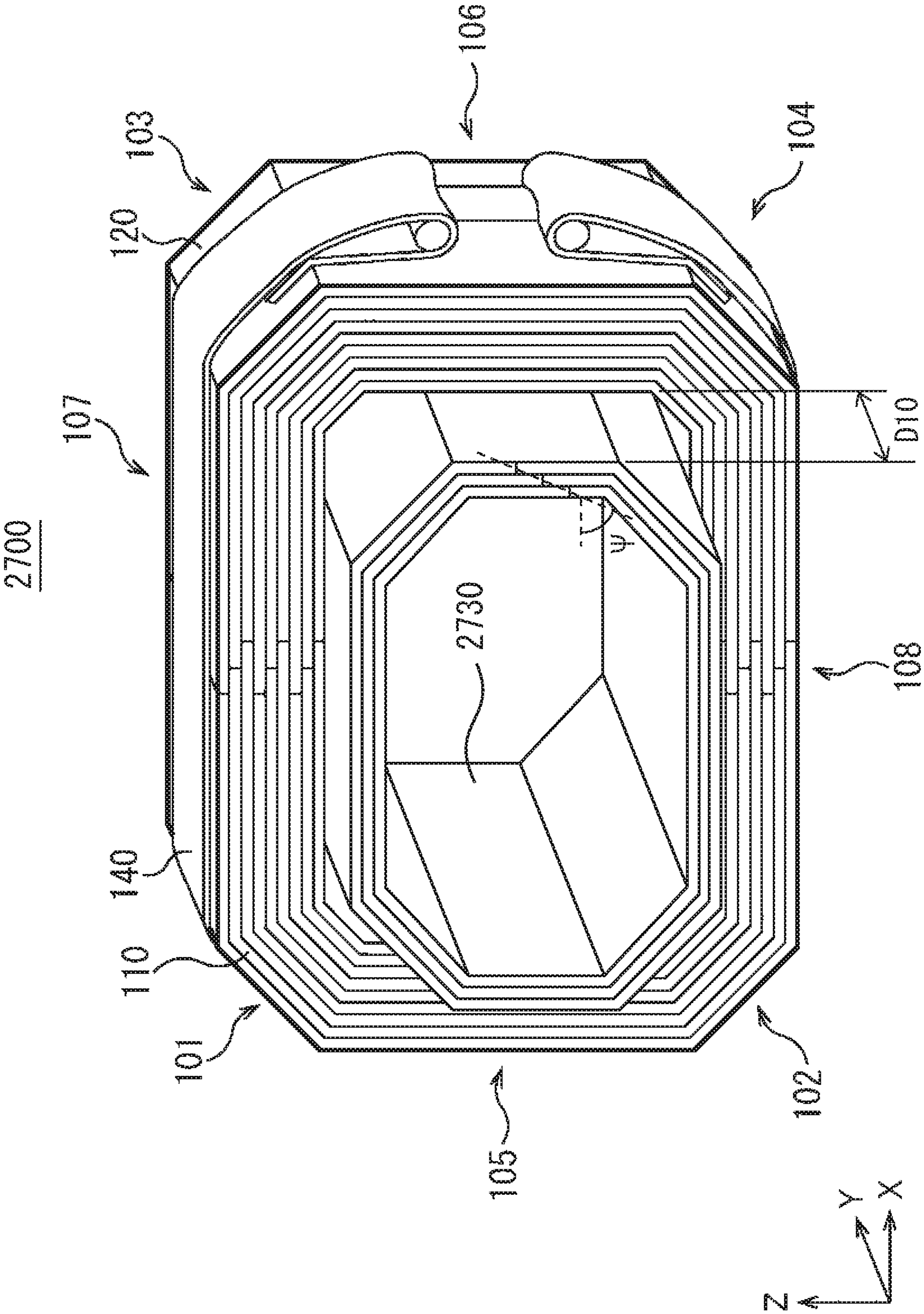
FIG. 33 is a perspective view showing an example in the example of configuration shown in FIG. 30 where lengths in width directions of grain-oriented electrical steel sheets forming the third part are made longer than lengths in the width directions of the grain-oriented electrical steel sheets forming the first part and second part.

As shown in FIG. 32 and FIG. 33, the third part 2730 sticks out to the front from the first part 110 and second part 120 in the sheet width direction by the distance D10. Similarly, the third part 2730 sticks out to the rear from the first part 110 and second part 120 in the sheet width direction by the distance D10 at the back side of the magnetic core shown in FIG. 31.

Figure 34:
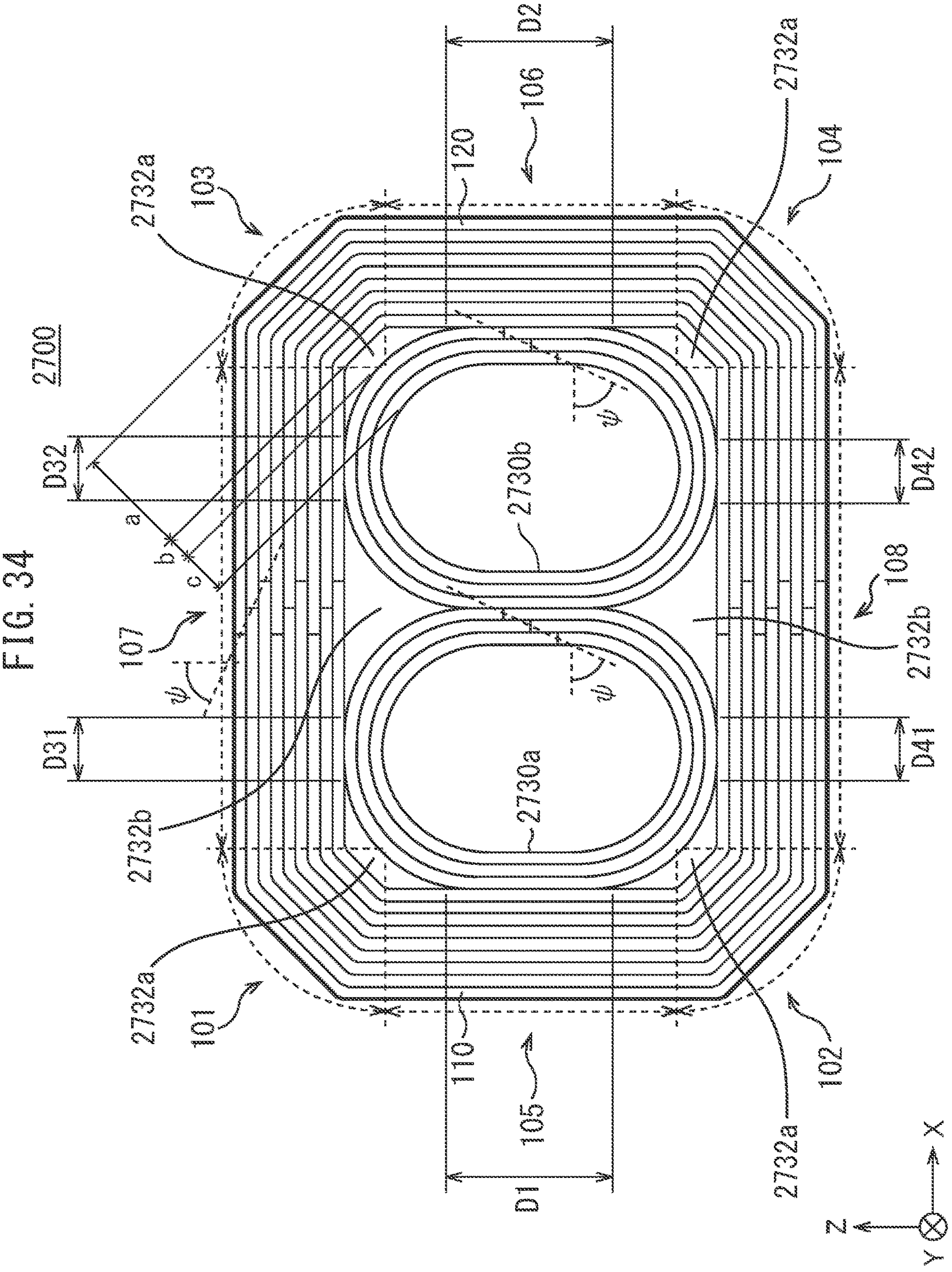
FIG. 34 is a view showing a magnetic core of a seventh embodiments from the front and a schematic view showing an example where the third part shown in FIG. 29 is divided into two parts.

Further, in the example of configuration shown in FIG. 29, the third part 2730 may be divided into a plurality of parts. FIG. 34 is a schematic view showing an example where the third part 2730 shown in FIG. 29 is divided into two. As shown in FIG. 34, the third part 2730 shown in FIG. 29 is divided into a third part 2730*a* and a third part 2730*b*.

As shown in FIG. 34, in each of the first corner area 101 and the second corner area 102, a gap 2732*a* is provided between the third part 2730*a* and the first part 110. Further, in each of the third corner area 103 and fourth corner area 104, a gap 2732*a* is provided between the third part 2730*b* and the second part 120.

Furthermore, as shown in FIG. 34, a gap 2732*b* is provided between the third part 2730*a* and the third part 2730*b*, and the first part 110 and second part 120.

The third parts 2730*a* and 2730*b* are formed into ring shapes so that parts of their outer circumferential surfaces fit with the inner circumferential surfaces of the first part 110 and second part 120. In the third parts 2730*a* and 2730*b*, in the X-axial direction (second direction), the region D1 shown in FIG. 34 abuts against the first part 110 and the region D2 abuts against the second part 120. Further, in the third part 2730*a*, in the Z-axial direction (first direction), the region D31 and the region D41 shown in FIG. 34 abut against the first part 110. Further, in the third part 2730*b*, in the Z-axial direction (first direction), the region D32 and the region D42 shown in FIG. 34 abut against the second part 120.

The lengths in the longitudinal directions (X-axial direction) of the third parts 2730*a* and 2730*b* are the same as the length in the X-axial direction of the window part comprised of the regions at the inside of the first part 110 and second part 120 so as to contact the region of the inner circumferential surface of the window part. Therefore, when attaching the band 140, it is possible to keep a grain-oriented electrical steel sheet forming the first part 110 from entering between the grain-oriented electrical steel sheets forming the second part 120 and keep a grain-oriented electrical steel sheet forming the second part 120 from entering between the grain-oriented electrical steel sheets forming the first part 110. Accordingly, it is possible to keep the locations where the end parts in the longitudinal direction of the grain-oriented electrical steel sheets forming the first part 110 and the end parts in the longitudinal direction of the grain-oriented electrical steel sheets forming the second part 120 are made to abut against each other in the X-axial direction (second direction) (joined parts) from becoming offset from the desired positions. Due to this, it is possible to keep the magnetic core 2700 from deforming and the desired shape not being obtained and the core loss from increasing.

Further, in the configuration shown in FIG. 34 as well, by fastening the third part 2730*a* and the third part 2730*b* in advance, when fitting together the first part 110 and second part 120, the third parts 2730*a* and 2730*b* function as guides for positioning the first part 110 and the second part 120 in the Z-axial direction. Therefore, when fitting together the first part 110 and the second part 120, the relative positions of the first part 110 and the second part 120 are kept from ending up becoming offset in the Z-axial direction and the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 can be fit together with the correct positions in the Z-axial direction. Therefore, the end faces of the grain-oriented electrical steel sheets forming the first part 110 and the second part 120 can be made to reliably contact each other.

According to the example of the configuration shown in FIG. 34, in each of first corner area 101, second corner area 102, third corner area 103, and fourth corner area 104, a gap 2732*a* is provided between the third parts 2730*a* and 2730*b* and the first part 110 or the second part 120. For this reason, the heat generated at the bent parts of the corner areas is discharged to the gap 2732*a*.

Further, a gap 2732*b* is provided between the third parts 2730*a* and 2730*b* and the first part 110 and second part 120. Therefore, heat is discharged from the gap 2732*b* as well. Therefore, the heat generated due to core loss of the bent parts is discharged from the gaps 2732*a* and 2732*b* whereby the magnetic core 2700 is kept from rising in temperature and a transformer including the magnetic core 2700 is effectively kept from rising in temperature.

According to the example of configuration shown in FIG. 34, compared with the example of configuration shown in FIG. 29, more gaps 2732*a* and 2732*b* are provided between the third parts 2730*a* and 2730*b* and the first part 110 or the second part 120. Therefore, discharge of heat by the gaps 2732*a* and 2732*b* can be promoted more.

Figure 35:
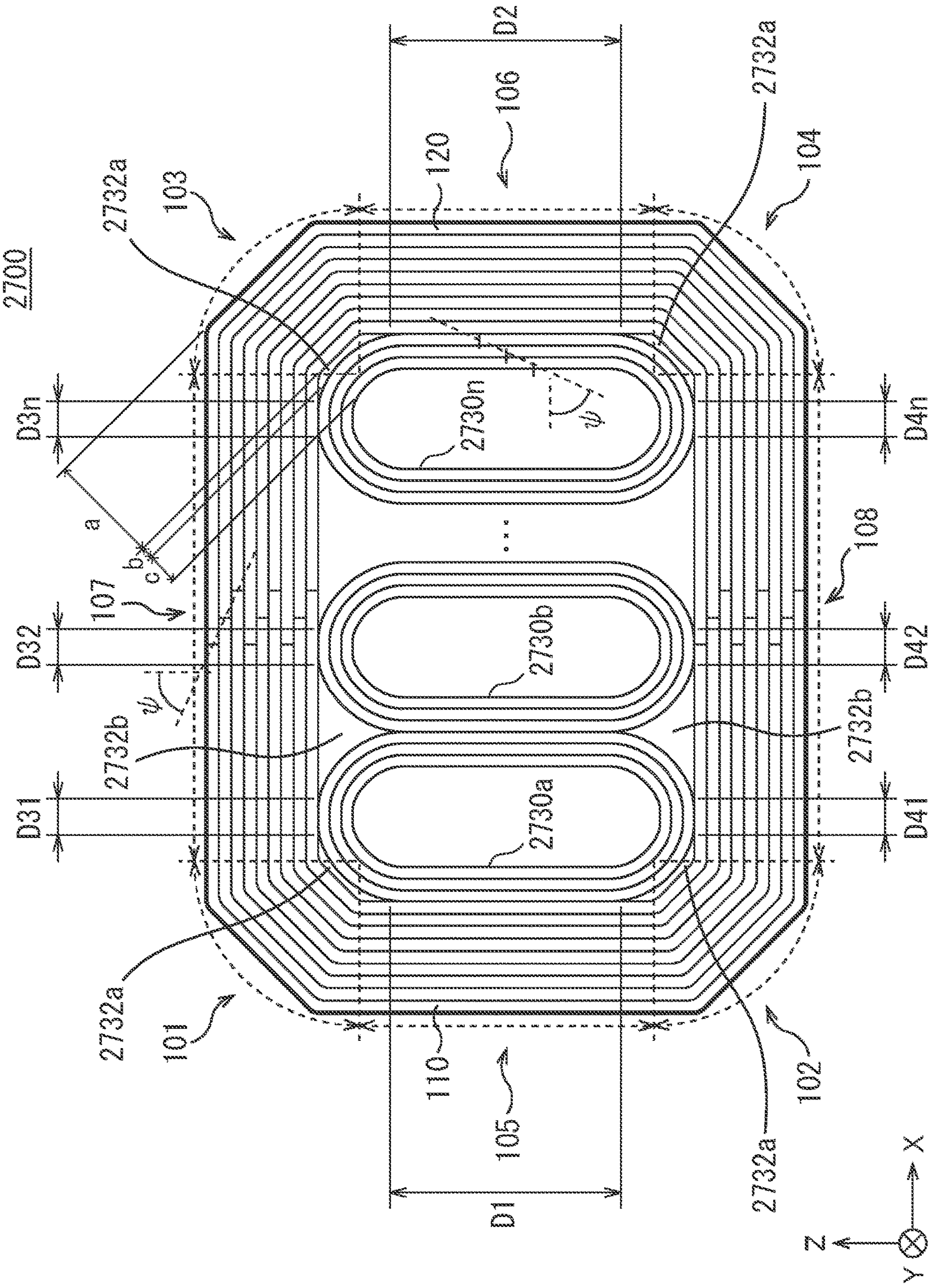
FIG. 35 is a schematic view showing an example generalizing the configuration shown in FIG. 34 more where the third part is divided into "n" parts.

FIG. 35 is a schematic view showing an example generalizing the configuration shown in FIG. 34 more where the third part 2730 shown in FIG. 29 is divided into "n" parts. As shown in FIG. 35, the third part 2730 shown in FIG. 29 is divided into the third part 2730*a*, third part 2730*b*, . . . , 2730*n*.

As shown in FIG. 35, in each of the first corner area 101 and the second corner area 102, a gap 2732*a* is provided between the third part 2730*a* and the first part 110. Further, in each of the third corner area 103 and the fourth corner area 104, a gap 2732*a* is provided between the third part 2730*n* and the second part 120.

Furthermore, as shown in FIG. 35, a gap 2732*b* is provided between the third parts 2730*b*, . . . , 2730*n* and the first part 110 or the second part 120.

The third parts 2730*b*, . . . , 2730*n* are formed into ring shapes so that parts of their outer circumferential surfaces fit with the inner circumferential surfaces of the first part 110 and second part 120. In the third parts 2730*b*, . . . , 2730*n*, in the X-axial direction (second direction), the region D1 shown in FIG. 35 abuts against the first part 110 while the region D2 abuts against the second part 120. Further, in the third part 2730*a*, in the Z-axial direction (first direction), the region D31 and the region D41 shown in FIG. 35 abut against the first part 110. Further, in the third part 2730*b*, in the Z-axial direction (first direction), the region D32 and the region D42 shown in FIG. 35 abut against the first part 110 or second part 120. Further, in the third part 2730*n*, in the Z-axial direction (first direction), the region D3*n* and the region D4*n* shown in FIG. 35 abut against the second part 120.

The lengths in the longitudinal directions (X-axial direction) of the third parts 2730*a*, . . . , 2730*n* are the same as the length in the X-axial direction of the window part comprised of the region at the inside of the first part 110 and second part 120 so as to contact the region of the inner circumferential surface of the window part. Therefore, when attaching the band 140, it is possible to keep the grain-oriented electrical steel sheets forming the first part 110 from entering between the grain-oriented electrical steel sheets forming the second part 120 and the grain-oriented electrical steel sheets forming the second part 120 from entering between the grain-oriented electrical steel sheets forming the first part 110. Accordingly, it is possible to keep the locations where the end parts in the longitudinal directions of the grain-oriented electrical steel sheets forming the first part 110 and the end parts in the longitudinal directions of the grain-oriented electrical steel sheets forming the second part 120 are made to abut in the X-axial direction (second direction) (joined parts) from becoming offset from the desired positions. Due to this, it is possible to keep the magnetic core 2700 from deforming and failing to become the desired shape and to keep the core loss from increasing.

Further, in the configuration shown in FIG. 35, by fastening the third parts 2730*a*, . . . , 2730*n* in advance, when fitting together the first part 110 and second part 120, the third parts 2730*a*, . . . , 2730*n* function as guides positioning the first part 110 and the second part 120 in the Z-axial direction. Therefore, when fitting together the first part 110 and the second part 120, the relative positions of the first part 110 and the second part 120 are kept from ending up becoming offset in the Z-axial direction and the surfaces of the end parts (end faces) in the longitudinal directions of the grain-oriented electrical steel sheets forming the first part 110 and the surfaces of the end parts (end faces) in the longitudinal directions of the grain-oriented electrical steel sheets forming the second part 120 can be fit together with the correct positions in the Z-axial direction. Therefore, it is possible to reliably make the end faces of the grain-oriented electrical steel sheets forming the first part 110 and the second part 120 contact.

According to the example of the configuration shown in FIG. 35, in each of the first corner area 101, second corner area 102, third corner area 103, and fourth corner area 104, a gap 2732*a* is provided between the third parts 2730*a* and 2730*n* and the first part 110 or the second part 120. Therefore, the heat generated at the bent parts of the corner areas is discharged to the gaps 2732*a*.

Further, gaps 2732*b* are provided between the third parts 2730*a*, 2730*b*, . . . , 2730*n* and first part 110 or second part 120. Therefore, heat is discharged from the gaps 2732*b* as well. Therefore, the heat generated due to core loss of the bent parts is discharged from the gaps 2732*a* and 2732*b*, whereby the temperature of the magnetic core 2700 is kept from rising and the rise in temperature of the transformer formed from the core 2700 is effectively suppressed.

According to the example of configuration shown in FIG. 35, compared with the example of configuration shown in FIG. 34, a greater number of gaps 2732*a* and 2732*b* are provided between the third parts 2730*a*, . . . , 2730*n* and the first part 110 or second part 120. Therefore, discharge of heat by the gaps 2732*a* and 2732*b* can be promoted more.

Figure 36:
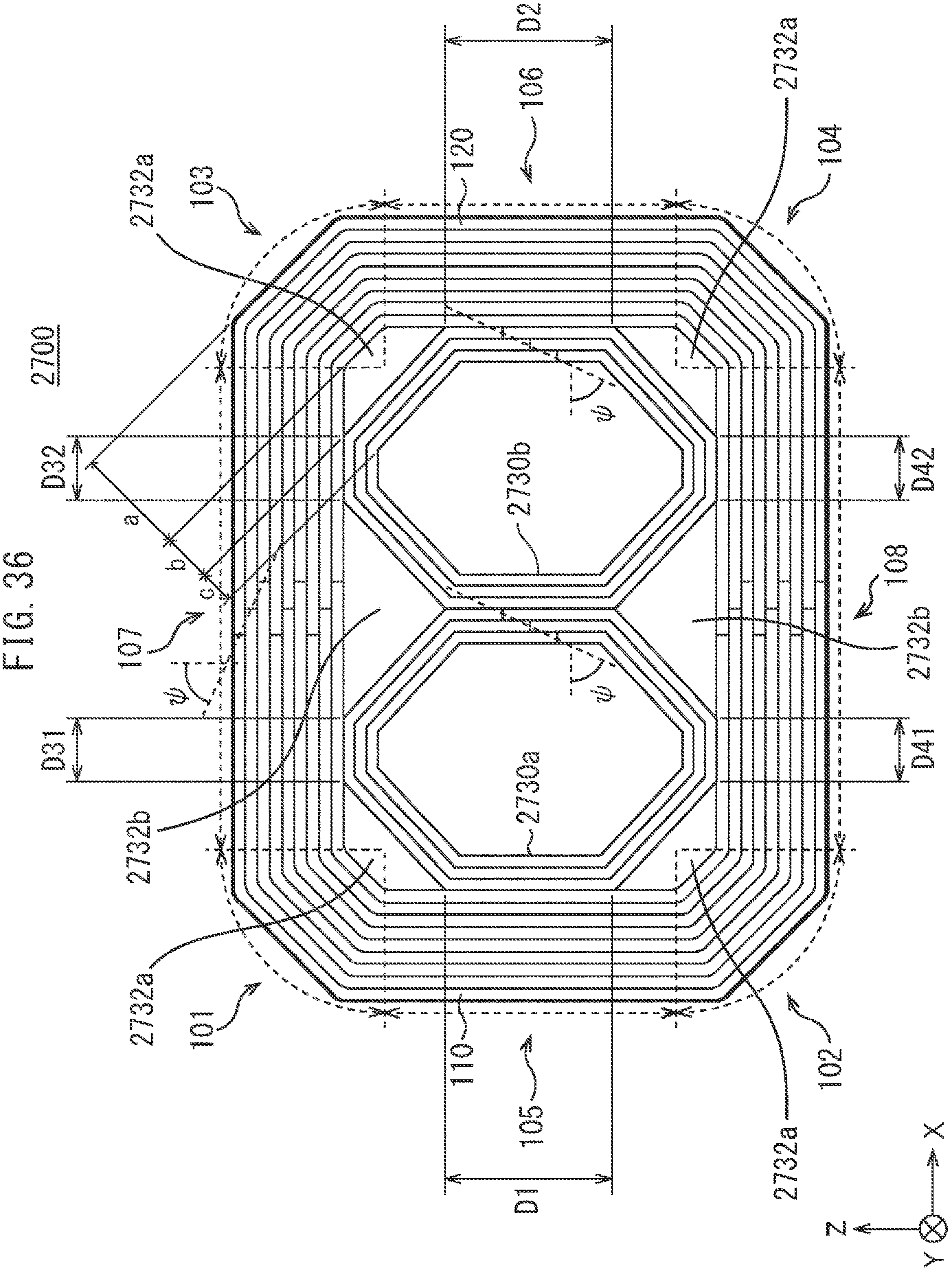
FIG. 36 is a schematic view showing an example in the example of configuration of FIG. 34 of rendering the outer shapes of the third parts adjoining the gaps straight shapes in the same way as the example of configuration of FIG. 30.
Figure 37:
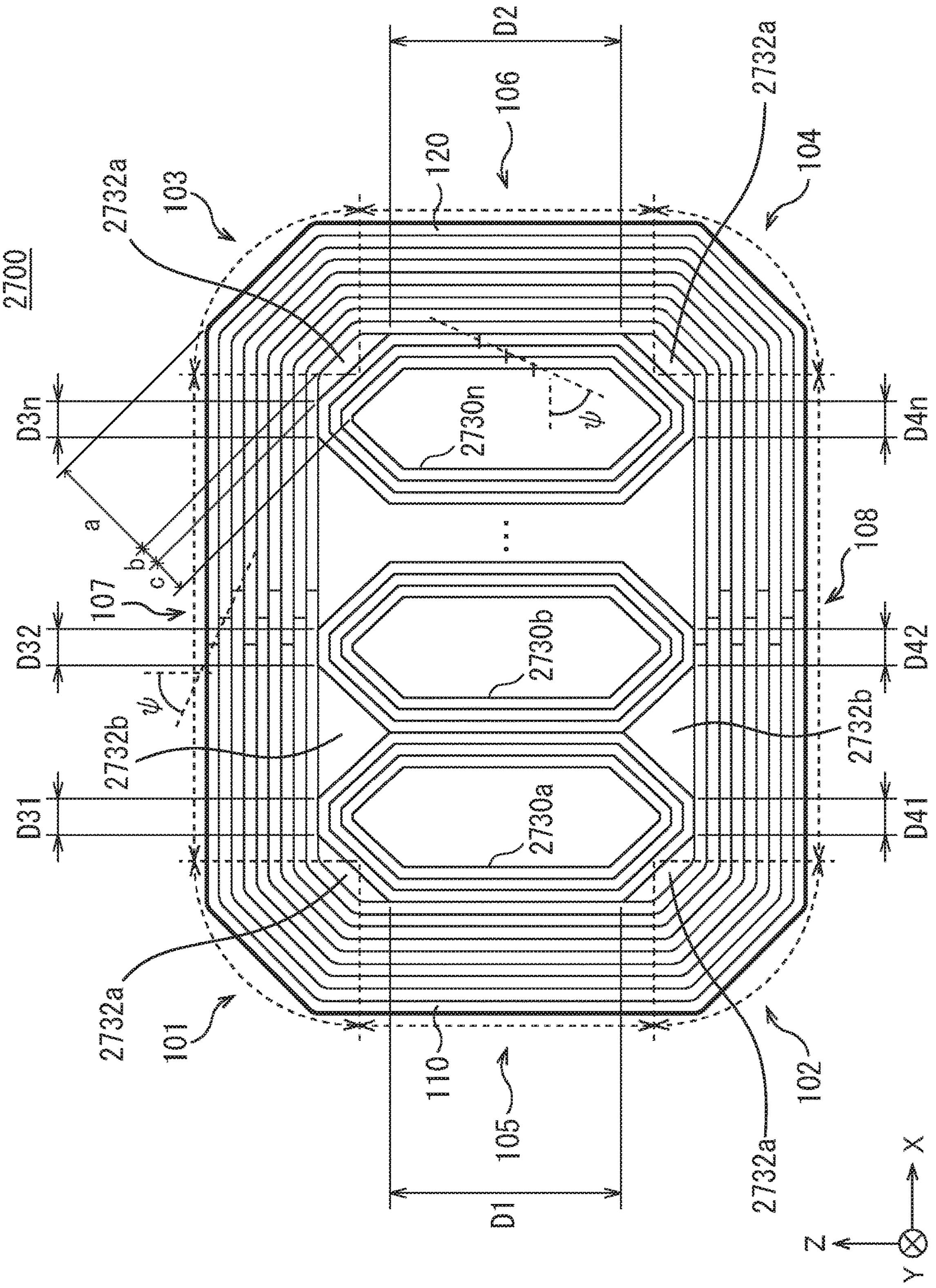
FIG. 37 is a schematic view showing an example in the example of configuration of FIG. 35 of rendering the outer shapes of the third parts adjoining the gaps straight shapes in the same way as the example of configuration of FIG. 30.

FIG. 36 is a schematic view showing an example where, in the example of configuration shown in FIG. 34, in the same way as the example of configuration of FIG. 30, the outer shapes of the third parts 2730*a* and 2730*b* adjoining the gaps 2732*a* and 2732*b* are made straight shapes. Further, FIG. 37 is a schematic view showing an example where, in the example of configuration of FIG. 35, in the same way as the example of configuration of FIG. 30, the outer shapes of the third parts 2730, 2730*b*, . . . , 2730*n* adjoining the gaps 2732*a* and 2732*b* are made straight shapes. That is, when viewing the magnetic core 2700 from the front, the third parts 2730*a* and 2730*b* (third parts 2730, 2730*b*, . . . , 2730*n*) are made octagonal shapes. In such a configuration as well, discharge of heat by the gaps 2732*a* and 2732*b* can be promoted more.

Examples

Below, examples in which the above-mentioned relationship of formula (2) stands will be explained. The inventors prepared several examples changed in thickness of material of the grain-oriented electrical steel sheets, the stacked thickness (a+b), and the thickness of the gaps c and evaluated them for noise and the effect of improvement of the cooling efficiency. The following Table 1 to Table 6 show the results. Note that, the cores were all made single-phase cores.

Example 1

In Example 1, as shown in FIG. 29 and FIG. 30, there is a single third part 2730. The following Table 1 to Table 2 show the results of Example 1.

TABLE 1

| Material sheet thickness (mm) | Stacked thickness (winding thickness) a + c (mm) | Gap thickness b (mm) | (a + c)/300 | Noise (dB) | Effect of improvement of cooling efficiency | |
|---|---|---|---|---|---|---|
| 0.23 | 100 | 0.2 | 0.33 | Poor | Poor | Comp. ex. |
| 0.23 | 100 | 0.3 | 0.33 | Poor | Poor | Comp. ex. |
| 0.23 | 100 | 0.35 | 0.33 | Very good | Good | Inv. ex. |
| 0.23 | 100 | 1 | 0.33 | Good | Good | Inv. ex. |
| 0.23 | 100 | 10 | 0.33 | Good | Good | Inv. ex. |
| 0.23 | 100 | 100 | 0.33 | Good | Very good | Inv. ex. |
| 0.23 | 100 | 200 | 0.33 | Poor | Very good | Comp. ex. |
| 0.23 | 200 | 0.5 | 0.67 | Poor | Poor | Comp. ex. |
| 0.23 | 200 | 0.6 | 0.67 | Poor | Poor | Comp. ex. |
| 0.23 | 200 | 0.7 | 0.67 | Good | Good | Inv. ex. |
| 0.23 | 200 | 5 | 0.67 | Good | Good | Inv. ex. |
| 0.23 | 200 | 100 | 0.67 | Good | Good | Inv. ex. |
| 0.23 | 200 | 200 | 0.67 | Good | Good | Inv. ex. |
| 0.23 | 200 | 400 | 0.67 | Poor | Good | Comp. ex. |
| 0.23 | 400 | 0.8 | 1.33 | Poor | Poor | Comp. ex. |
| 0.23 | 400 | 1 | 1.33 | Poor | Poor | Comp. ex. |
| 0.23 | 400 | 1.4 | 1.33 | Good | Good | Inv. ex. |
| 0.23 | 400 | 5 | 1.33 | Good | Good | Inv. ex. |
| 0.23 | 400 | 200 | 1.33 | Good | Good | Inv. ex. |
| 0.23 | 400 | 400 | 1.33 | Good | Very good | Inv. ex. |
| 0.23 | 400 | 500 | 1.33 | Poor | Good | Comp. ex. |
| 0.23 | 800 | 1.5 | 2.67 | Poor | Poor | Comp. ex. |
| 0.23 | 800 | 2.5 | 2.67 | Poor | Poor | Comp. ex. |
| 0.23 | 800 | 2.8 | 2.67 | Good | Good | Inv. ex. |
| 0.23 | 800 | 100 | 2.67 | Good | Good | Inv. ex. |
| 0.23 | 800 | 300 | 2.67 | Good | Good | Inv. ex. |
| 0.23 | 800 | 800 | 2.67 | Good | Good | Inv. ex. |

TABLE 1-continued

| Material sheet thickness (mm) | Stacked thickness (winding thickness) a + c (mm) | Gap thickness b (mm) | (a + c)/300 | Noise (dB) | Effect of improvement of cooling efficiency | |
|---|---|---|---|---|---|---|
| 0.23 | 800 | 1000 | 2.67 | Poor | Very good | Comp. ex. |
| 0.23 | 2000 | 4 | 6.67 | Poor | Poor | Comp. ex. |
| 0.23 | 2000 | 6 | 6.67 | Poor | Poor | Comp. ex. |
| 0.23 | 2000 | 7 | 6.67 | Very good | Good | Inv. ex. |
| 0.23 | 2000 | 20 | 6.67 | Good | Good | Inv. ex. |
| 0.23 | 2000 | 200 | 6.67 | Good | Good | Inv. ex. |
| 0.23 | 2000 | 1500 | 6.67 | Good | Very good | Inv. ex. |
| 0.23 | 2000 | 2000 | 6.67 | Good | Very good | Inv. ex. |

TABLE 2

| Material sheet thickness (mm) | Stacked thickness (winding thickness) a + c (mm) | Gap thickness b (mm) | (a + c)/300 | Noise (dB) | Effect of improvement of cooling efficiency | |
|---|---|---|---|---|---|---|
| 0.18 | 100 | 0.2 | 0.33 | Poor | Poor | Comp. ex. |
| 0.18 | 100 | 0.3 | 0.33 | Poor | Poor | Comp. ex. |
| 0.18 | 100 | 0.35 | 0.33 | Good | Good | Inv. ex. |
| 0.18 | 100 | 1 | 0.33 | Good | Good | Inv. ex. |
| 0.18 | 100 | 10 | 0.33 | Good | Good | Inv. ex. |
| 0.18 | 100 | 100 | 0.33 | Good | Good | Inv. ex. |
| 0.18 | 100 | 200 | 0.33 | Poor | Good | Comp. ex. |
| 0.18 | 200 | 0.5 | 0.67 | Poor | Poor | Comp. ex. |
| 0.18 | 200 | 0.6 | 0.67 | Poor | Poor | Comp. ex. |
| 0.18 | 200 | 0.7 | 0.67 | Good | Good | Inv. ex. |
| 0.18 | 200 | 5 | 0.67 | Good | Very good | Inv. ex. |
| 0.18 | 200 | 100 | 0.67 | Good | Good | Inv. ex. |
| 0.18 | 200 | 200 | 0.67 | Good | Very good | Inv. ex. |
| 0.18 | 200 | 400 | 0.67 | Poor | Good | Comp. ex. |
| 0.18 | 400 | 0.8 | 1.33 | Poor | Poor | Comp. ex. |
| 0.18 | 400 | 1 | 1.33 | Poor | Poor | Comp. ex. |
| 0.18 | 400 | 1.4 | 1.33 | Good | Good | Inv. ex. |
| 0.18 | 400 | 5 | 1.33 | Good | Good | Inv. ex. |
| 0.18 | 400 | 200 | 1.33 | Good | Good | Inv. ex. |
| 0.18 | 400 | 400 | 1.33 | Good | Very good | Inv. ex. |
| 0.18 | 400 | 500 | 1.33 | Poor | Good | Comp. ex |
| 0.18 | 800 | 1.5 | 2.67 | Poor | Poor | Comp. ex. |
| 0.18 | 800 | 2.5 | 2.67 | Poor | Poor | Comp. ex. |
| 0.18 | 800 | 2.8 | 2.67 | Good | Good | Inv. ex. |
| 0.18 | 800 | 100 | 2.67 | Good | Good | Inv. ex. |
| 0.18 | 800 | 300 | 2.67 | Good | Good | Inv. ex. |
| 0.18 | 800 | 800 | 2.67 | Good | Very good | Inv. ex. |
| 0.18 | 800 | 1000 | 2.67 | Poor | Very good | Comp. ex. |
| 0.18 | 2000 | 4 | 6.67 | Poor | Poor | Comp. ex. |
| 0.18 | 2000 | 6 | 6.67 | Poor | Poor | Comp. ex. |
| 0.18 | 2000 | 7 | 6.67 | Good | Good | Inv. ex. |
| 0.18 | 2000 | 20 | 6.67 | Good | Good | Inv. ex. |
| 0.18 | 2000 | 200 | 6.67 | Good | Good | Inv. ex. |
| 0.18 | 2000 | 2000 | 6.67 | Good | Very good | Inv. ex. |
| 0.18 | 2000 | 2200 | 6.67 | Poor | Very good | Comp. ex. |

Example 2

In Example 2, there are two or three third parts. Example 2 corresponds to the configurations of FIG. 34 to FIG. 37. The following Table 3 to Table 5 show the results of Example 2.

TABLE 3

| Material sheet thickness (mm) | Stacked thickness (winding thickness) a + c (mm) | Gap thickness b (mm) | (a + c)/300 | Noise (dB) | Effect of improvement of cooling efficiency | No. of third parts | |
|---|---|---|---|---|---|---|---|
| 0.23 | 100 | 0.2 | 0.33 | Poor | Poor | 2 | Comp. ex. |
| 0.23 | 100 | 0.3 | 0.33 | Poor | Poor | 2 | Comp. ex. |
| 0.23 | 100 | 0.35 | 0.33 | Very good | Good | 2 | Inv. ex. |
| 0.23 | 100 | 1 | 0.33 | Very good | Good | 2 | Inv. ex. |
| 0.23 | 100 | 10 | 0.33 | Good | Very good | 2 | Inv. ex. |
| 0.23 | 100 | 100 | 0.33 | Good | Very good | 2 | Inv. ex. |
| 0.23 | 100 | 200 | 0.33 | Poor | Very good | 2 | Comp. ex. |
| 0.23 | 200 | 0.5 | 0.67 | Poor | Poor | 2 | Comp. ex. |
| 0.23 | 200 | 0.6 | 0.67 | Poor | Poor | 2 | Comp. ex. |
| 0.23 | 200 | 0.7 | 0.67 | Very good | Good | 2 | Inv. ex. |
| 0.23 | 200 | 5 | 0.67 | Good | Good | 2 | Inv. ex. |
| 0.23 | 200 | 100 | 0.67 | Very good | Very good | 2 | Inv. ex. |
| 0.23 | 200 | 200 | 0.67 | Good | Very good | 2 | Inv. ex. |
| 0.23 | 200 | 400 | 0.67 | Poor | Very good | 2 | Comp. ex. |
| 0.23 | 400 | 0.8 | 1.33 | Poor | Poor | 2 | Comp. ex. |
| 0.23 | 400 | 1 | 1.33 | Poor | Poor | 2 | Comp. ex. |
| 0.23 | 400 | 1.4 | 1.33 | Very good | Good | 2 | Inv. ex. |
| 0.23 | 400 | 5 | 1.33 | Good | Good | 2 | Inv. ex. |
| 0.23 | 400 | 200 | 1.33 | Good | Very good | 2 | Inv. ex. |
| 0.23 | 400 | 400 | 1.33 | Good | Very good | 2 | Inv. ex. |
| 0.23 | 400 | 500 | 1.33 | Poor | Good | 2 | Comp. ex. |
| 0.23 | 800 | 1.5 | 2.67 | Poor | Poor | 2 | Comp. ex. |
| 0.23 | 800 | 2.5 | 2.67 | Poor | Poor | 2 | Comp. ex. |
| 0.23 | 800 | 2.8 | 2.67 | Very good | Good | 2 | Inv. ex. |
| 0.23 | 800 | 100 | 2.67 | Very good | Good | 2 | Inv. ex. |
| 0.23 | 800 | 300 | 2.67 | Good | Very good | 2 | Inv. ex. |
| 0.23 | 800 | 800 | 2.67 | Good | Very good | 2 | Inv. ex. |
| 0.23 | 800 | 1000 | 2.67 | Poor | Very good | 2 | Comp. ex. |
| 0.23 | 2000 | 4 | 6.67 | Poor | Poor | 2 | Comp. ex. |
| 0.23 | 2000 | 6 | 6.67 | Poor | Poor | 2 | Comp. ex. |
| 0.23 | 2000 | 7 | 6.67 | Very good | Good | 2 | Inv. ex. |
| 0.23 | 2000 | 20 | 6.67 | Very good | Good | 2 | Inv. ex. |
| 0.23 | 2000 | 200 | 6.67 | Good | Very good | 2 | Inv. ex. |
| 0.23 | 2000 | 1500 | 6.67 | Good | Very good | 2 | Inv. ex. |
| 0.23 | 2000 | 2000 | 6.67 | Good | Very good | 2 | Inv. ex. |
| 0.18 | 100 | 0.2 | 0.33 | Poor | Poor | 2 | Comp. ex. |
| 0.18 | 100 | 0.3 | 0.33 | Poor | Poot | 2 | Comp. ex. |
| 0.18 | 100 | 0.35 | 0.33 | Good | Good | 2 | Inv. ex. |
| 0.18 | 100 | 1 | 0.33 | Very good | Good | 2 | Inv. ex. |
| 0.18 | 100 | 10 | 0.33 | Good | Good | 2 | Inv. ex. |

TABLE 3-continued

| Material sheet thickness (mm) | Stacked thickness (winding thickness) a + c (mm) | Gap thickness b (mm) | (a + c)/300 | Noise (dB) | Effect of improvement of cooling efficiency | No. of third parts | |
|---|---|---|---|---|---|---|---|
| 0.18 | 100 | 100 | 0.33 | Good | Very good | 2 | Inv. ex. |
| 0.18 | 100 | 200 | 0.33 | Poor | Very good | 2 | Comp. ex. |
| 0.18 | 200 | 0.5 | 0.67 | Poor | Poor | 2 | Comp. ex. |
| 0.18 | 200 | 0.6 | 0.67 | Poor | Poor | 2 | Comp. ex. |
| 0.18 | 200 | 0.7 | 0.67 | Very good | Good | 2 | Inv. ex. |
| 0.18 | 200 | 5 | 0.67 | Very good | Very good | 2 | Inv. ex. |
| 0.18 | 200 | 100 | 0.67 | Good | Very good | 2 | Inv. ex. |
| 0.18 | 200 | 200 | 0.67 | Good | Very good | 2 | Inv. ex. |
| 0.18 | 200 | 400 | 0.67 | Poor | Very good | 2 | Comp. ex. |
| 0.18 | 400 | 0.8 | 1.33 | Poor | Poor | 2 | Comp. ex. |
| 0.18 | 400 | 1 | 1.33 | Poor | Poor | 2 | Comp. ex. |
| 0.18 | 400 | 1.4 | 1.33 | Very good | Good | 2 | Inv. ex. |
| 0.18 | 400 | 5 | 1.33 | Very good | Very good | 2 | Inv. ex. |
| 0.18 | 400 | 200 | 1.33 | Very good | Very good | 2 | Inv. ex. |
| 0.18 | 400 | 400 | 1.33 | Good | Very good | 2 | Inv. ex. |
| 0.18 | 400 | 500 | 1.33 | Poor | Good | 2 | Comp. ex. |
| 0.18 | 800 | 1.5 | 2.67 | Poor | Poor | 2 | Comp. ex. |
| 0.18 | 800 | 2.5 | 2.67 | Poor | Poor | 2 | Comp. ex. |

TABLE 4

| Material sheet thickness (mm) | Stacked thickness (winding thickness) a + c (mm) | Gap thickness b (mm) | (a + c)/300 | Noise (dB) | Effect of improvement of cooling efficiency | No. of third parts | |
|---|---|---|---|---|---|---|---|
| 0.18 | 800 | 2.8 | 2.67 | Very good | Good | 2 | Inv. ex. |
| 0.18 | 800 | 100 | 2.67 | Very good | Good | 2 | Inv. ex. |
| 0.18 | 800 | 300 | 2.67 | Very good | Very good | 2 | Inv. ex. |
| 0.18 | 800 | 800 | 2.67 | Good | Very good | 2 | Inv. ex. |
| 0.18 | 800 | 1000 | 2.67 | Poor | Very good | 2 | Comp. ex. |
| 0.18 | 2000 | 4 | 6.67 | Poor | Poor | 2 | Comp. ex. |
| 0.18 | 2000 | 6 | 6.67 | Poor | Poor | 2 | Comp. ex. |
| 0.18 | 2000 | 7 | 6.67 | Very good | Good | 2 | Inv. ex. |
| 0.18 | 2000 | 20 | 6.67 | Very good | Good | 2 | Inv. ex. |
| 0.18 | 2000 | 200 | 6.67 | Good | Good | 2 | Inv. ex. |
| 0.18 | 2000 | 2000 | 6.67 | Good | Very good | 2 | Inv. ex. |
| 0.18 | 2000 | 2200 | 6.67 | Poor | Very good | 2 | Comp. ex. |
| 0.23 | 100 | 0.2 | 0.33 | Poor | Poor | 3 | Comp. ex. |
| 0.23 | 100 | 0.3 | 0.33 | Poor | Poor | 3 | Comp. ex. |

TABLE 4-continued

| Material sheet thickness (mm) | Stacked thickness (winding thickness) a + c (mm) | Gap thickness b (mm) | (a + c)/300 | Noise (dB) | Effect of improvement of cooling efficiency | No. of third parts | |
|---|---|---|---|---|---|---|---|
| 0.23 | 100 | 0.35 | 0.33 | Very good | Good | 3 | Inv. ex. |
| 0.23 | 100 | 1 | 0.33 | Very good | Very good | 3 | Inv. ex. |
| 0.23 | 100 | 10 | 0.33 | Good | Very good | 3 | Inv. ex. |
| 0.23 | 100 | 100 | 0.33 | Good | Very good | 3 | Inv. ex. |
| 0.23 | 100 | 200 | 0.33 | Poor | Very good | 3 | Comp. ex. |
| 0.23 | 200 | 0.5 | 0.67 | Poor | Poor | | Comp. ex. |
| 0.23 | 200 | 0.6 | 0.67 | Poor | Poor | 3 | Comp. ex. |
| 0.23 | 200 | 0.7 | 0.67 | Very good | Very good | 3 | Inv. ex. |
| 0.23 | 200 | 5 | 0.67 | Good | Very good | 3 | Inv. ex. |
| 0.23 | 200 | 100 | 0.67 | Very good | Very good | 3 | Inv. ex. |
| 0.23 | 200 | 200 | 0.67 | Good | Very good | 3 | Inv. ex. |
| 0.23 | 200 | 400 | 0.67 | Poor | Very good | 3 | Comp. ex. |
| 0.23 | 400 | 0.8 | 1.33 | Poor | Poor | 3 | Comp. ex. |
| 0.23 | 400 | 1 | 1.33 | Poor | Poor | 3 | Comp. ex. |
| 0.23 | 400 | 1.4 | 1.33 | Very good | Good | | Inv. ex. |
| 0.23 | 400 | 5 | 1.33 | Good | Very good | 3 | Inv. ex. |
| 0.23 | 400 | 200 | 1.33 | Good | Very good | 3 | Inv. ex. |
| 0.23 | 400 | 400 | 1.33 | Good | Very good | 3 | Inv. ex. |
| 0.23 | 400 | 500 | 1.33 | Poor | Good | 3 | Comp. ex. |
| 0.23 | 800 | 1.5 | 2.67 | Poor | Poor | 3 | Comp. ex. |
| 0.23 | 800 | 2.5 | 2.67 | Poor | Poor | 3 | Comp. ex. |
| 0.23 | 800 | 2.8 | 2.67 | Very good | Very good | 3 | Inv. ex. |
| 0.23 | 800 | 110 | 2.67 | Very good | Very good | 3 | Inv. ex. |
| 0.23 | 800 | 300 | 2.67 | Good | Very good | 3 | Inv. ex. |
| 0.23 | 800 | 800 | 2.67 | Good | Very good | 3 | Inv. ex. |
| 0.23 | 800 | 1000 | 2.67 | Poor | Very good | 3 | Comp. ex. |
| 0.23 | 2000 | 4 | 6.67 | Poor | Poor | 3 | Comp. ex. |
| 0.23 | 2000 | 6 | 6.67 | Poor | Poor | 3 | Comp. ex. |
| 0.23 | 2000 | 7 | 6.67 | Very good | Good | 3 | Inv. ex. |
| 0.23 | 2000 | 20 | 6.67 | Very good | Very good | 3 | Inv. ex. |
| 0.23 | 2000 | 200 | 6.67 | Good | Very good | 3 | Inv. ex. |
| 0.23 | 2000 | 1500 | 6.67 | Good | Very good | 3 | Inv. ex. |
| 0.23 | 2000 | 2000 | 6.67 | Good | Very good | 3 | Inv. ex. |
| 0.18 | 100 | 0.2 | 0.33 | Poor | Poor | 3 | Comp. ex. |
| 0.18 | 100 | 0.3 | 0.33 | Poor | Poor | 3 | Comp. ex. |

TABLE 5

| Material sheet thickness (mm) | Stacked thickness (winding thickness) a + c (mm) | Gap thickness b (mm) | (a + c)/300 | Noise (dB) | Effect of improvement of cooling efficiency | No. of third parts | |
|---|---|---|---|---|---|---|---|
| 0.18 | 100 | 0.35 | 0.33 | Good | Good | 3 | Inv. ex. |
| 0.18 | 100 | 1 | 0.33 | Very good | Good | 3 | Inv. ex. |
| 0.18 | 100 | 10 | 0.33 | Good | Very good | 3 | Inv. ex. |
| 0.18 | 100 | 100 | 0.33 | Good | Very good | 3 | Inv. ex. |
| 0.18 | 100 | 200 | 0.33 | Poor | Very good | 3 | Comp. ex. |
| 0.18 | 200 | 0.5 | 0.67 | Poor | Poor | 3 | Comp. ex. |
| 0.18 | 200 | 0.6 | 0.67 | Poor | Poor | 3 | Comp. ex. |
| 0.18 | 200 | 0.7 | 0.67 | Very good | Good | 3 | Inv. ex. |
| 0.18 | 200 | 5 | 0.67 | Very good | Very good | 3 | Inv. ex. |
| 0.18 | 200 | 100 | 0.67 | Good | Very good | 3 | Inv. ex. |
| 0.18 | 200 | 200 | 0.67 | Good | Very good | 3 | Inv. ex. |
| 0.18 | 200 | 400 | 0.67 | Poor | Very good | 3 | Comp. ex. |
| 0.18 | 400 | 0.8 | 1.33 | Poor | Poor | 3 | Comp. ex. |
| 0.18 | 400 | 1 | 1.33 | Poor | Poor | 3 | Comp. ex. |
| 0.18 | 400 | 1.4 | 1.33 | Very good | Good | 3 | Inv. ex. |
| 0.18 | 400 | 5 | 1.33 | Very good | Very good | 3 | Inv. ex. |
| 0.18 | 400 | 200 | 1.33 | Very good | Very good | 3 | Inv. ex. |
| 0.18 | 400 | 400 | 1.33 | Good | Very good | 3 | Inv. ex. |
| 0.18 | 400 | 500 | 1.33 | Poor | Good | 3 | Comp. ex. |
| 0.18 | 800 | 1.5 | 2.67 | Poor | Poor | 3 | Comp. ex. |
| 0.18 | 800 | 2.5 | 2.67 | Poor | Poor | 3 | Comp. ex. |
| 0.18 | 800 | 2.8 | 2.67 | Very good | Good | 3 | Inv. ex. |
| 0.18 | 800 | 100 | 2.67 | Very good | Good | 3 | Inv. ex. |
| 0.18 | 800 | 300 | 2.67 | Very good | Very good | 3 | Inv. ex. |
| 0.18 | 800 | 800 | 2.67 | Good | Very good | 3 | Inv. ex. |
| 0.18 | 800 | 1000 | 2.67 | Poor | Very good | 3 | Comp. ex. |
| 0.18 | 2000 | 4 | 6.67 | Poor | Poor | 3 | Comp. ex. |
| 0.18 | 2000 | 6 | 6.67 | Poor | Poor | 3 | Comp. ex. |
| 0.18 | 2000 | 7 | 6.67 | Very good | Good | 3 | Inv. ex. |
| 0.18 | 2000 | 20 | 6.67 | Very good | Very good | 3 | Inv. ex. |
| 0.18 | 2000 | 200 | 6.67 | Good | Very good | 3 | Inv. ex. |
| 0.18 | 2000 | 2000 | 6.67 | Good | Very good | 3 | Inv. ex. |
| 0.18 | 2000 | 2200 | 6.67 | Poor | Very good | 3 | Comp. ex. |

Note that, the method of evaluation of noise is as follows: The magnetic cores described in Tables 1 to 5 were prepared, excited, and measured for noise. Each magnetic core was set with the primary and secondary coils and measured using the excitation current method under conditions of a frequency of 50 Hz and a magnetic flux density of 1.7 T. This noise measurement was conducted in an anechoic chamber with a dark noise of 16 dBA while positioning a noise meter at a position of 0.3 m from the core surface. The vibration noise was recorded, then was corrected for A scale as hearing correction. The noise was expressed in units of dBA.

Regarding the effect of improvement of noise (dBA), if the ratio between a difference As−A0, from the noise A0 using a magnetic core 2700 with a width "b" of the gap 2732 of 0 as a reference, of the noise As (dBA) of a magnetic core 2700 with the gap "b"=s (s>0) and A0 (=100×(As−A0)/A0) is less than −3%, it was evaluated that there was an effect of improvement ("Good" in Tables 1 to 5). Further, if the ratio (=100×(As−A0)/A0) is −3% or more, it was evaluated that there was a remarkable effect of improvement ("Very good" in Tables 1 to 5). Note that, compared with the magnetic core 2700 with a width "b" of the gap 2732 of 0 used as a reference, the magnetic core 2700 with the gap "b"=s (s>0) was made completely the same in conditions other than the width "b" (in table, thickness of material, stacked thickness (a+b), length in the width direction of grain-oriented electrical steel sheets, etc.)

Further, for evaluation of the effect of improvement of the cooling efficiency, the magnetic core 2700 was set with windings to form a transformer, the transformer was placed in a tank filled with insulating oil, and the efficiency was measured and evaluated in that state. Defining the temperature rise of insulating oil when operating a transformer using a magnetic core 2700 with a width "b" of the gap 2730 of 0 at a load of 50% of the rated capacity for 1 hour (including heat generated at windings and temperature rise of core) as ΔT0 and defining the temperature rise of insulating oil when operating a transformer using a magnetic core 2700 with the gap b=s (s>0) of the gap 2732 at a load of 50% for 1 hour (including heat generated at windings and temperature rise of core) as ΔTb, the cooling efficiency of the insulating oil was found by the following formula (3) while measuring the temperature of the insulating oil at the tank surface using a contact type thermometer. Note that, in the same way as above, compared with the magnetic core 2700 with a width "b" of the gap 2732 of 0 used as a reference, the magnetic core 2700 with the gap "b"=s (s>0) was made completely the same in conditions other than the width "b":

$$\text{Cooling efficiency}=100\times(\Delta Tb-\Delta T0)/\Delta T0 \quad (3)$$

The cooling efficiency was calculated in the above way. If the cooling efficiency was less than −3%, it was deemed there was an effect of improvement (in Tables 1 to 5, "Good"), while if it was −3% or more, it was deemed there was a remarkable effect of improvement (in Tables 1 to 5, "Very good"). The case where the cooling efficiency became 0 or a positive value was deemed as there being no effect (in Tables 1 to 5, "Poor").

In Example 1 and Example 2, according to the results of Table 1 to Table 5, when formula (2) was satisfied, there were effects in both noise suppression and improvement of the cooling efficiency. On the other hand, when formula (2) was not satisfied, no effect was obtained in at least one of noise and effect of improvement of cooling.

From the above, it is learned that by satisfying b≥(a+c)/285, a cooling effect is obtained by the width "b" of the gap 2732. Further, it is learned that by satisfying a+c≥b, a noise suppression effect is obtained by the width "b" of the gap 2732. Note that, it may be that by the width "b" of the gap 2732 increasing, the magnetic resistance of the third part becomes lower, the difference in magnetic resistance with the first part 110 or the second part 120 becomes greater, and magnetic flux concentrates at the third part, whereby the flux density at the third part becomes too high and therefore the noise becomes worse.

Further, the embodiments of the present invention explained above all just show specific examples in working the present invention. The technical scope of the present invention must not be interpreted in a limited manner due to these. That is, the present invention can be worked in various ways without departing from its technical idea or main features.

REFERENCE SIGNS LIST

100, 700, 900, 1100, 1200, 1500, 1800, 2000, 2400, 2500, 2600, 2700, 2800: magnetic core, 101, 701, 901: first corner area, 102, 702, 902: second corner area, 103, 703, 903: third corner area, 104, 704, 904: fourth corner area, 110, 710, 910: first part, 120, 720, 920: second part, 130, 730, 930, 1130, 1230, 1530, 1830, 2030, 2430, 2530, 2630, 2730, 2830: third part, 140: band, 610, 620: coil, 2732: gap

The invention claimed is:

1. A magnetic core in which a first corner area and second corner area, and a third corner area and fourth corner area are respectively arranged at intervals in a first direction and said first corner area and third corner area, and said second corner area and fourth corner area are respectively arranged at intervals in a second direction vertical to the first direction, which magnetic core comprising a first part having a plurality of soft magnetic sheets which are shaped respectively bent at positions corresponding to said first corner area and said second corner area and which plurality of soft magnetic sheets are stacked so that the sheet surfaces are superposed, a second part having a plurality of soft magnetic sheets which are shaped respectively bent at positions corresponding to said third corner area and said fourth corner area and which plurality of soft magnetic sheets are stacked so that the sheet surfaces are superposed, and a third part, wherein end parts in the longitudinal direction of said soft magnetic sheets forming said first part and end parts in the longitudinal direction of said soft magnetic sheets forming said second part being made to abut against each other in said second direction in state and the positions in the circumferential direction of said magnetic core of the locations of the abutting state being offset in said second direction, the abutting state of the end parts in the longitudinal direction of said soft magnetic sheets forming said first part and end parts in the longitudinal direction of said soft magnetic sheets forming said second part in said second direction being held, said third part being arranged at a window part comprised of a region at the inside of said first part and said second part, at least part of a region of one end of said third part and at least part of a region of another end of said third part respectively made to contact an inner circumferential surface of said window part in said second direction, and in a surface of said third part, there is a region in a state where said first part and said second part contacting an inner circumferential surface between said first corner area and said third corner area of, but there is no region in a state where said first part and said second part contact an inner circumferential surface between said second corner area and said fourth corner area.

2. The magnetic core according to claim 1, wherein said third part includes two parts, at a surface of said one third part, there is a region in a state where said first part and said second part contact an inner circumferential surface between said first corner area and said third corner area, but there is no region in a state where said first part and said second part contact the inner circumferential surface between said third corner area and said fourth corner area, at a surface of said another third part, there is a region in a state where said first part and said second part contact an inner circumferential surface between said third corner area and said fourth corner area, but there is no region in a state where said first part and said second part contact the inner circumferential surface between said first corner area and said second corner area, and said two third parts are in a state having an interval between them in said first direction.

3. A magnetic core in which a first corner area and second corner area, and a third corner area and fourth corner area are respectively arranged at intervals in a first direction and said first corner area and third corner area, and said second corner area and fourth corner area are respectively arranged at intervals in a second direction vertical to the first direction, which magnetic core comprising a first part having a plurality of soft magnetic sheets which are shaped respectively bent at positions corresponding to said first corner area and said second corner area and which plurality of soft magnetic sheets are stacked so that the sheet surfaces are superposed, a second part having a plurality of soft magnetic sheets which are shaped respectively bent at positions corresponding to said third corner area and said fourth corner area and which plurality of soft magnetic sheets are stacked so that the sheet surfaces are superposed, and a third part, wherein end parts in the longitudinal direction of said soft magnetic sheets forming said first part and end parts in the longitudinal direction of said soft magnetic sheets forming said second part being made to abut against each other in said second direction in state and the positions in the circumferential direction of said magnetic core of the locations of the abutting state being offset in said second direction, the abutting state of the end parts in the longitudinal direction of said soft magnetic sheets forming said first part and end parts in the longitudinal direction of said soft magnetic sheets forming said second part in said second direction being held, said third part being arranged at a window part comprised of a region at the inside of said first part and said second part, at least part of a region of one end of said third part and at least part of a region of another end of said third part respectively made to contact an inner circumferential surface of said window part in said second direction, and in a surface of said third part, there is neither a region in a state where said first part and said second part contact an inner circumferential surface between said first corner area and said second corner area nor a region in a state where said first part and said second part contact an inner circumferential surface between said third corner area and said fourth corner area.

4. A magnetic core in which a first corner area and second corner area, and a third corner area and fourth corner area are respectively arranged at intervals in a first direction and said first corner area and third corner area, and said second corner area and fourth corner area are respectively arranged at intervals in a second direction vertical to the first direction, which magnetic core comprising a first part having a plurality of soft magnetic sheets which are shaped respectively bent at positions corresponding to said first corner area and said second corner area and which plurality of soft magnetic sheets are stacked so that the sheet surfaces are superposed, a second part having a plurality of soft magnetic sheets which are shaped respectively bent at positions corresponding to said third corner area and said fourth corner area and which plurality of soft magnetic sheets are stacked so that the sheet surfaces are superposed, and a third part, wherein end parts in the longitudinal direction of said soft magnetic sheets forming said first part and end parts in the longitudinal direction of said soft magnetic sheets forming said second part being made to abut against each other in said second direction in state and the positions in the circumferential direction of said magnetic core of the locations of the abutting state being offset in said second direction, the abutting state of the end parts in the longitudinal direction of said soft magnetic sheets forming said first part and end parts in the longitudinal direction of said soft magnetic sheets forming said second part in said second direction being held, said third part being arranged at a window part comprised of a region at the inside of said first part and said second part, at least part of a region of one end of said third part and at least part of a region of another end of said third part respectively made to contact an inner circumferential surface of said window part in said second direction, said third part is bent at positions corresponding to said first corner area, said second corner area, said third corner area, and said fourth corner area, and an outer circumferential surface of said third part is arranged in a state contacting inner circumferential surfaces of said first part and said second part, said third part has a plurality of soft magnetic sheets stacked so that the sheet surfaces are superposed over each other, end parts in the longitudinal directions of said soft magnetic sheets forming said third part are made to abut against in said second direction at least at one position of a position between said first corner area and said third corner area and a position between said second corner area and said fourth corner area in state, and the positions in the circumferential direction of said magnetic core of the locations where the end parts in the longitudinal directions of the plurality of said soft magnetic sheets forming said third part are made to abut against each other in said second direction are the same in said second direction.

5. The magnetic core according to claim 4, wherein said third part has a plurality of soft magnetic sheets stacked so that the sheet surfaces are superposed over each other, end parts in the longitudinal directions of said soft magnetic sheets forming said third part are made to abut against each other in said first direction or said second direction in state, and at the same layer, there is a single location where the end parts in the longitudinal directions of said soft magnetic sheets forming said third part are made to abut against each other.

6. The magnetic core according to claim 4, wherein at positions corresponding to said first corner area, said second corner area, said third corner area, and said fourth corner area, a gap is provided between said outer circumferential surface of said third part and said inner circumferential surface of said first part or said second part.

7. The magnetic core according to claim 6, wherein at positions corresponding to said first corner area, said second corner area, said third corner area, and said fourth corner area, a width of said gap in a thickness direction of said soft magnetic sheets is larger than a thickness of said soft magnetic sheets.

8. The magnetic core according to claim 6, wherein at positions corresponding to said first corner area, said second corner area, said third corner area, and said fourth corner area, the following relationship stands, where a thickness of said first part in the thickness direction of the soft magnetic sheets is "a", a width of said gap is "b", and a thickness of said third part is "c":

a+c_b≥(a+c)/285.

9. The magnetic core according to claim 1, wherein said third part has a plurality of soft magnetic sheets stacked so that the surfaces are superposed over each other and at least part of regions at single ends of said soft magnetic sheets forming said third part and at least part of regions at other ends of said soft magnetic sheets forming said third part are respectively made to contact the inner circumferential surface of said window part in said second direction in state.

10. The magnetic core according to claim 3, wherein said third part has a plurality of soft magnetic sheets stacked so that the surfaces are superposed over each other and at least part of regions at single ends of said soft magnetic sheets forming said third part and at least part of regions at other ends of said soft magnetic sheets forming said third part are respectively made to contact the inner circumferential surface of said window part in said second direction in state.

11. The magnetic core according to claim 4, wherein said third part has a plurality of soft magnetic sheets stacked so that the surfaces are superposed over each other and at least part of regions at single ends of said soft magnetic sheets forming said third part and at least part of regions at other ends of said soft magnetic sheets forming said third part are respectively made to contact the inner circumferential surface of said window part in said second direction in state.

* * * * *